United States Patent
Karagiannis et al.

(10) Patent No.: US 7,353,027 B2
(45) Date of Patent: Apr. 1, 2008

(54) SEAMLESS HANDOFF IN MOBILE IP

(75) Inventors: Georgios Karagiannis, Neede (NL); Geert Heijenk, Enschede (NL); Karim El Malki, Rome (IT); Hesham Soliman, Melbourne (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 799 days.

(21) Appl. No.: 10/084,879

(22) Filed: Oct. 18, 2001

(65) Prior Publication Data

US 2003/0018810 A1 Jan. 23, 2003

Related U.S. Application Data

(60) Provisional application No. 60/241,539, filed on Oct. 18, 2000.

(51) Int. Cl.
*H04Q 7/20* (2006.01)

(52) U.S. Cl. ............. 455/436; 709/202; 709/221; 709/237; 709/248; 370/329; 370/331; 370/347; 455/435.1

(58) Field of Classification Search ........ 709/202, 709/217, 227, 237, 248, 249, 218, 232, 238, 709/221, 228, 242; 370/338, 352, 349, 401, 370/331; 455/406, 435.01–442
See application file for complete search history.

(56) References Cited

U.S. PATENT DOCUMENTS

| | | | | |
|---|---|---|---|---|
| 5,530,693 A | | 6/1996 | Averbuch et al. ............ 370/60 |
| 5,790,528 A | * | 8/1998 | Muszynski ................ 370/331 |
| 5,819,184 A | * | 10/1998 | Cashman ................ 455/553.1 |
| 5,870,427 A | * | 2/1999 | Tiedemann et al. ........ 375/216 |
| 5,991,616 A | * | 11/1999 | Mirza et al. .............. 455/406 |
| 6,160,804 A | * | 12/2000 | Ahmed et al. ............. 370/349 |
| 6,195,705 B1 | * | 2/2001 | Leung ..................... 709/245 |
| 6,215,779 B1 | * | 4/2001 | Bender et al. ............. 370/338 |
| 6,240,078 B1 | * | 5/2001 | Kuhnel et al. ............. 370/331 |
| 6,393,003 B1 | * | 5/2002 | Lee ........................ 370/331 |
| 6,393,482 B1 | * | 5/2002 | Rai et al. ................. 709/225 |
| 6,400,722 B1 | * | 6/2002 | Chuah et al. .............. 370/401 |
| 6,434,134 B1 | * | 8/2002 | La Porta et al. ........... 370/338 |

(Continued)

FOREIGN PATENT DOCUMENTS

EP 0 777 396 A1 6/1997

(Continued)

OTHER PUBLICATIONS

C. E. Perkins et al. "Route Optimization in Mobile IP", draft-ietf-mobileip-optim-08.txt (Feb. 25, 1999).*

(Continued)

*Primary Examiner*—Michael Won

(57) ABSTRACT

In a system and method for handing off a mobile node in a seamless manner in a wireless access network, procedures are implemented for allowing the mobile node to synchronize the handoff with a base node (e.g., a home agent) and a correspondent node. In this way, a seamless handoff may be achieved, since few or no data packets sent between the base node or the correspondent node and the mobile node are lost. The procedures are supported by both Mobile IPv4 and Mobile IPv6 as well as Hierarchical Mobile IPv4 and Hierarchical Mobile IPv6.

45 Claims, 46 Drawing Sheets

U.S. PATENT DOCUMENTS

| | | | | |
|---|---|---|---|---|
| 6,452,920 | B1* | 9/2002 | Comstock | 370/349 |
| 6,487,406 | B1* | 11/2002 | Chang et al. | 455/422.1 |
| 6,490,259 | B1* | 12/2002 | Agrawal et al. | 370/331 |
| 6,539,225 | B1* | 3/2003 | Lee | 455/436 |
| 6,625,135 | B1* | 9/2003 | Johnson et al. | 370/332 |
| 6,690,659 | B1* | 2/2004 | Ahmed et al. | 370/328 |
| 6,732,177 | B1* | 5/2004 | Roy | 709/227 |
| 6,766,168 | B1* | 7/2004 | Lim | 455/435.1 |
| 6,901,257 | B2* | 5/2005 | Kubota | 455/439 |

FOREIGN PATENT DOCUMENTS

| | | |
|---|---|---|
| WO | WO 00/05909 | 2/2000 |
| WO | WO 02/13565 A1 | 2/2002 |

OTHER PUBLICATIONS

C. Perkins; "*Minimal Encapsulation within IP*"; Oct. 1996; pp. 6; Internet ietf.org/rfc/rfc2004.txt?number=2004.

R. Braden, et al.; *Resource ReSerVation Protocol (RSVP)*; Sep. 1997; pp. 100; Internet ietf.org/rfc/rfc2205.txt?number=2205.

J. Wroclawski; "*The Use of RSVP with IETF Integrated Services*"; Sep. 1997; pp. 30; ietf.org/rfc/rfc2210.txt?number=2210.

A. Conta; "*Generic Packet Tunneling in IPv6 Specification*"; Dec. 1998; pp. 33; Internet ietf.org/rfc/rfc2473.txt?number=2473.

David C. Plummer; "*An Ethernet Address Resolution Protocol or Converting Network Protocol Addresses to 48.bit Ethernet Address for Transmission the Ethernet Hardware*"; Nov. 1982; pp. 8; Internet ietf.org/rfc/rfc0826.txt?number=826.

S. Deering; "*ICMP Router Discover Messages*"; Sep. 1991; pp. 17; Internet ietf.org/rfc/rfc1256.txt?number=1256.

R. Droms; "*Dynamic Host Configuration Protocol*"; Oct. 1993; pp. 35; Internet ietf.org/rfc/rfc1541.txt?number=1541.

W. Simpson; "*The Point-to-Point Protocol (PPP)*"; Jul. 1994; pp. 48; Internet ietf.org/rfc/rfc1661.txt?number=1661.

H. Schulzrinne; "*RTP: A Transport Protocol For Real-Time Applications*"; Jan. 1996; pp. 67; Internet ietf.org/rfc/rfc1889.txt?number=1889.

T. Narten, et al.; "*Neighbor Discovery for IP Version 6 (IPv6)*"; Aug. 1996; pp. 73; Internet ietf.org/rfc/rfc1970.txt?number=1970.

S. Thomson, et al.; "*IPv6 Stateless Address Autoconfiguration*"; Aug. 1996; pp. 21; Internet ietf.org/rfc/rfc1971.txt?number=1971.

C. Perkins; "*IP Mobility Support*"; Oct. 1996; pp. 71; Internet ietf.org/rfc/rfc2002.txt?number=2002.

C. Perkins; "*IP Encapsulation within IP*"; Oct. 1996; pp. 13; Internet ietf.org/rfc/rfc2003.txt?number=2003.

Charles E. Perkins; "Mobile IP"; IEEE Communications Magazine; May 1997; pp. 84-99.

Yegin, et al.; "Fast Handovers for Mobile IPv6"; Internal Memo of the Internet Engineering Task Force; The Internet Society; Jul. 2001.

Calhoun, et al.; "Low Latency Handoffs in Mobile IPv4" Internal Memo of the Internet Engineering Task Force, Mobile IP Working Group; The Internet Society; Oct. 2001.

Perkins, et al.; "Optimized Smooth Handoffs in Mobile IP"; IEEE 1999; pp. 340-346.

Karagiannis, et al; "Handover Mechanisms in ATM-Based Mobile Systems"; Centre for Telematics and Information Technology, University of Twente; IEEE 1998; pp. 2572-2579.

PCT; International Search Report for PCT/SE01/02273; Apr. 15, 2002.

Deering, S. E. and Hinden, R.M.; "*Internet Protocol Version 6 (IPv6) Specification*"; IETF RFC2460; pp. 1-35; Internet ftp://ftp.isi.edu/in-notes/rfc2460.txt, no date.

Karagiannis, G.; "*Mobile IP: State of the Art*"; Internet Next Generation Report; pp. 1-63; Internet http://ing.ctit.utwente.nl/WU4/Documents/mobip_a.pdf, no date.

Perkins, C.E.; "*Mobile Networking Through Mobile IP*"; IEEE Internet Computing; 1998; pp. 1-17; Internet http://computer.org/internet/v2n1/perkins.htm.

Perkins, C. and Johnson, B.J.; "*Route Optimization in Mobile IP*"; Draft 11; pp. 1-27; draft-ietf-mobileip-optim-11.txt; Internet http://wuarchive.wustl.edu/doc/internet-drafts/draft-ietf-mobileip-optim-11.txt.Z, no date.

Conta, A. and Deering, S.; "*Generic Packet Tunneling in IPv6 Specification*"; RFC 2473, Dec. 1998; pp. 1-33; Internet ftp://ftp.isi.edu/in-notes/rfc2473.txt.

* cited by examiner

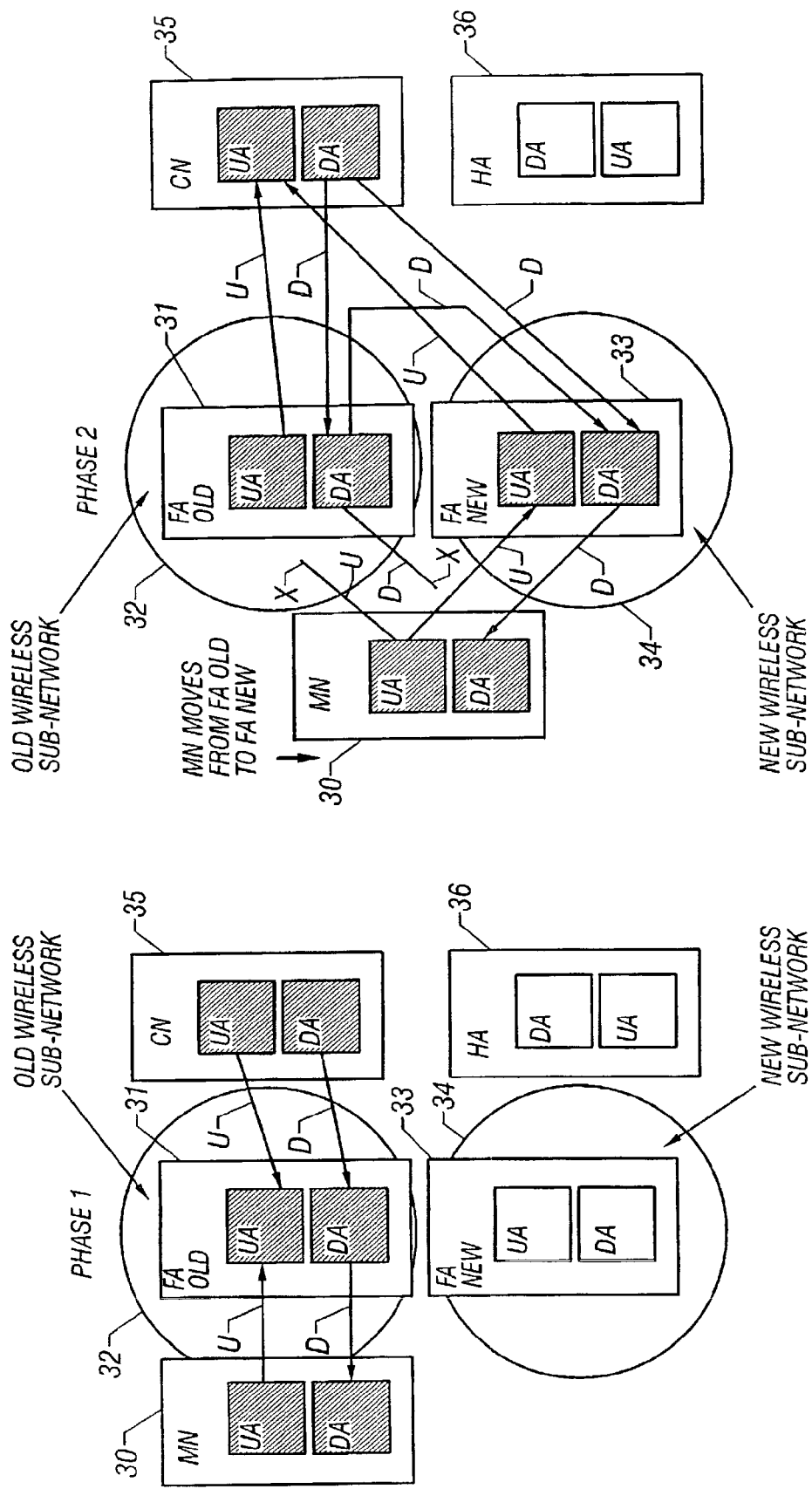

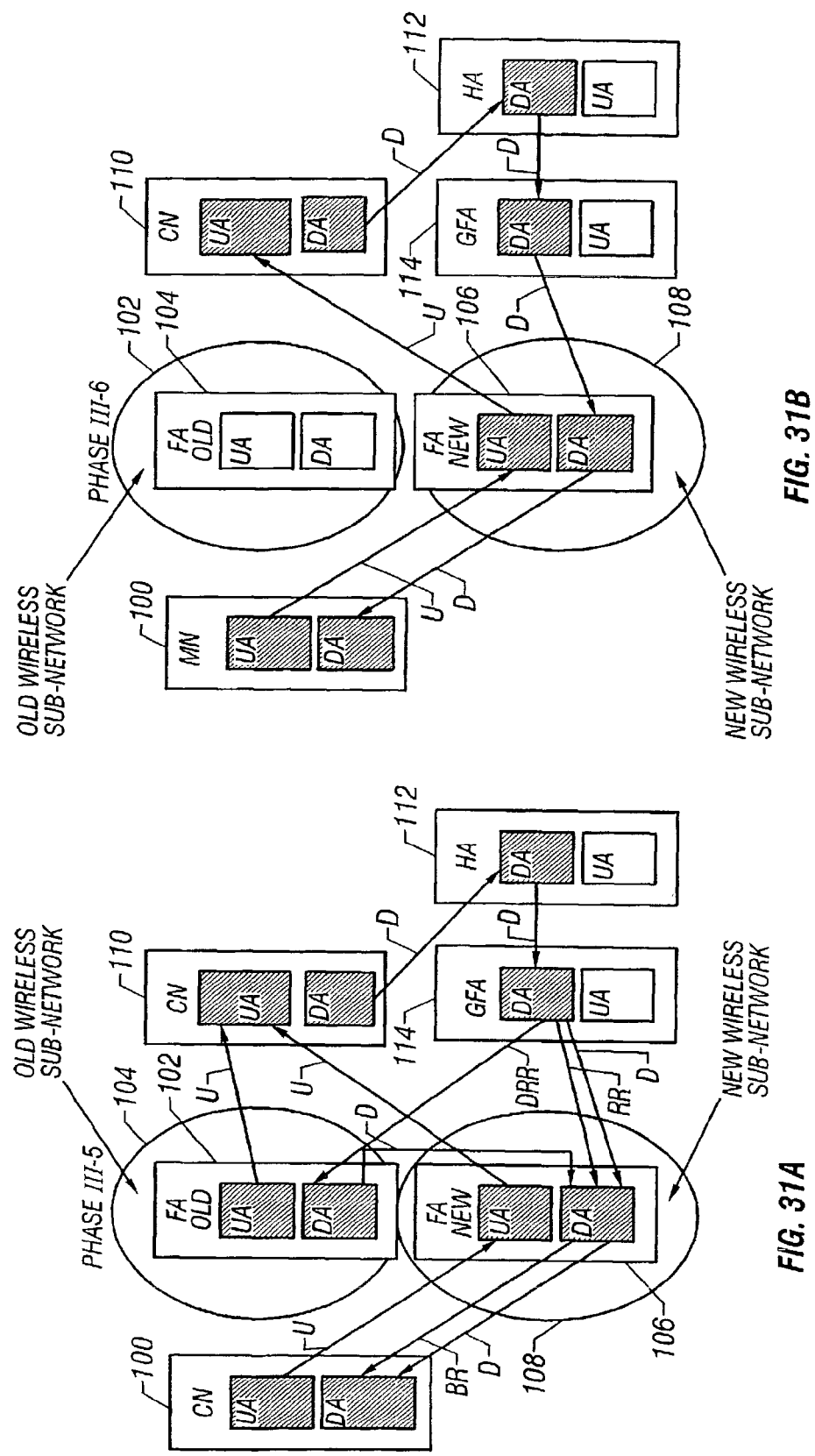

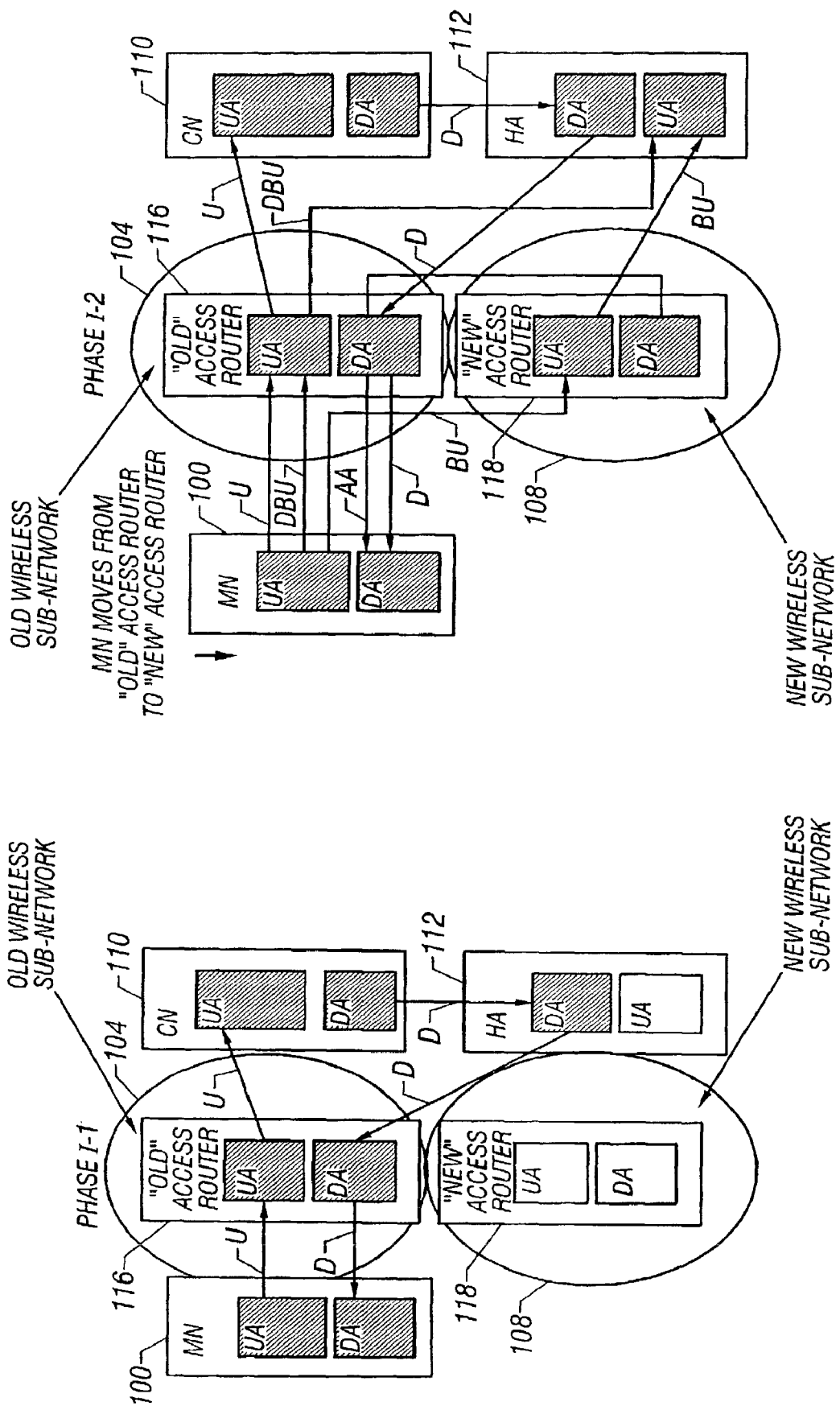

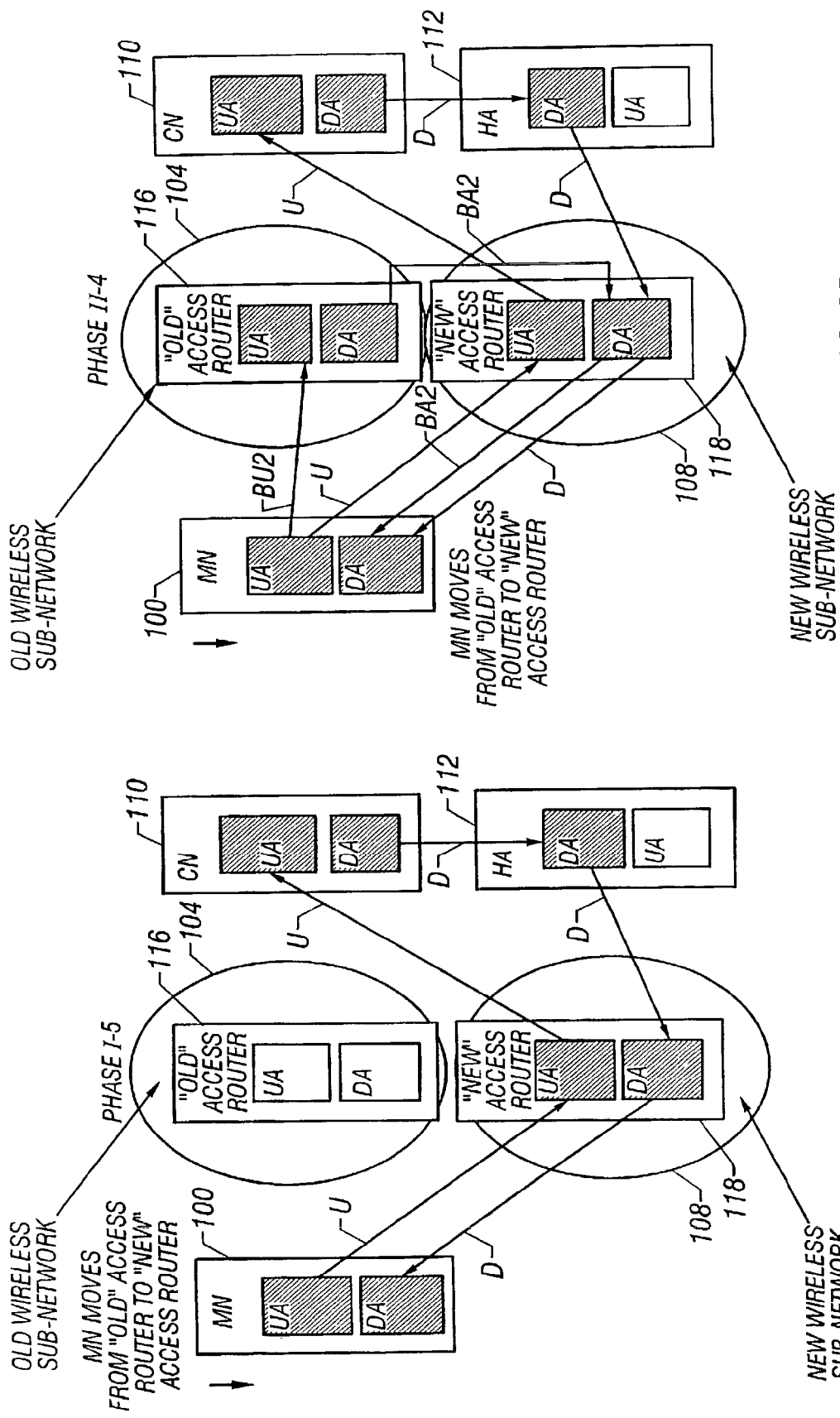

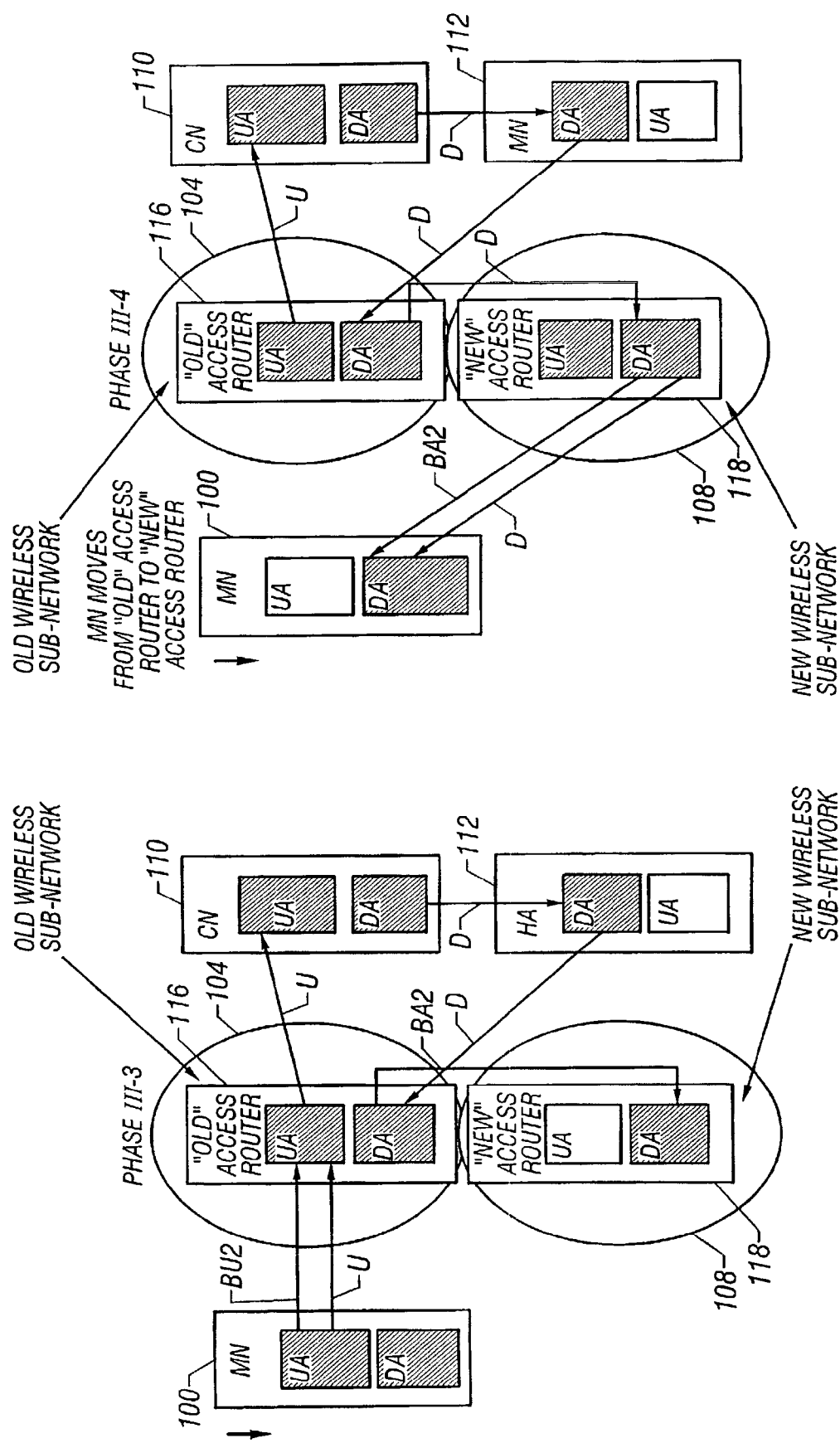

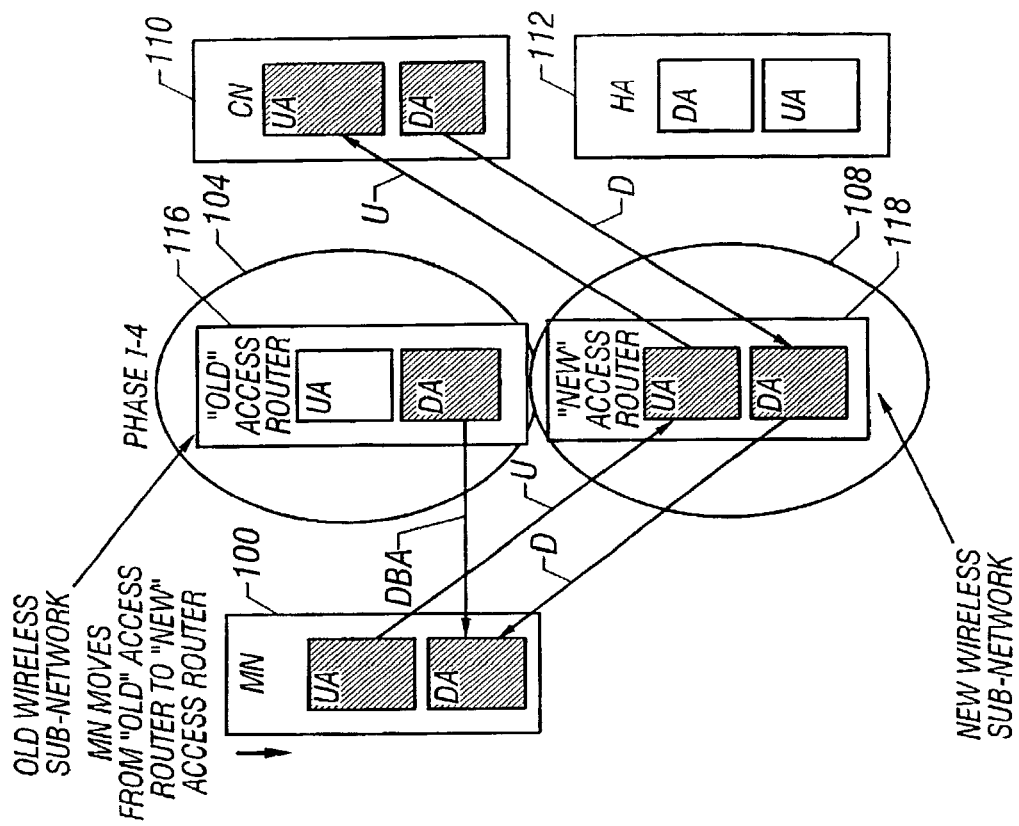
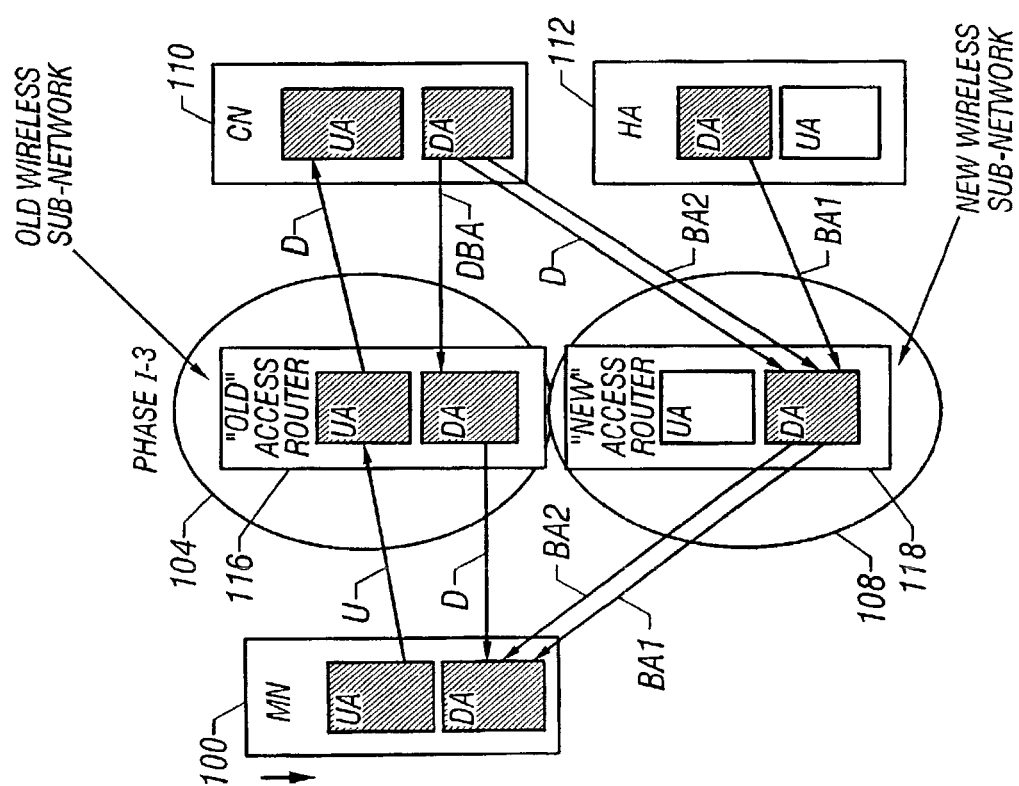
FIG. 40B
FIG. 40A

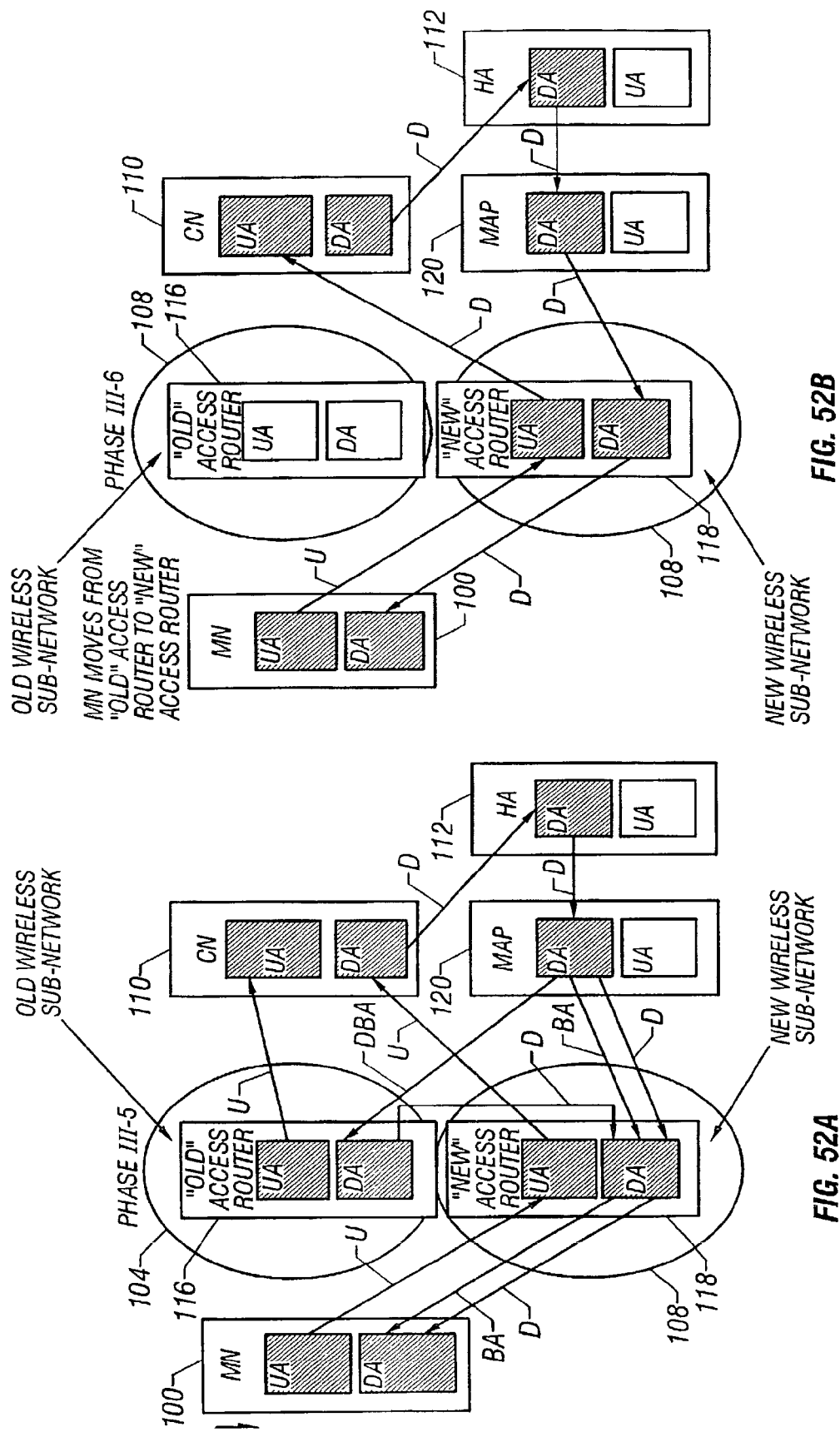

SEAMLESS HANDOFF IN MOBILE IP

CROSS REFERENCE TO RELATED APPLICATIONS

The present application is related to, claims priority from, and incorporates by reference, the subject matter disclosed in U.S. Patent Application No. 60/241,539, entitled "Seamless Handoff in Mobile IPv4 and Mobile IPv6," filed with the U.S. Patent and Trademark Office on Oct. 18, 2000.

BACKGROUND OF THE INVENTION

1. Field of the Invention

The present invention is related to mobile networking and, more particularly, to mobile networking using the Mobile IP standard.

2. Description of the Related Art

Advances in wireless communication technology have given rise to a number of wireless applications such as pagers, cellular phones, and mobile computing and networking applications. Mobile computing and networking allows a mobile device capable of connecting to a network to freely move while remaining connected to the network and to the Internet. As the mobile device moves between different networks and sub-networks, the connection to the old network or sub-network is dropped as needed, and a connection to a new network or sub-network is established. Such a handoff is made possible through an extension of the Internet Protocol (IP) referred to as Mobile IP. In general, Mobile IP creates the perception that the mobile device is always attached to the same network or sub-network even as it is moving around. Specifically, Mobile IP allows the mobile device to retain the same network or IP address regardless of the particular network or sub-network to which the mobile device is actually connected. Thus, a remote application can send data packets to the mobile device at the same IP address no matter how many handoffs (i.e., changes in network or sub-network connections) may have occurred.

Mobile IP accomplishes the above function by allowing the mobile node to use two IP addresses. The first IP address, called the home address, is static and is used to identify the mobile device when it is in its home network. A home network is the network in which the mobile device appears to be located for the rest of the network or the Internet. More formally, the home network is the network which contains the home registration of the mobile device. The second IP address, called the care-of address, is dynamic and is used to identify the mobile device when it is away from the home network. As the mobile device is handed off to each new network or sub-network, it obtains a care-of address from that network or sub-network. The mobile device is likely to use multiple different care-of addresses as it roams between different networks and sub-networks. Upon obtaining a new care-of address, the mobile device registers the new care-of address with the home network. Thereafter, the home network redirects data packets that are destined for the mobile device at its home address (in the home network) to the new care-of address.

Although Mobile IP allows the mobile device to freely move between different networks and sub-networks while appearing to maintain the same network connection, the transition is not always a seamless one. For example, when a handoff occurs in the middle of an ongoing data transfer session, some data packets may be sent to the old care-of address before registration of the new care-of address can be completed. As a result, these data packets may become lost, thereby disrupting the flow of data packets to the mobile device. Depending on the duration of the disruption, the data transfer session may be only slightly affected or severely affected. For example, where the network is particularly slow or congested (hence, registration is delayed), a large number of data packets may be lost, possibly causing the application session to terminate or otherwise fail.

Accordingly, it is desirable in a wireless access network to provide a system and method for handing off a mobile device in a substantially seamless manner.

SUMMARY OF THE INVENTION

The present invention is related to a system and method for handing off a mobile node in a seamless manner in a wireless access network. Procedures are implemented for allowing the mobile node to synchronize the handoff with a base node and a correspondent node. In this way, a seamless handoff may be achieved, since few or no data packets sent between the base node or the correspondent node and the mobile node are lost. The procedures are supported by both Mobile IPv4 and Mobile IPv6 as well as Hierarchical Mobile IPv4 and Hierarchical Mobile IPv6.

In general, in one aspect, the invention is directed to a method of handing off a mobile node from an old sub-network router to a new sub-network router in an Internet Protocol based wireless access network. The method comprises using information from a lower layer of the OSI (Open Systems Interconnection) model to notify the mobile node that a connection with the old sub-network router will be discarded within a predetermined amount of time, obtaining a new care-of address for the mobile node from the new sub-network router, and sending a request message from the mobile node to a base node via the new sub-network router requesting a new binding. The method further comprises creating a new care-of address binding in the base node, issuing a reply message from the base node to the mobile node via the new sub-network router indicating that the new care-of address binding has been created, and synchronizing a transfer of old care-of address data packets from the base node to the mobile node.

In general, in another aspect, the invention is directed to an Internet Protocol based wireless access network. The network comprises a mobile node adapted to obtain a new care-of address from a new sub-network router and to issue a request message via the new sub-network router requesting a new binding upon being notified from a lower layer of the OSI (Open Systems Interconnection) model that a connection with an old sub-network router will be discarded within a predetermined amount of time. The system further comprises a base node adapted to create the new care-of address binding upon receiving the request message from the mobile node and to issue a reply message to the mobile node via the new sub-network router indicating that the new care-of address binding has been created, wherein the mobile node and the base node are further adapted to transfer old care-of address data packets from the base node to the mobile node in a synchronized manner.

In general, in yet another aspect, the invention is directed to a method of handing off a mobile node from an old sub-network router to a new sub-network router in an Internet Protocol based wireless access network. The method comprises using information from a lower layer of the OSI (Open Systems Interconnection) model to notify the mobile node that a connection with the old sub-network router will be discarded within a predetermined amount of time, obtaining a new care-of address for the mobile node from the new sub-network router, and sending a request message from the mobile node to a base node via the new sub-network router requesting a new binding, the base node being a predetermined one of a home agent, a gateway foreign agent, and a mobility anchor point. The method further comprises the steps of creating a new care-of address binding in the base node, issuing a reply message from the base node to the mobile node via the new sub-network router indicating that the new care-of address binding has been created, and synchronizing a transfer of old care-of address data packets from the base node to the mobile node.

Advantages of the invention include a faster handoff wherein the number of data packets that are lost during a disruption in data transfer can be minimized or eliminated. Moreover, the invention provides a more efficient handoff since no additional network bandwidth is required during the disruption duration. Yet another advantage is that the invention does not require the establishment and maintenance of simultaneous bindings. Other advantages of the invention will become apparent from the following description and the claims.

BRIEF DESCRIPTION OF THE DRAWINGS

A more detailed understanding of the method and system of the present invention may be had by reference to the following detailed description when taken in conjunction with the drawings, wherein:

FIGS. 6A & 6B illustrate the flow of data packets during a smooth handoff in Mobile IPv4 where route optimization is used;

FIGS. 11A & 11B to 15A & 15B illustrate the flow of data packets during a handoff in Mobile IPv4 according to some embodiments of the invention where no route optimization is used, and the mobile device is capable of simultaneously accessing two wireless networks;

FIGS. 16A & 16B to 17A & 17B illustrate the flow of data packets during a handoff in Mobile IPv4 according to some embodiments of the invention where no route optimization is used, and the mobile device is capable of accessing only a single wireless network at a time;

FIGS. 18A & 18B to 22A & 22B illustrate the flow of data packets during a handoff in Mobile IPv4 according to some embodiments of the invention where route optimization is used, and the mobile device is capable of simultaneously accessing two wireless networks;

FIGS. 23A & 23B to 24A & 24B illustrate the flow of data packets during a handoff in Mobile IPv4 according to some embodiments of the invention where route optimization is used, and the mobile device is capable of accessing only a single wireless network at a time;

FIGS. 25A & 25B to 29A & 29B illustrate the flow of data packets during a handoff in Hierarchical Mobile IPv4 according to some embodiments of the invention where the route optimization is not used and the mobile device is capable of simultaneously accessing two wireless networks;

FIGS. 30A & 30B to 31A & 31B illustrate the flow of data packets during a handoff in Hierarchical Mobile IPv4 according to some embodiments of the invention where route optimization is not used and the mobile device is capable of accessing only a single wireless network at a time;

FIGS. 32A & 32B to 36A & 36B illustrate the flow of data packets during a handoff in Mobile IPv6 according to some embodiments of the invention where route optimization is not used and the mobile device is capable of simultaneously accessing two wireless networks;

FIGS. 37A & 37B to 38A & 38B illustrate the flow of data packets during a handoff in Mobile IPv6 according to some embodiments of the invention where no route optimization is used and the mobile device is capable of accessing only a single wireless network at a time;

FIGS. 39A & 39B to 43A & 43B illustrate the flow of data packets during a handoff in Mobile IPv6 according to some embodiments of the invention where route optimization is used and the mobile device is capable of simultaneously accessing two wireless networks;

FIGS. 44A & 44B to 45A & 45B illustrate the flow of data packets during a handoff in Mobile IPv6 according to some embodiments of the invention where route optimization is used and the mobile device is capable of accessing only a single wireless network at a time;

FIGS. 46A & 46B to 50A & 50B illustrate the flow of data packets during a handoff in Hierarchical Mobile IPv6 according to some embodiments of the invention where route optimization is not used and the mobile device is capable of simultaneously accessing two wireless networks; and FIGS. 51A & 51B to 52A & 52B illustrate the flow of data packets during a handoff in Hierarchical Mobile IPv6 according to some embodiments of the invention where the mobile device is capable of accessing only a single wireless network at a time.

DETAILED DESCRIPTION OF THE DRAWINGS

Figure 1:
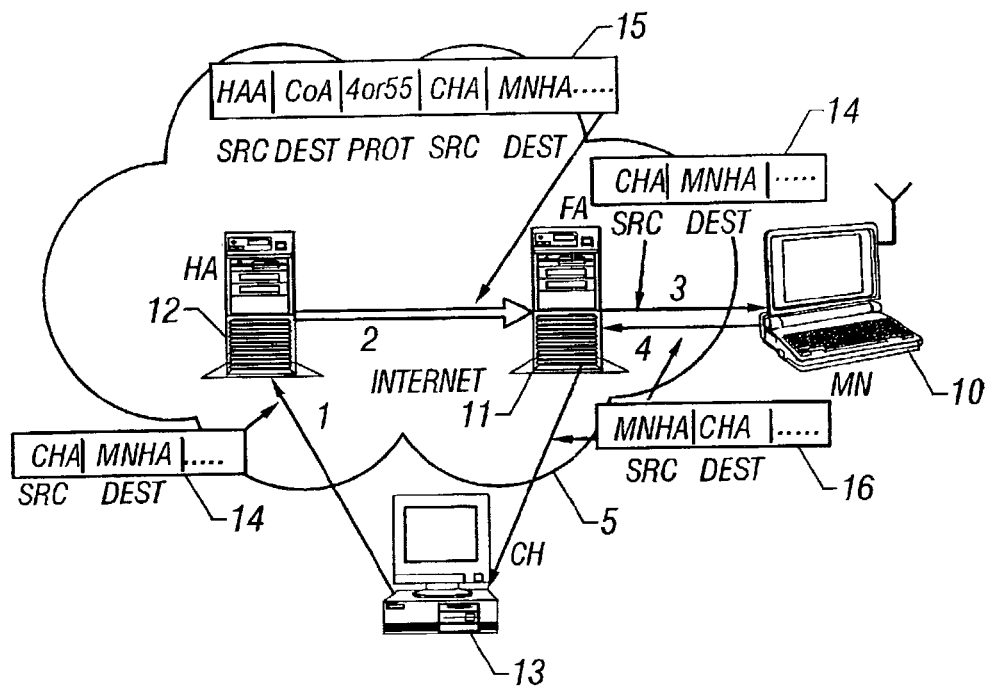
FIG. 1 illustrates the flow of data packets in a wireless access network.

Following is a detailed description of the drawings wherein reference numerals for like and similar elements are carried forward. For purposes of this description, a "network" refers to a wireless access network such as the Global System for Mobile Communication (GSM) that is capable of connecting let users therein to the Internet. A "sub-network" refers to a smaller portion of the network through which a network connection may be established. Also, the terms "connected" and "connection," and "attached" and "attachment" may be used interchangeably to mean a wireless link to a network or sub-network.

Embodiments of the invention provide a system and method for performing seamless handoff in a mobile networking environment. In some embodiments, the handoff involves a mobile node being notified that a connection with an old wireless sub-network will be discarded within a predetermined amount of time. The mobile node thereafter obtains a new care-of address from a new wireless subnetwork, and sends a request message to a base node (e.g., home agent) requesting a new binding. The base node creates a new care-of address binding and issues a reply message to the mobile node indicating that the new care-of address binding has been created. The transfer of old care-of address data packets from the base node to the mobile node is thereafter synchronized to achieve a seamless handoff.

As mentioned previously, Mobile IP is an extension of IP and is supported by both IPv4 and IPv6. A detailed description of Mobile IP support in IPv4 can be found in "IP Mobility Support," C. Perkins, ed., IETF RFC 2002, October 1996. Likewise, see Johnson, D., B., Perkins, C., "Mobility Support in IPv6," Internet draft, draft-ietf-mobileip-ipv6-12.txt, Work in progress, April 2000, for a detailed description of Mobile IP support in IPv6.

Hierarchical Mobile IP is an extension of Mobile IP designed to handle regional traffic. Support for Hierarchical Mobile IP in IPv4 and IPv6 is described, respectively, in Gustafsson E., Jonsson A., Perkins C., "Mobile IP Regional Registration," Internet draft, draft-ietf-mobileip-reg-tunnel-02.txt, Work in progress, March 2000; and El Malki K., Soliman H., "Hierarchical Mobile IPv4/v6 and Fast Handoff," Internet draft, draft-elmalki-soliman-hmipv4v6-00.txt, Work in progress, March 2000.

Mobile IP support in IPv4, or Mobile IPv4, is substantially transparent to the transport and higher layer protocols (e.g., TCP) and does not require any significant changes to Internet hosts and routers that are currently being used. The key feature of Mobile IPv4 is that all the functionality required for processing and managing mobility information are embedded in well-defined entities: the home agent (HA), foreign agent (FA), and mobile node (MN).

The home agent is a node, typically a router, on the home network that effectively allows the mobile node to be reachable by the rest of the Internet at its home address, even when the mobile node is not attached to its home network. The foreign agent is a node, also typically a router, on a foreign network that can assist the mobile node in receiving data packets delivered to the care-of address. The home agent and the foreign agent are often referred to as mobility agents, which is a general term for nodes that provide mobility support services to the mobile node.

The mobile node is typically a mobile device such as a personal digital assistant, handheld computer, cellular phone, and the like, that is capable of establishing a wireless connection to one or more networks and, hence, to the Internet. Finally, for reference purposes, the node that is communicating with the mobile node is called the correspondent host (CH) or sometimes correspondent node (CN). The correspondent host or node may be another mobile node, or it may be a non-mobile (e.g., fixed) node such as a desktop computer, a workstation, and the like.

Referring now to FIG. 1, when the mobile node 10 roams into an area covered by a foreign network, it obtains a care-of address from the foreign agent 11 of the network. This new care-of address is subsequently registered with the mobile node's home agent 12. Data packets sent from the correspondent host 13 to the mobile node 10 are then routed through the foreign agent 11 along the path indicated by reference numerals 1, 2 and 3, while data packets sent from the mobile node 10 to the correspondent host 13 follow the path indicated by reference numerals 4 and 5.

More specifically, data packets sent by the correspondent host 13 to the mobile node 10 are first routed to the home agent 12 of the mobile node along path 1. As the mobile node 10 is not presently attached to its home network, the home agent 12 redirects the data packet along path 2 to the foreign agent 11 via the care-of address. After receiving the redirected data packets, the foreign agent 11 sends them along path 3 to complete the delivery to the mobile node 10. This routing is often referred to as "triangle routing" due to the additional leg that the data packets travel through the home agent 12 along path 1.

Similarly, data packets going from the mobile node 10 to the correspondent host 13 are sent to the foreign agent 11 along path 4. From there, however, the data packets are routed directly to the correspondent host 13 along path 5 without going through the home agent 12.

The above routing can be realized in Mobile IPv4 by using three basic mechanisms: discovering the care-of address, registering the care-of address, and tunneling to the care-of address.

The care-of address discovery procedure used in Mobile IP is based on the standard ICMP (Internet Control Message Protocol) router advertisement specified in "ICMP Router Discovery Messages," S. E. Deering, ed., IETF RFC 1256, September 1991. In Mobile IP, standard router advertisements are extended to include the care-of address. These extended router advertisements are called agent advertisements. Home agents and foreign agents usually broadcast their agent advertisements on a periodic basis (e.g., once a second or every few seconds). If a mobile node needs to get an agent advertisement and does not wish to wait for the periodic broadcast, it can broadcast its own solicitation for the agent advertisement. Any home agent or foreign agent receiving the solicitation can thereafter respond by broadcasting an agent advertisement. The mobile node can also obtain a new care-of address via the Dynamic Host Configuration Protocol (DHCP) or Point-to-Point Protocol (PPP) procedures. For a description of the DHCP and PPP procedures, see "Dynamic Host Configuration Protocol," IEFT RFC 1541, October 1993; and "The Point-to-Point Protocol (PPP)," Simpson, W., ed., IETF RFC 1661, July 1994.

Figure 2:
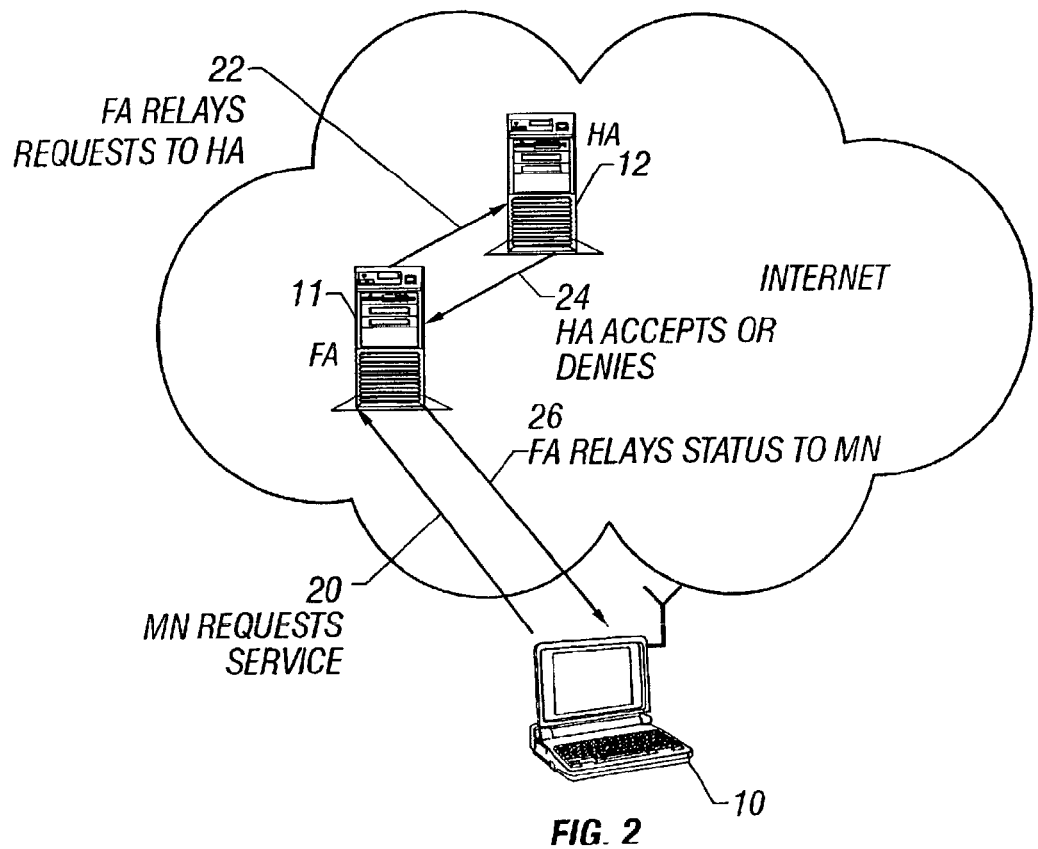
FIG. 2 illustrates the registration of a mobile device in a wireless access network.

After the mobile node 10 obtains the care-of address through the discovery procedure, it notifies the home agent 12 of the care-of address. This can be accomplished by using the registration procedure, shown in FIG. 2. The registration procedure involves the mobile node, with the assistance of the foreign agent 11, sending a registration request (at 20) using the User Datagram Protocol (UDP), which request is relayed (at 22) to the home agent 12. The registration request includes the home address of the mobile node, the newly obtained care-of address, and a registration lifetime which tells the home agent 12 how long the home address is to be associated with the care-of address. The home address, care-of address, and registration lifetime information is collectively referred to as a "binding" for the mobile node. Thus, a registration request can be considered to be a type of "binding update" as it contains new information regarding the care-of address of the mobile node. Once the home agent 12 receives and approves (at 24) the registration request, it adds the care-of address information to its internal routing tables. The foreign agent 11 thereafter forwards a registration reply (at 26) back to the mobile node 10 to complete the registration process.

After the care-of address has been registered with the home agent, any data packet sent to the mobile node at its home address is redirected or "tunneled" by the home agent to the mobile node at the care-of address. Tunneling is performed by encapsulating the original data packet behind a new packet header called a "tunnel header" that effectively overrides the home address in the original packet header.

(See "IP encapsulation within IP," C. Perkins, IETF RFC 2003, October 1996.) The default encapsulation mechanism in IPv4 is called IP-within-IP. In IP-within-IP, the tunnel header includes the home agent's address as the new source address, the care-of address as the new destination address, and a "4" as the higher level protocol number. The "4" indicates to all receiving nodes that the next protocol header for the data packet is again an IP header. The encapsulated data packet is then delivered to the foreign agent via the care-of address to complete the tunneling process. Upon receiving the encapsulated packet, the foreign agent applies the reverse transformation, i.e., stripping off the tunnel header to recover the original data packet The recovered data packet is then forwarded to the mobile node wherein the receipt of the original home address allows the data packet to be processed in a proper manner.

In some cases, however, a "55" may be used as the protocol number to indicate "minimal encapsulation" instead of IP-within-IP encapsulation. (See "Minimal encapsulation within IP," C. Perkins, IETF RFC 2004, October 1996.) Processing for the minimal encapsulation header is slightly more complicated than that for IP-within-IP because some of the information from the tunnel header is combined with the information in the minimal-encapsulation header to reconstitute the original packet header. The advantage of using such minimal encapsulation is, of course, reduced header overhead.

Referring back to FIG. 1 the packet headers for the data packets being routed along the paths 1-5 are shown. As can be seen, in path 1, the data packets have packet headers 14 that include the correspondent host address (CHA) as the source address and the mobile node home address (MNHA) as the destination address. In path 2, the original data packets are now encapsulated behind tunnel headers 15, which include the home agent's address (HAA) as the new source address, the care-of address (C-oA) as the new destination address, and either "4" or "55" as the protocol number. In path 3, the tunnel headers are removed and the original data packets in packet headers 14 are recovered. In paths 4 and 5, the data packets are routed directly from the source (MNHA) to the destination (CHA) without any change to the packet headers 15.

As a more efficient alternative to the above triangle routing, Mobile IPv4 was extended to allow data packets to be routed from a correspondent host directly to a mobile node, i.e., without going through the home agent first. These extensions are referred to generally as route optimization, a detailed description of which can be found in Perkins, C., Johnson, B. J., "Route Optimization in Mobile IP," Internet draft, draft-ietf-mobileip-optim-09.txt, Work in progress, February 2000.

In route optimization, the correspondent host can receive a binding update message that is sent by the mobile node's home agent (instead of the mobile node itself) that contains the mobile node's care-of address. The binding update specifies the association of the mobile node's home address with its care-of address, along with the remaining lifetime of that association. This new binding is then stored by the correspondent host as a cache entry and subsequently used to tunnel data packets directly to the care-of address, thus bypassing the mobile node's home agent. In this way, the triangle routing procedure explained earlier is avoided. However, in the initial phase of route optimization, data packets sent by the correspondent host will still need to use triangle routing until the binding update message sent by the mobile node's home agent is received by the correspondent host.

In addition to the binding update message, the route optimization procedure also uses a binding warning control message, a binding request message, and a binding acknowledgment message. The first of these messages, the binding warning control message, is usually sent by either the mobile node or the correspondent host to the home agent to indicate that the correspondent host seems to be unaware of the mobile node's new care-of address.

The binding request message, on the other hand is sent by a correspondent host to the home agent at the moment the correspondent node determines that its binding should be initiated or refreshed. The home agent responds by sending a binding update message to the correspondent host, including the care-of address of the mobile node. If the home agent for some reason cannot find the mobile node's care-of address (e.g., the mobile node is already in its home network), then the home agent may send a binding update message wherein the care-of address is set equal to the mobile node's home address, and the association lifetime is set to zero. The correspondent host then deletes the binding cache entry for that particular mobile node.

The third message, the binding acknowledgment message, confirms that a binding update message has been received and can be requested by a mobile node from a correspondent host that has received the binding update message.

Mobile IP support in IPv6, or Mobile IPv6, uses the knowledge and experiences gained from the design and development of Mobile IPv4 together with several new features. (See Deering, S., E., Hinden, R., M., "Internet protocol version 6 (IPv6) specification," Internet-draft, draft-ietf-ipngwg-ipv6-spec-v2-00.txt, Work in progress.) The main differences between Mobile IPv4 and Mobile IPv6 are the integrated support for route optimization, neighbor discovery, address autoconfiguration, source routing, anycast, and control traffic piggybacking.

In Mobile IPv6, route optimization is built in as a integral part of the IPv6 protocol. In contrast, the Mobile IPv4 route optimization feature is added on as an optional set of extensions that may not be supported by all IP nodes. However, this integration does not mean that the Mobile IPv6 route optimization option will always be applied, as a mobile node may still decide to use or not use this option.

Furthermore, in Mobile IPv6, there is no need to deploy foreign agents because the functionality of the foreign agents can be accomplished by IPv6 enhanced features such as neighbor discovery (see "Neighbor Discovery for IP version 6 (IPv6)," T. Narten, E. Nordmark, W. A. Simpson, IETF RFC 1970, August 1996) and address autoconfiguration (see "IPv6 stateless address autoconfiguration," S. Thomson, T. Narten, IETF RFC 1971, August 1996).

Mobile IPv6 also uses a source routing feature which makes it possible for a correspondent host to send data packets to a mobile node that is away from the home network using an IPv6 routing header instead of IP-within-IP encapsulation. (Recall that Mobile IPv4 uses IP-within-IP encapsulation for all data packets.) However, in Mobile IPv6, the home agents may still use IP-within-IP encapsulation where needed for tunneling, for example, during the initial phase of the binding update procedure.

Another difference is in Mobile IPv6, the data packets that arrive at the home network, and that are destined for a mobile node that is away from the home network, are intercepted by the mobile node's home agent using IPv6 neighbor discovery instead of using an address resolution protocol (see "An Ethernet address resolution protocol: Or converting network protocol addresses to 48-bit Ethernet addresses for transmission on Ethernet hardware," D. C. Plummmer, IETF RFC 826, November 1982) as is the case in Mobile IPv4.

Yet another difference is in Mobile IPv6, a new routing procedure is defined called "anycast," which is used as a dynamic home agent address discovery mechanism. This mechanism returns one single reply to the mobile node's address discovery request, as opposed to a separate reply being returned from each home agent on the mobile node's home network, as is the case using directed broadcast in Mobile IPv4. Thus, the Mobile IPv6 mechanism is more efficient and more reliable because only one data packet needs to be returned to the mobile node.

Finally, all Mobile IPv6 control traffic can be piggybacked on any existing IPv6 data packets using the IPv6 destination options. In contrast, separate UDP packets are required for each control message in Mobile IPv4 and its route optimization extensions.

Despite the various mobility enhancing features in both Mobile IPv4 and Mobile IPv6, handoffs that occur during an ongoing data transfer session are not always seamless, particularly when a change in the network attachment is required. Such handoffs are frequently referred to as macro-mobility handoffs and involve a mobile node moving from one sub-network ("old sub-network" hereinafter) to another sub-network ("new sub-network" hereinafter). When a macro-mobility handoff occurs, a certain number of data packets that were in the process of being delivered to the mobile node via the old sub-network will be unable to reach their intended destination. Depending on the disruption duration and the application, the user may be able to notice the disruption and, therefore, this type of handoff is not considered to be seamless. A seamless handoff occurs when none of the nodes that are involved in the handoff notice any disruption in the application data stream.

Following is a description of various handoff scenarios under conventional Mobile IPv4 and Mobile IPv6. It should be noted that only a limited number of IP nodes are shown in the handoff scenarios for clarity purposes, and that a person of ordinary skill in the art will recognize that, in practice, additional IP nodes may be used.

Figures 3A, 3B:
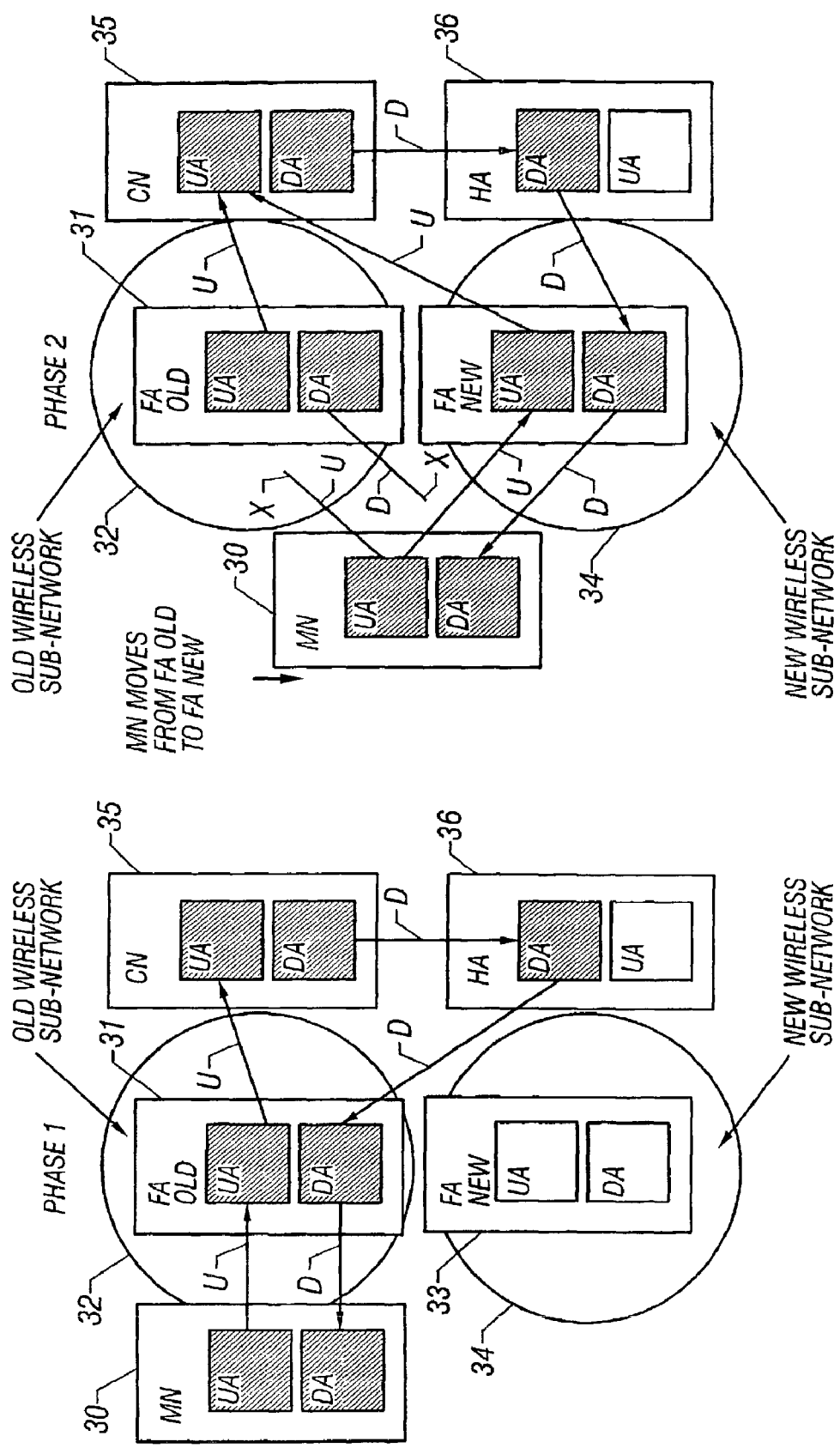
FIGS. 3A & 3B illustrate the flow of data packets during a handoff in Mobile IPv4.

Referring now to FIGS. 3A & 3B, a macro-mobility handoff in Mobile IPv4 is shown with reference to a number of phases. The nodes involved include a mobile node 30, an old foreign agent 31 in an old wireless sub-network 32, a new foreign agent 33 in a new wireless sub-network 34, a correspondent node 35, and a home agent 36. Each one of the mobile node 30, old and new foreign agents 31 and 33, correspondent node 35, and home agent 36 has at least one upstream data buffer UA and downstream data buffer DA. Phase 1 depicts an ongoing data transfer session prior to a macro-mobility handoff. Upstream data packets U are sent by the mobile node 30 through the old foreign agent 31 to the correspondent node 35, and downstream data packets D are sent by the correspondent node 35 through the old foreign agent 31 to the mobile node. Phase 2 depicts the same ongoing data transfer session, but after a macro-mobility handoff has occurred. Upstream data packets U that were subsequently sent (i.e., sent after the handoff) from the mobile node 30 are routed through the new foreign agent 33 to the correspondent node 35, and subsequently sent downstream data packets D from the correspondent node 35 are routed through the new foreign agent 33 to the mobile node 30.

However, the macro-mobility handoff scenario of FIGS. 3A & 3B, which uses the so-called triangle routing, is not able to solve the seamless handoff issue. Previously sent (i.e., sent before the handoff) upstream data packets U that were already in transition to the old foreign agent 31 will be lost (denoted as "X") as a result of the mobile node's change in network attachment from the old sub-network to the new sub-network. Likewise, previously sent downstream data packets D that were already in transition to the mobile node 30 will be lost when the wireless link connection between mobile node and the old sub-network deteriorates very badly.

Referring now to FIGS. 4A & 4B and FIGS. 5A & 5B, macro-mobility handoff in Mobile IPv6 suffers from the same seamless handoff issues as in Mobile IPv4. The main difference between the Mobile IPv4 and Mobile IPv6 is that Mobile IPv6 adds the use of a temporary home agent 40 and substitutes old and new access routers for the old and new foreign agents, respectively.

In Mobile IPv6, each correspondent node is capable of supporting the route optimization option, although the mobile node may decide not use this option. Therefore, the macro-mobility handoff can be accomplished either using the route optimization option (FIGS. 4A & 4B) or not using this option (FIG. 5A & 5B). This handoff procedure, compared to Mobile IPv4, is enhanced to prevent the situation where a certain number of data packets that were on their way to the mobile node via the old sub-network will not be able to reach their intended destination. The procedure calls for the mobile node to identify, select, and register (using a binding update procedure) with a temporary home agent in the old sub-network that will be used to forward data packets that were destined for the mobile node's old care-of address to the new one.

The temporary home agent, typically a router, can be identified and selected by using two different methods. In the first method, the mobile node stores the information obtained from the router advertisements sent by those routers that are capable of being used as home agents and that are located in the old wireless sub-network. This information is usually stored in a home agent list that can be used to identify a temporary home agent. The second method is used when the mobile node is unable to identify any home agent in its old wireless sub-network. In that case, a temporary home agent can be identified using the Dynamic Home Agent Discovery procedure by sending an ICMP home agent address discovery request to the old wireless sub-network. The first home agent in the old wireless sub-network to receive this message responds by sending its IP address to the mobile node using an ICMP home agent address discovery reply message.

Figures 4A, 4B:
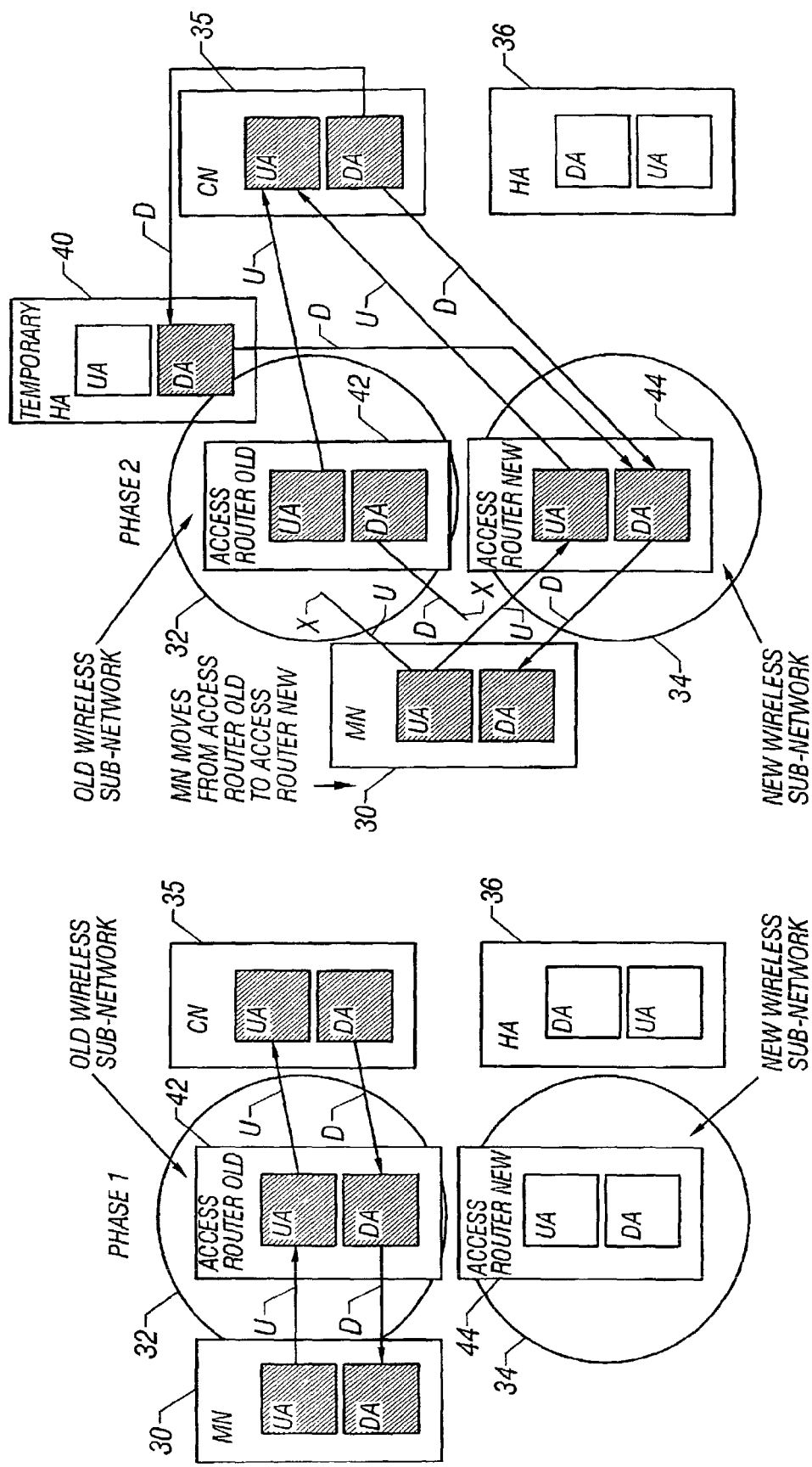
FIGS. 4A & 4B illustrate the flow of data packets during a handoff in Mobile IPv6 where route optimization is used.
Figures 5A, 5B:
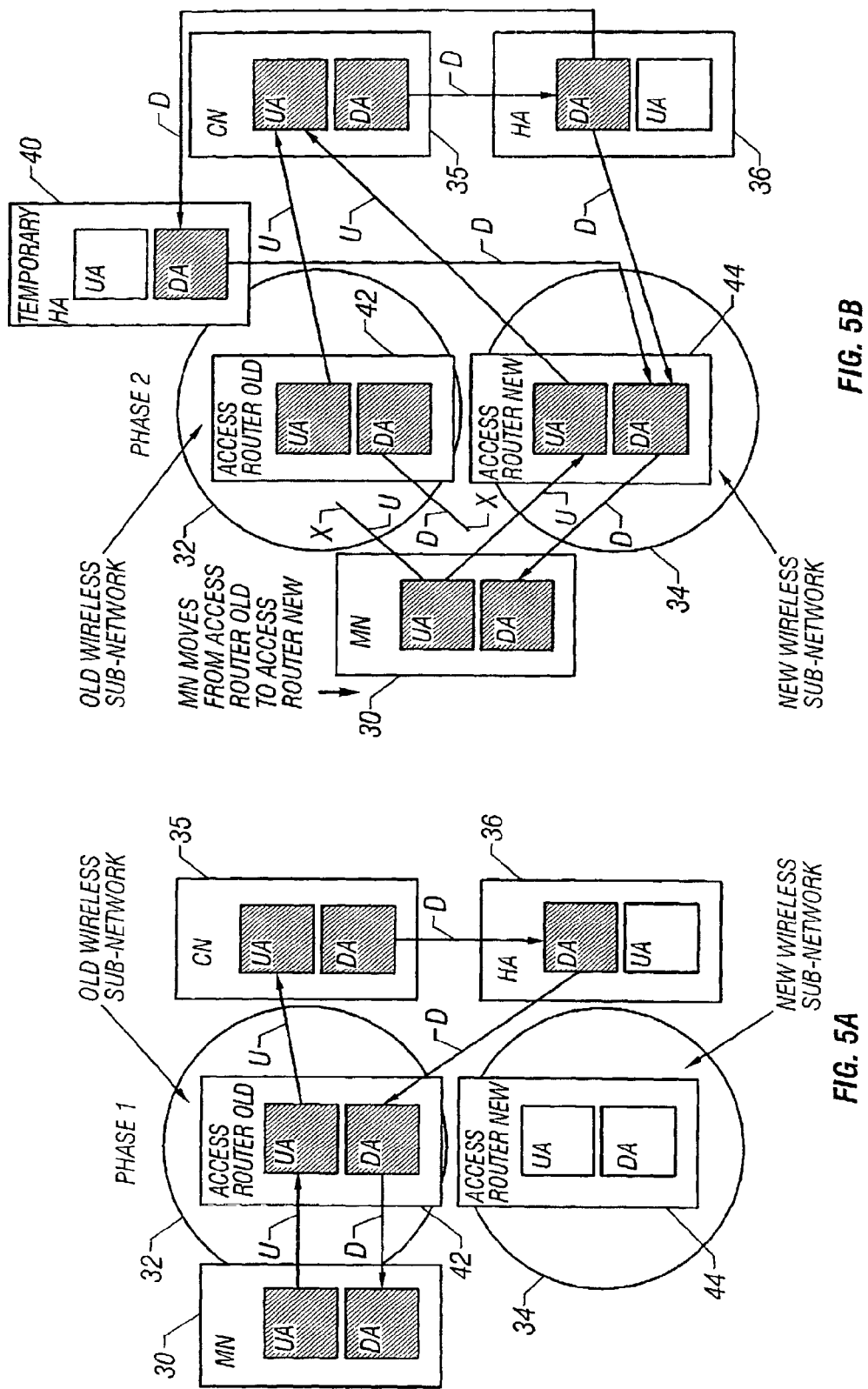
FIGS. 5A & 5B illustrate the flow of data packets during a handoff in Mobile IPv6 where no route optimization is used.

As alluded to above, FIGS. 4A & 4B illustrate a scenario where route optimization is used to route the upstream and downstream data packets directly between the mobile node 30 and the correspondent node 35 via the old access router 42 (see Phase 1). In other words, there is no triangle routing through the home agent 36 first. When the mobile node 30 changes network attachment (see Phase 2), the subsequently sent upstream and subsequently sent downstream data packets are routed through the new access router 44 as shown. The previously sent downstream data packets, on the other hand, are routed through the temporary home agent 40, which forwards these data packets to the new access router 44.

FIGS. 5A & 5B illustrate a scenario similar to the one in FIGS. 4A & 4B except no route optimization is used. Thus, referring to Phase 2 of FIG. 5B, both the previously sent downstream data packets and subsequently sent downstream data packets from the correspondent node 35 are routed to the home agent 36 first. From there, the subsequently sent downstream data packets are routed directly to the new access router 44, whereas the previously sent downstream data packets are routed through the temporary home agent 40 first, then to the new access router 44.

The degree of success of the foregoing Mobile IPv6 macro-mobility handoff procedures depends on the speed with which the identifying, selecting and registering with the temporary home agent can be completed in the old wireless sub-network. If the network is particularly slow or congested, a significant number of data packets may still be lost.

Thus, as demonstrated above, the macro-mobility handoff procedure in both Mobile IPv4 and Mobile IPv6 suffer from a lack of seamless handoff. Several solutions have been presented to try and solve this lack of seamless handoff, all of which are based on either a smooth handoff procedure or a multicasting (bi-casting) procedure.

Referring now to FIGS. 6A & 6B, the smooth handoff procedure used in Mobile IPv4 is similar to the Mobile IPv6 macro-mobility handoff procedure using the route optimization option (FIGS. 4A & 4B). The main difference between the two procedures is that in place of the temporary home agent 36, the smooth handoff procedure uses the old foreign agent 31 to forward the previously sent downstream data packets, which were destined for the old care-of address, to the new care-of address (see Phase 2 of FIG. 6B). However, if the speed with which the mobile node 30 registers its new care-of address with the old foreign agent 31 is slow, a significant number of previously sent downstream data packets D may still be lost.

Figure 7B:
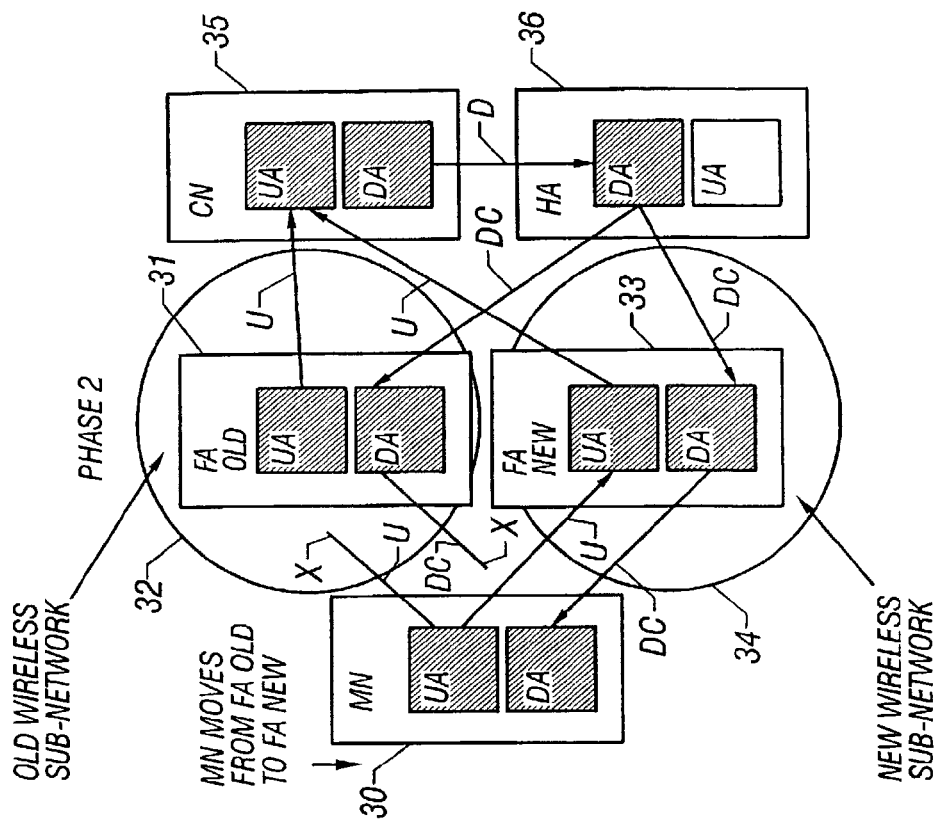
FIGS. 7A & 7B illustrate the flow of data packets during a fast handoff in Mobile IPv4 where multicasting is used.
Figure 7A:
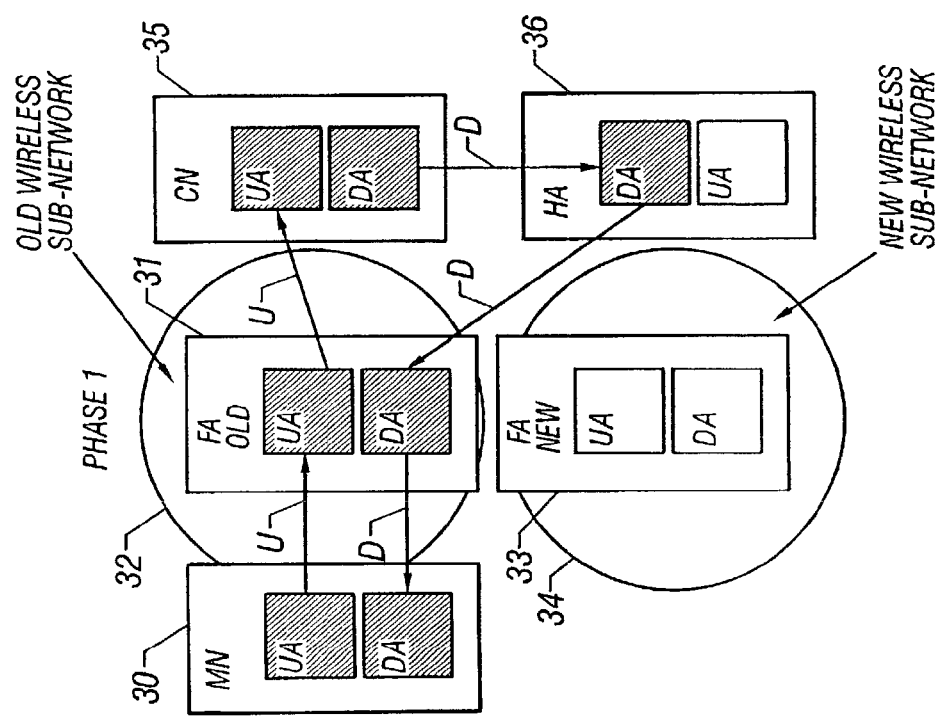

The multicasting procedure, as shown in FIGS. 7A & 7B, is mainly used in combination with the conventional Mobile IPv4 protocol. During macro-mobility handoff, all downstream data packets from the home agent 36 are multicasted (denoted by "DC") to both the old and new wireless sub-networks 34 (see Phase 2 of FIG. 7B). This procedure is initiated by the mobile node 30 when it recognizes that it has moved (or is going to move) to the new wireless sub-network 34. The mobile node 30 then registers its new care-of address with the home agent 36 by using a simultaneous binding option in the home agent 36 wherein the binding for the old care-of address is kept, while a new binding for the new care-of address is created. Thus, the home agent 36 copies each downstream data packet that is destined for the mobile node 30 and sends a copy of the data packet to both the old and new wireless sub-network 34.

The Hierarchical Mobile IPv4 protocol introduces a new node called the gateway foreign agent (GFA) (see Gustafsson E., Jonsson A., Perkins C., "Mobile IP Regional Registration," Internet draft, draft-ietf-mobileip-reg-tunnel-02.txt, Work in progress, March 2000). This network entity is used to manage the mobile node registrations in a certain region which may include more than one foreign agent. Specifically, it provides the mobile node with the ability to register its care-of address for the entire region, i.e., perform a regional registration in the new wireless sub-network. When the mobile node arrives in a new wireless sub-network that is capable of supporting regional registrations, it registers the care-of address of the gateway foreign agent located in this wireless sub-network with the home agent. The gateway foreign agent will then have a binding of the mobile node's care-of address and its home address in a visitors list. If the mobile node afterwards moves to another foreign agent that is also located in the region managed by the gateway foreign agent, the binding with the mobile node's home agent does not need to be changed because the care-of address that is registered at the home agent is already the gateway foreign agent's address. Therefore, the home agent does not need to be informed of any mobile node movements that take place within the region managed by the gateway foreign agent. However, as in the previous scenarios, handoff performance will depend on the speed with which registrations are completed.

Figures 8A, 8B:
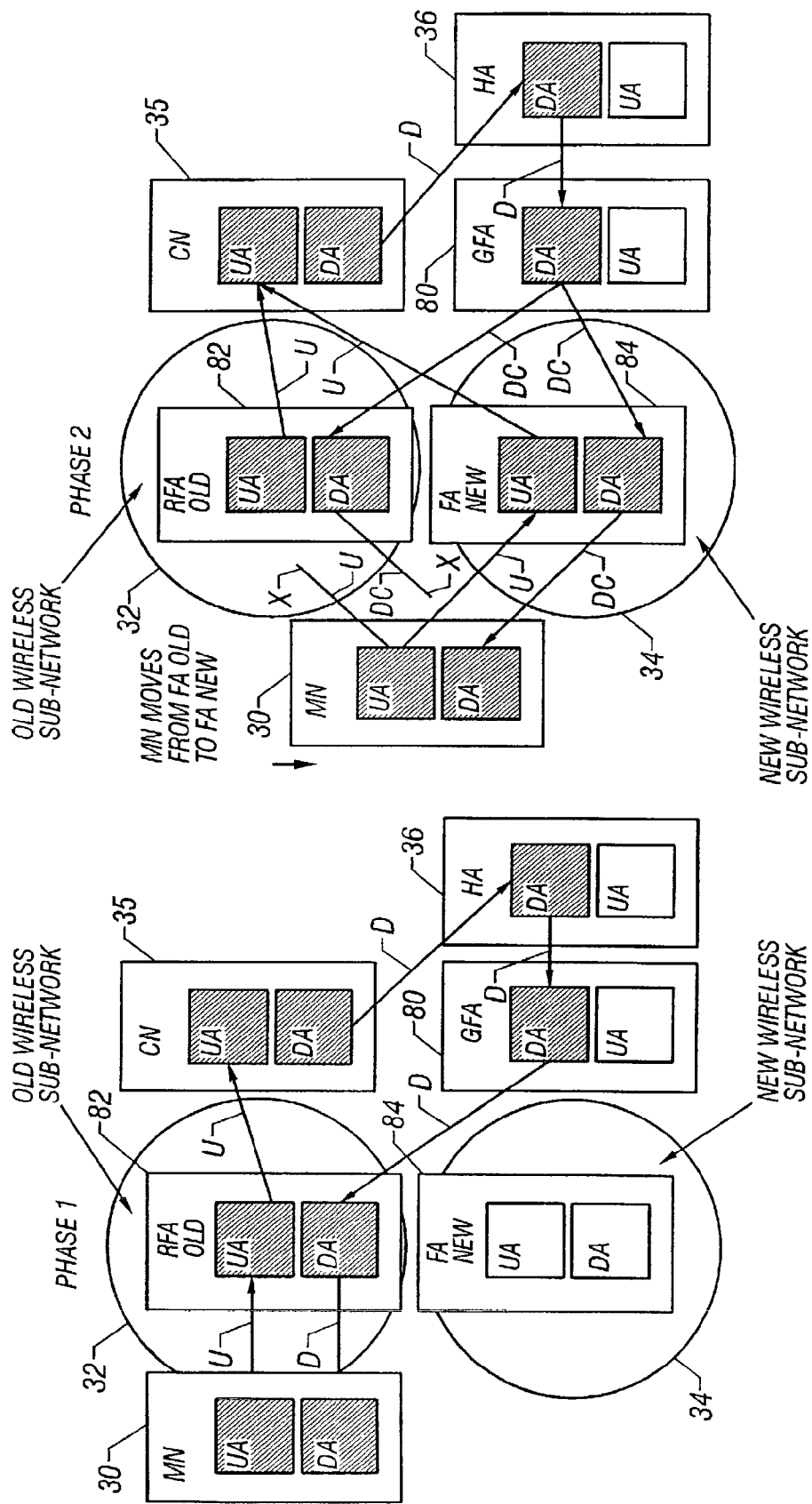
FIGS. 8A & 8B illustrate the flow of data packets during a fast handoff in Hierarchical Mobile IPv4.

Referring to FIGS. 8A & 8B, a fast handoff procedure is available in the Hierarchical Mobile IPv4 protocol (see El Malki K., Soliman H., "Hierarchical Mobile IPv4/v6 and Fast Handoff," Internet draft, draft-elmaki-soliman-hmipv4v6-00.txt, Work in progress, March 2000). The main operation of this procedure is similar to the multicasting (bi-casting) procedure in FIGS. 7A & 7B, except that the entity which performs the multicasting of the downstream data packets is no longer the home agent 36, but is instead the gateway foreign agent 80. Multicasted (bi-casted) downstream data packets DC are then sent from the gateway foreign agent 80 to both the old regional foreign agent 82 (RFA) and the new regional foreign agent 84 (see Phase 2).

Figures 9A, 9B:
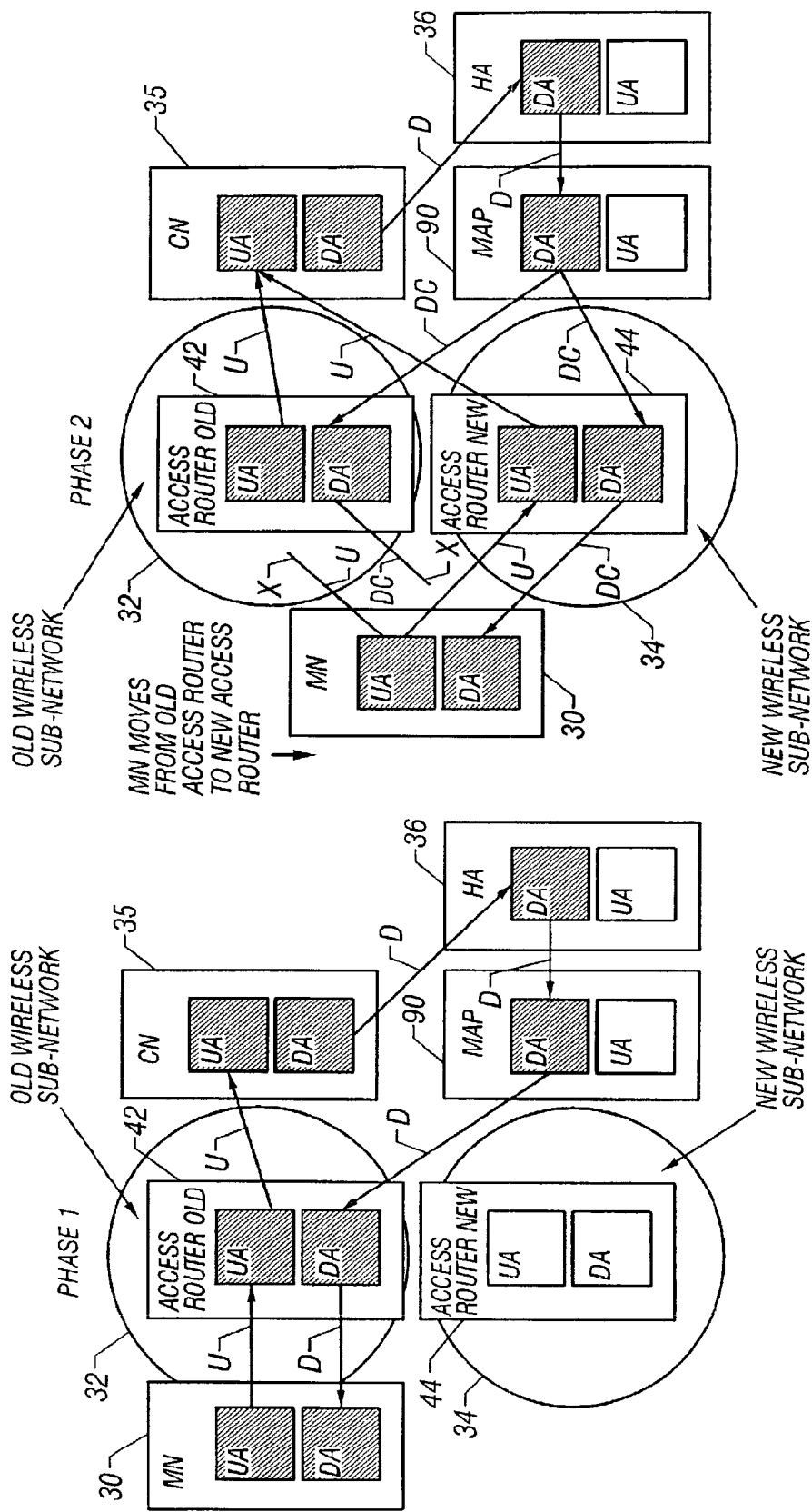
FIGS. 9A & 9B illustrate the flow of data packets during a fast handoff in Hierarchical Mobile IPv6 where no route optimization is used.

A fast handoff procedure is also available in Hierarchical Mobile IPv6, wherein another new node is introduced called the mobility anchor point (MAP) 90. As can be seen in FIGS. 9A & 9B, the fast handoff procedure using the mobility anchor point 90 is similar to the fast handoff procedure using the gateway foreign agent 80 in Hierarchical Mobile IPv4. Specifically, the Hierarchical Mobile IPv6 fast handoff procedure allows the mobile node 30 to register its care-of address in a certain region, which region may include more than one access router. The regional registrations are accomplished by using a binding update procedure (see the El Malki K. and Soliman H. reference noted above). Multicasted (bi-casted) downstream data packets DC are then sent from the mobility anchor point 90 to both the old access routers 42 and the new access router 44 (see Phase 2).

Figures 10A, 10B:
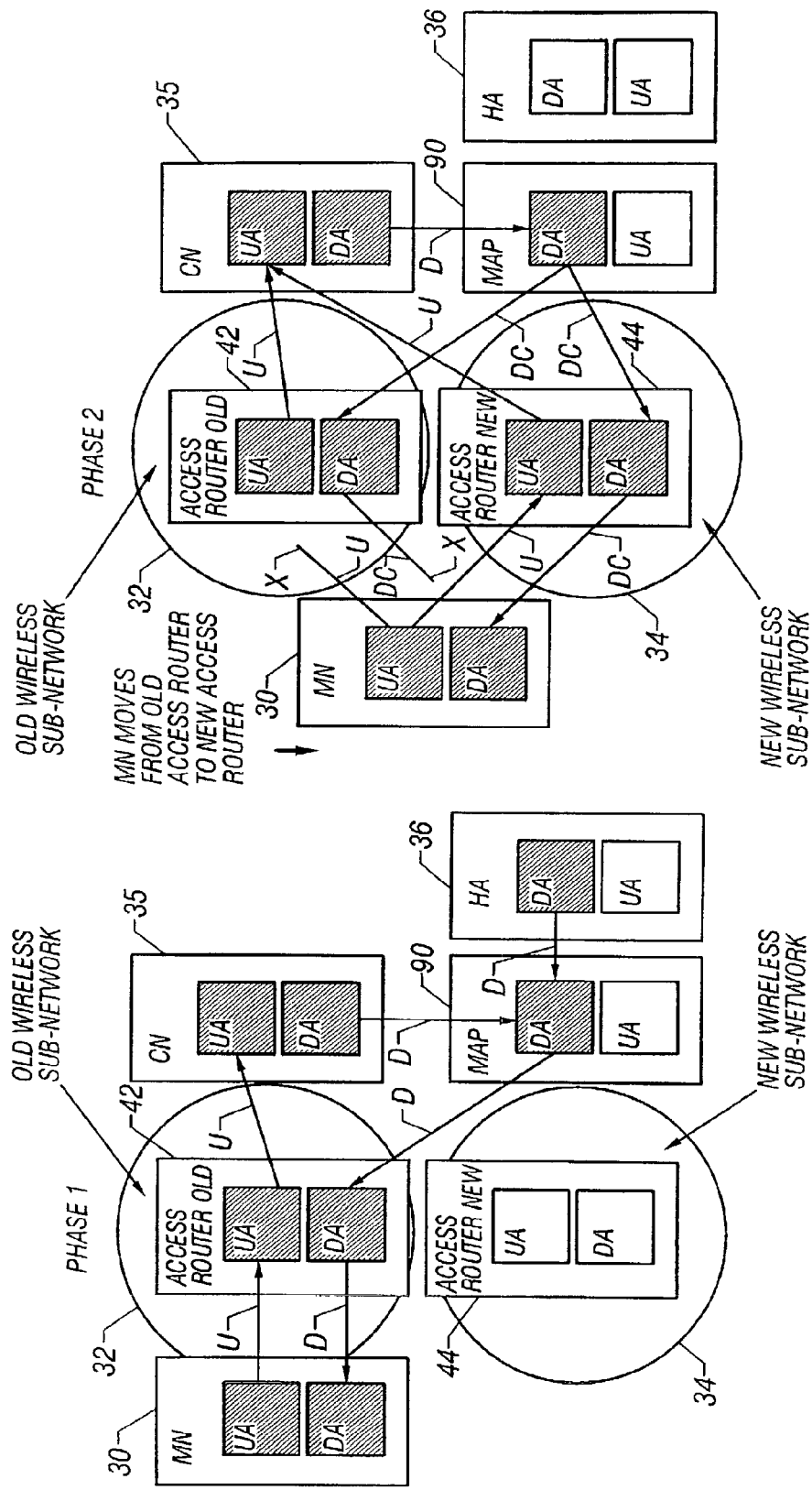
FIG. 10A & 10B illustrate the flow of data packets during a fast handoff in Hierarchical Mobile IPv6 where route optimization is used.
Figure 11B:
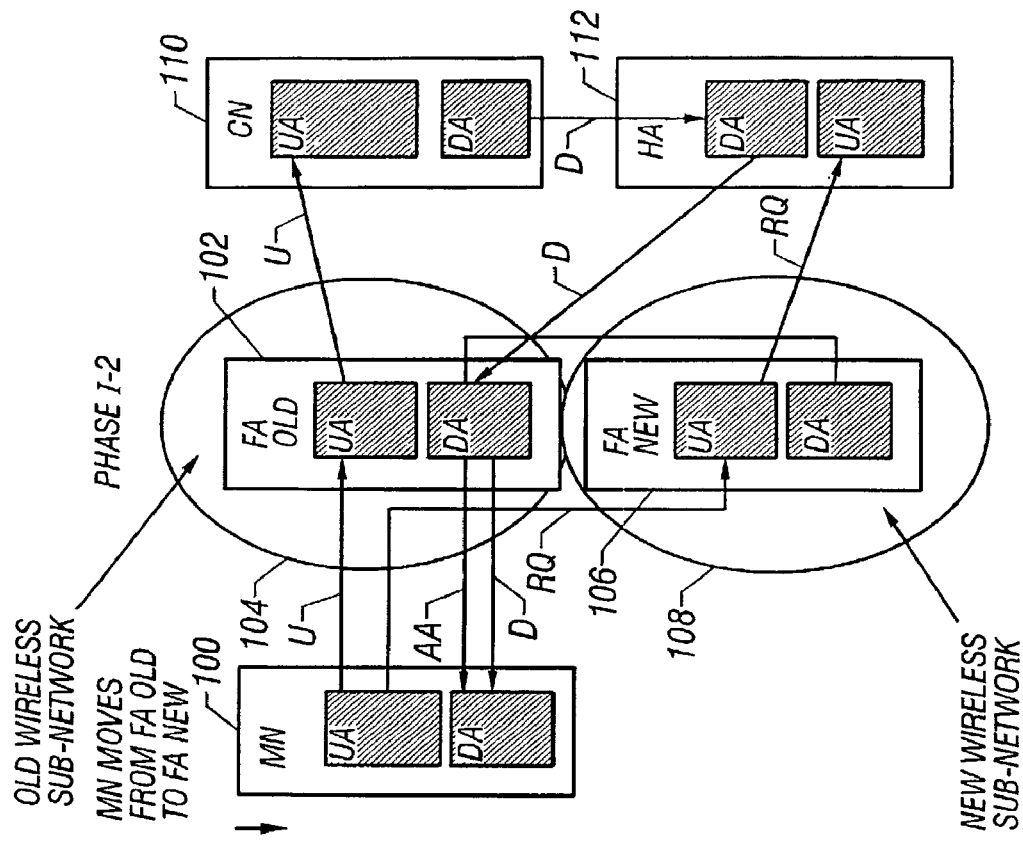
Figure 11A:
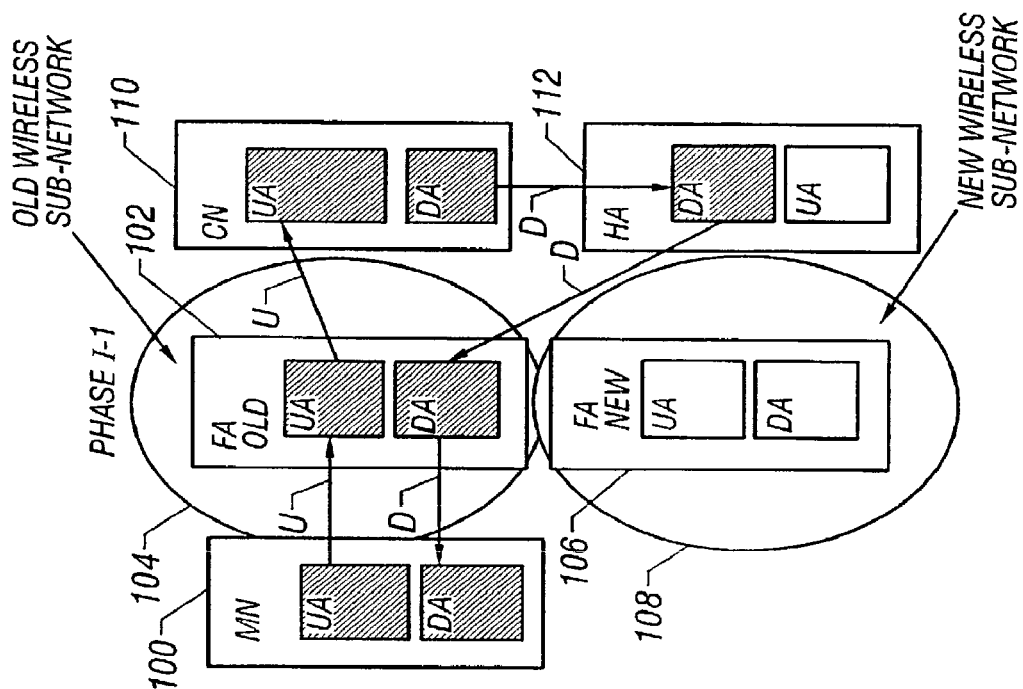
Figure 12B:
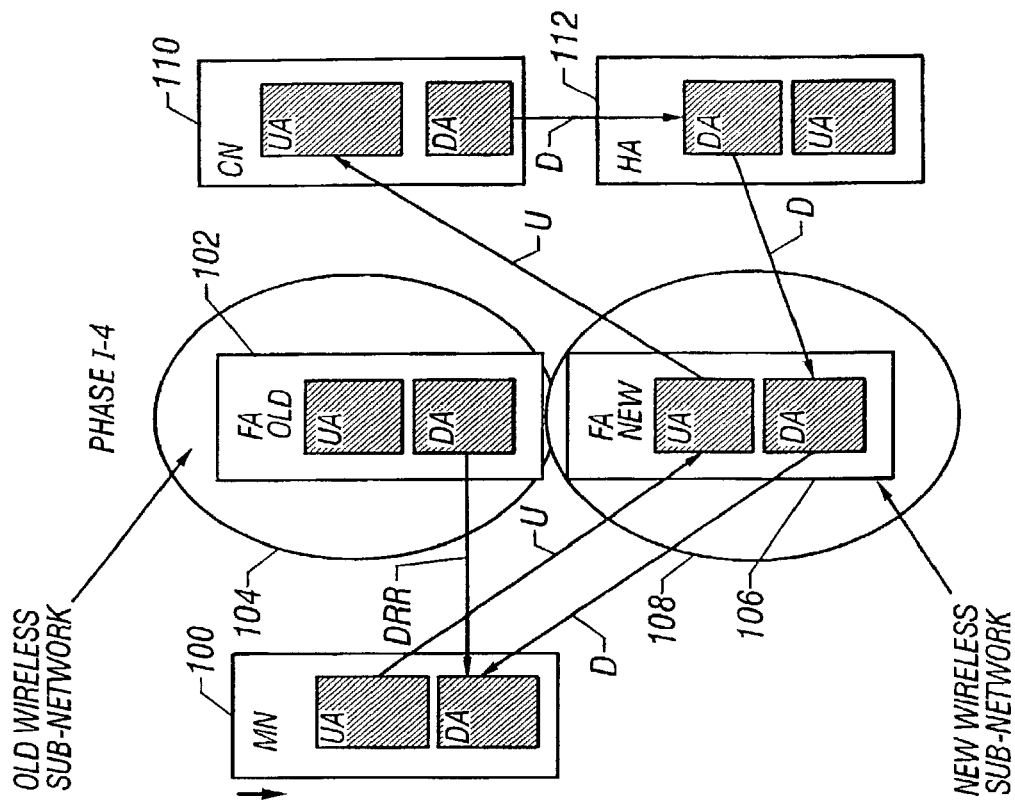
Figure 12A:
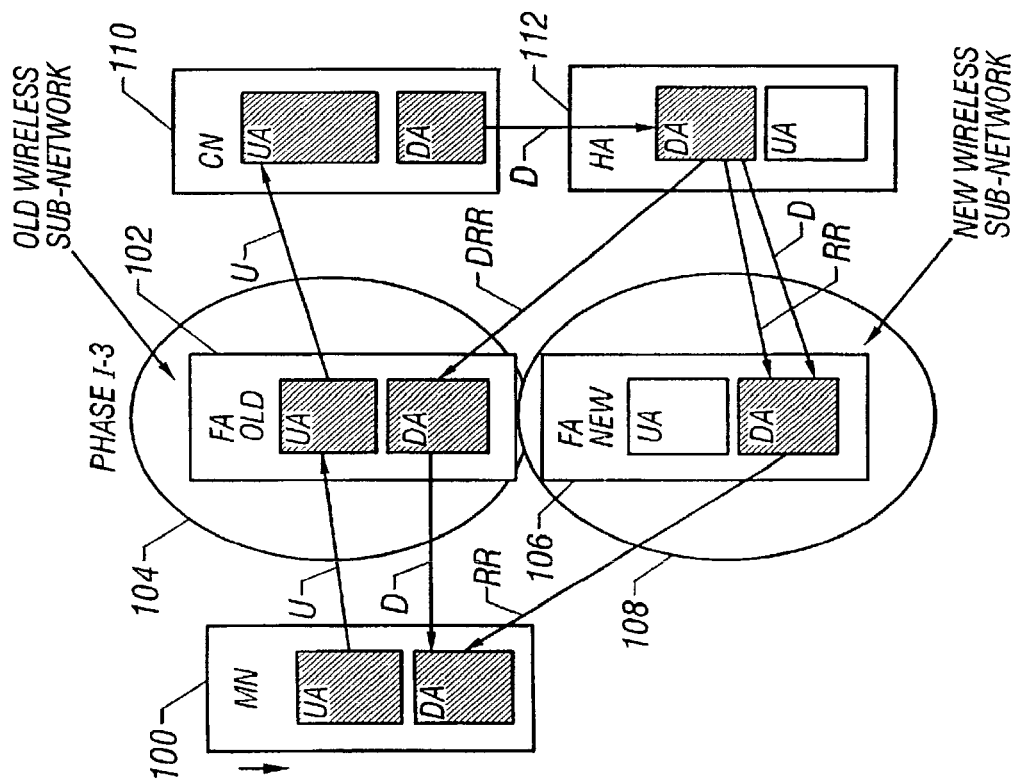
Figures 13, 14:
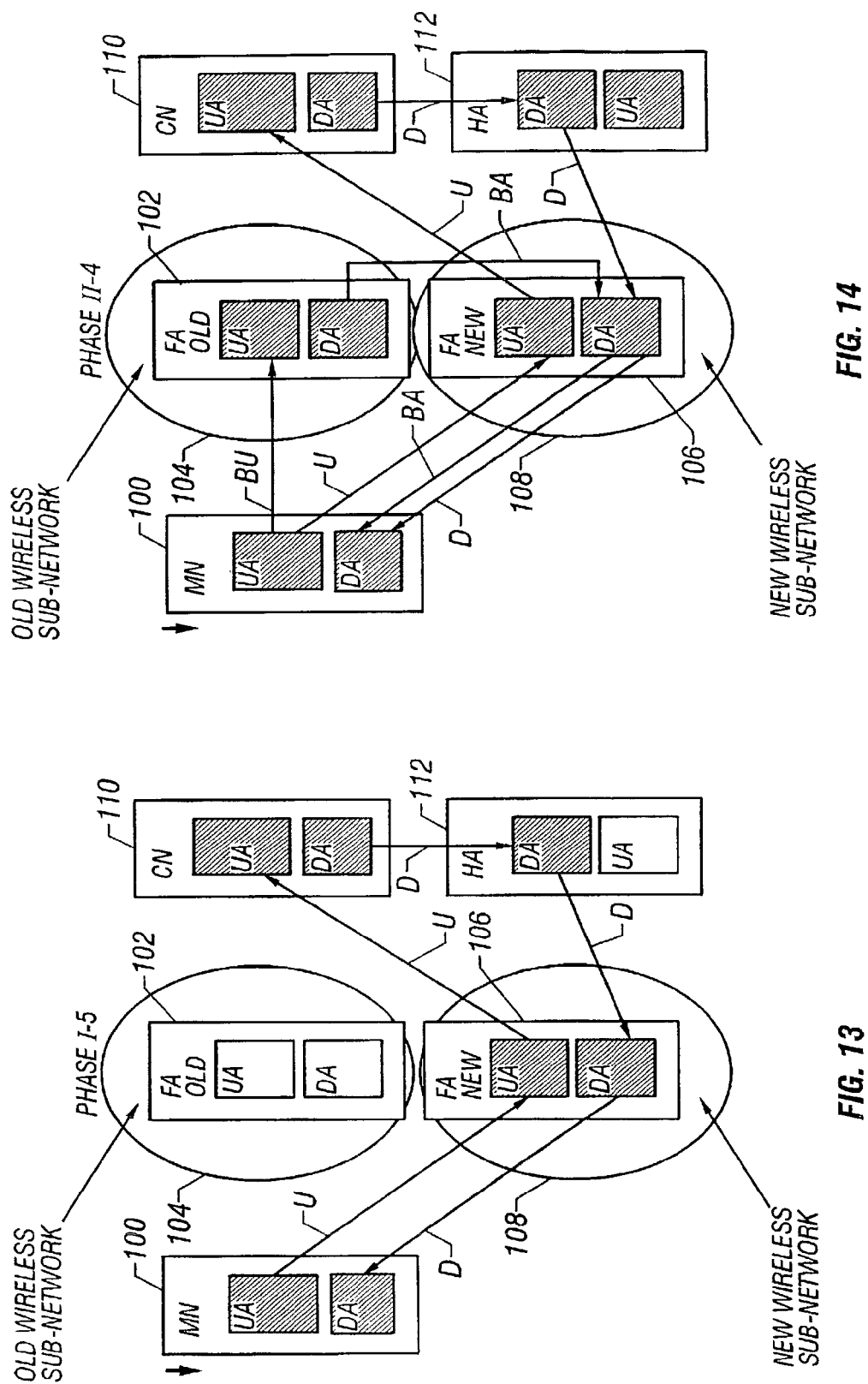
Figure 15B:
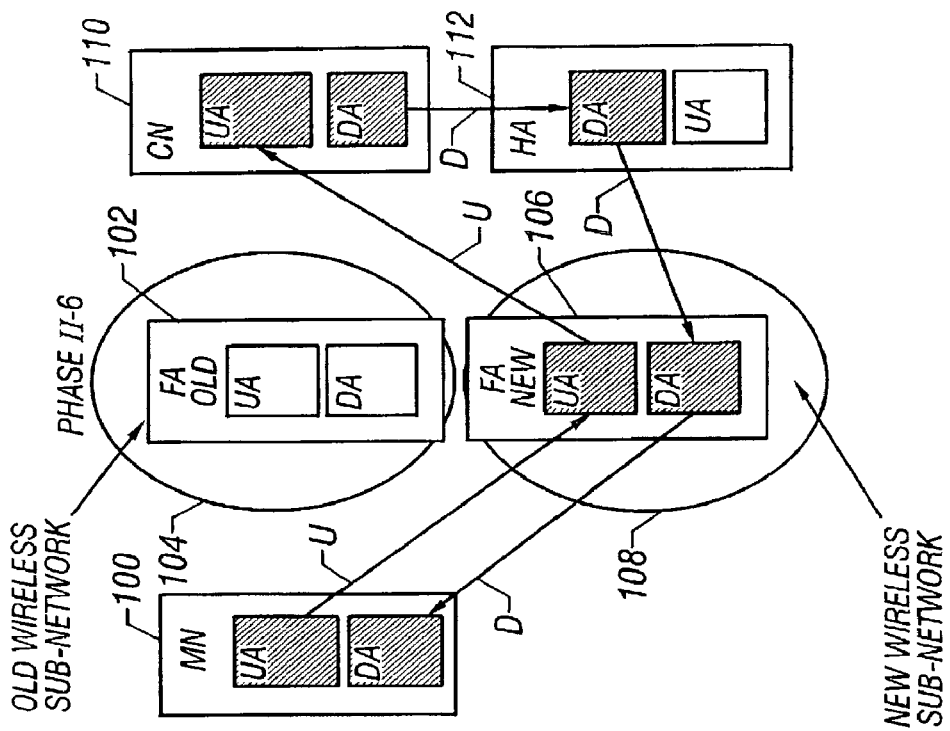
Figure 15A:
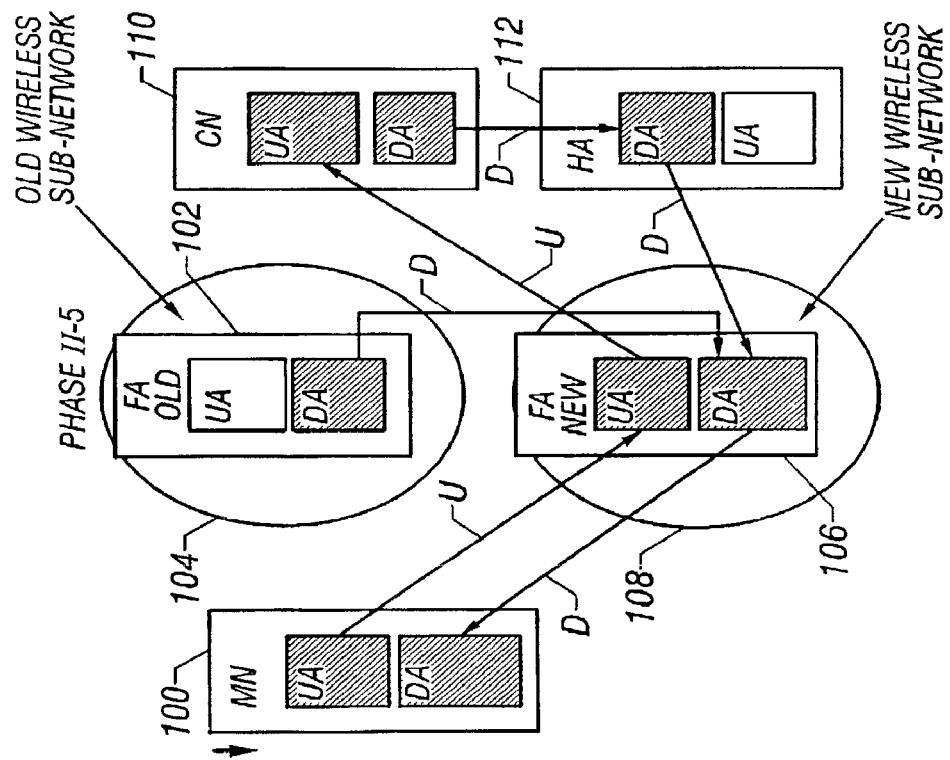

Note that the above Hierarchical Mobile IPv6 fast handoff procedure does not include the route optimization option, as all the data packets were routed through the home agent 36. FIGS. 10A & 10B illustrate a fast handoff procedure for Hierarchical Mobile IPv6 wherein route optimization is used, i.e., the data packets are not routed through the home agent 36. Instead, the downstream data packets from the correspondent node 35 are sent directly to the mobility anchor point 90 (see Phase 2).

The success of the foregoing smooth handoff procedures for Mobile IPv4 in providing seamless handoff is very much dependent on the speed with which registration with the foreign agent in the old wireless sub-network can be completed. If the registration process is slow, then the disruption duration, that is, the duration between the time that the old wireless sub-network becomes unreachable (e.g., due to deterioration of the wireless link), and the time that a new binding cache entry is created at the old foreign agent for forwarding previously sent data packets, could be high enough such that a significant number of data packets may be lost.

Similarly, the success of the smooth handoff concept for Mobile IPv6 in providing seamless handoff is very much dependent on the speed with which identifying, selecting and registering with the temporary home agent in the old wireless sub-network can be completed. If these procedures are slow, then the disruption duration, that is, the duration between the time that the old wireless sub-network becomes unreachable (e.g., due to deterioration of the wireless link), and the time that a new binding cache entry is created on the old access router for forwarding the previously sent data packets, could be high enough such that a significant number of data packets may be lost.

As for the multicasting (bi-casting) handoff procedures, these procedures are able to solve the seamless handoff issue only if the following requirements are fulfilled. For both Mobile IPv4 and Mobile IPv6, the starting handoff time is made known as soon as possible to the handoff algorithm. In addition, for Mobile IPv6 the new mobility anchor point entity is used. Furthermore, during the whole handoff process and also for a period of time after handoff completion, each data packet that is destined to the mobile node will have to be copied by the home agent (in Mobile IPv4), the gateway foreign agent (in Hierarchical Mobile IPv4), or the mobility anchor point (in Hierarchical Mobile IPv6), then multicasted to both the mobile node's old and new care-of addresses. Thus, a higher communication bandwidth from the network supporting the handoff process will be required.

The system and method of the present invention introduces an extension to the Mobile IP handoff protocol, referred to herein as synchronized handoff in Mobile IP, that builds on the conventional Mobile IP handoff procedures. Both Mobile IPv4 and Mobile IPv6 are supported, with and without route optimization. Synchronized handoff in Mobile IP also provides an efficient solution to the seamless handoff issue in Hierarchical Mobile IPv4 and Hierarchical Mobile IPv6. Specifically, the synchronized handoff procedures or operational phases of the invention can be applied to achieve a seamless handoff when one or more of the following non-exclusive list of operations or functions are used.

One operation or function that is used in certain embodiments of the invention involves obtaining the handoff starting time from the lower layers (e.g., Layer 2) of the OSI (Opens Systems Interconnection) model. Furthermore, if the mobile node movement can be predicted before handoff is initiated, then this information can be used to speed up the handoff process. For Mobile IPv4, the initiation of the Mobile IP handoff can be accomplished via the old foreign agent. Two methods of accomplishing this function are described in El Malki K., Soliman H., "Hierarchical Mobile IPv4/v6 and Fast Handoff," Internet draft, draft-elmalki-soliman-hmipv4v6-00.txt, Work in progress, March 2000.

The first method is based on inter-foreign agent solicitation where it is assumed that the current foreign agent with which the mobile node is registered is aware of the IP address of the new foreign agent to which the mobile node is moving. In this method, the current foreign agent is explicitly informed by the lower protocol layers that the mobile node needs to be handed off. Subsequently the current foreign agent sends an agent solicitation message to the new foreign agent. The new foreign agent then sends an agent advertisement via the current foreign agent to the mobile node. The mobile node will subsequently send a registration request to the new foreign agent through the old wireless sub-network served by the current foreign agent.

The second method is based on piggy-backing agent advertisements on lower layer protocol messages such as Layer 2 messages. In order to accomplish this piggy-backing, the Layer 2 protocol should be able to interface or otherwise be compatible with Mobile IPv4. Once a Layer 2 handoff occurs such that the old wireless sub-network is communicating with the new wireless sub-network at the Layer 2 level, it is possible for the new wireless sub-network to solicit an agent advertisement from the new foreign agent and transfer it to the mobile node via the old foreign agent using a Layer 2 protocol. The mobile node, after receiving the message, can perform a registration request that is directed to the new foreign agent.

For Mobile IPv6, the initiation of the handoff can be accomplished in a manner similar to that described in Soliman H., El Malki K., "Hierarchical Mobile IPv6 and Fast Handoff," Internet draft, draft-soliman-mobileip-hmipv6-00.txt, Work in progress, June 2000. In particular, the Layer 2 protocol should be able to interface or otherwise be compatible with Mobile IPv6. Furthermore, once a Layer 2 handoff occurs such that the old wireless sub-network is communicating with the new wireless sub-network at the Layer 2 level, the mobile node is notified by a Layer 2 protocol message from the old wireless sub-network to send a binding update message to the home agent.

Another operation or function used in certain embodiments of the invention involves the old wireless sub-network notifying the mobile node via a Layer 2 protocol message that the connection between the mobile node and the old wireless sub-network will be discarded in a very short time.

Yet another operation or function used in certain embodiments of the invention involves the home agent or gateway foreign agent issuing multiple reply messages in response to receiving a registration request from the mobile node. This operation or function applies to the Mobile IPv4 and the Hierarchical Mobile IPv4 protocols where the optimization feature is not used. First, the home agent or the gateway foreign agent receives a registration request or binding update message from the mobile node that requires the creation of a new binding for the mobile node's new care-of address. In response, the home agent or gateway foreign agent creates the new binding and sends two registration reply messages to the mobile node. One of these messages is routed to the mobile node at the new care-of address through the new foreign agent and notifies the mobile node that the binding has been created. The other message is actually a deregistration reply message that is simply a registration reply message which has a lifetime header field equal to zero. The deregistration reply message is routed to the old care-of address through the old foreign agent and notifies the mobile node that the binding with the old care-of address has been removed. Setting the lifetime header field equal to zero causes the binding that includes the care-of address specified in the registration message to be deleted. Similarly, a deregistration request or binding update message is simply a registration request or binding update message that has a lifetime header field equal to zero.

Yet another operation or function used in certain embodiments of the invention involves the foreign agent receiving and forwarding the deregistration reply message to the mobile node which originally issued the registration request. This operation or function applies to the Mobile IPv4 and the Hierarchical Mobile IPv4 protocols where the route optimization feature is not used.

Yet another operation or function used in certain embodiments of the invention involves using the "A" flag in the data packet header. This operation or function applies to the Mobile IPv4 protocol where the route optimization feature is used, the Mobile IPv6, and the Hierarchical Mobile IPv6 protocols. When a mobile node sends a deregistration binding update to a correspondent node, a home agent, or to a mobility anchor point via either the old foreign agent or the old access router, it activates the "A" flag in the data packet header. This activation causes the nodes that receive the deregistration binding update message to send a binding acknowledgment message back to the mobile node via either the old foreign agent or the old access router. Note that a deregistration binding update is simply a binding update message that has a lifetime header field equal to zero.

Another operation or function used in certain embodiments of the invention involves the temporary home agent creating a new binding cache entry after it receives a binding update from the mobile node. All access routers that are involved in a Mobile IPv6 or Hierarchical Mobile IPv6 handoff should be capable of becoming temporary home agents. This temporary home agent is used to identify and store data packets (e.g., in the buffers UA and DA) that were sent to the old care-of address. The temporary home agent then forwards these previously sent data packets to the new care-of address via the new access router. Specifically, the temporary home agent creates a new binding cache entry that links the old care-of address to the new care-of address after receiving a binding update from the mobile node. All data packets that were sent to the old care-of address are then forwarded to the new care-of address.

The new binding cache entry can be created in the temporary home agent as follows. The data packet that is carrying the binding update has the home address field in the home address option set to the old care-of address, whereas the care-of address of the binding update itself is set to the new care-of address. In order to notify the node receiving the binding update that it is to become a temporary home agent, the home registration "H" flag is set in this binding update. The node receiving the binding update then uses the old and new care-of address information to create the new binding cache entry.

Yet another operation or function used in certain embodiments of the invention involves the creation of a new binding cache entry during the smooth handoff procedure (described in Johnson, D., B., Perkins, C., "Mobility Support in IPv6," Internet draft, draft-ietf-mobileip-ipv6-12.txt, Work in progress, April 2000). Specifically, a new binding cache entry that links the old care-of address to the new care-of address is created in the old foreign agent after receiving a binding update from the mobile node. The mobile node should be capable of sending the binding update directly to the old foreign agent. Then, all the data packets that were stored and/or arriving at the old foreign agent, and that were destined for the old care-of address of the mobile node, are tunneled to the new care-of address, i.e., to the new foreign agent. Any messages tunneled to the old care-of address of the mobile node and that are already stored in the old foreign agent, and/or that are arriving at the old foreign agent after the forwarding pointer has been created, are re-tunneled to the mobile node's new care-of address. Note that the existing smooth handoff procedure allows for re-tunneling of data packets to the new care-of address only after the creation of the new binding cache entry. Furthermore, the old foreign agent should be capable of notifying the mobile node regarding the creation of the new binding cache entry by sending a binding acknowledgment via the new foreign agent to the mobile node. Note further that in the reference cited above, it is mentioned that the binding update which initiates the creation of the new binding cache entry in the old foreign agent is actually sent by the new foreign agent. However, it is also mentioned that the binding update can be sent by the mobile node in situations where the mobile node does not timely receive the binding acknowledgment from the old foreign agent.

Yet another operation or function used in certain embodiments of the invention involves the security association between the various IP nodes of the Mobile IPv4 and the Hierarchical Mobile IPv4 protocols. Such security associations may be fulfilled using the security procedures described in "IP Mobility Support," C. E. Perkins, editor, IETF RFC2002, October 1996; Gustafsson E., Jonsson A., Perkins C., "Mobile IP Regional Registration," Internet draft, draft-ietf-mobileip-reg-tunnel-02.txt, Work in progress, March 2000; Perkins, C. E., Calhoun, P. R., "Mobile IP Challenge/Response Extensions," IETF draft, draft-ietf-mobileip-challenge-12.txt, Work in progress, June 2000; El Malki K., Soliman H., "Hierarchical Mobile IPv4/v6 and Fast Handoff," Internet draft, draft-elmalki-soliman-hmipv4v6-00.txt, Work in progress, March 2000; and Perkins, C., Johnson, B. J., "Route Optimization in Mobile IP," Internet draft, draft-ietf-mobileip-optim-09.txt, Work in progress, February 2000.

Yet another operation or function used in certain embodiments of the invention involves the security association between the various IP nodes of the Mobile IPv6 and the Hierarchical Mobile IPv6 protocols. Such security associations may be fulfilled using the security procedures described in Johnson, D. B., Perkins, C., "Mobility Support in IPv6," Internet draft, draft-ietf-mobileip-ipv6-12.txt, Work in progress, April 2000; Perkins, C. E., Calhoun, P. R., "Mobile IP Challenge/Response Extensions," IETF draft, draft-ietf-mobileip-challenge-12.txt, Work in progress, June 2000; El Malki K., Soliman H., "Hierarchical Mobile IPv4/v6 and Fast Handoff," Internet draft, draft-elmalki-soliman-hmipv4v6-00.txt, Work in progress, March 2000; and Soliman H., El Malki K., "Hierarchical Mobile IPv6 and Fast Handoff," Internet draft, draft-soliman-mobileip-hmipv6-00.txt, Work in progress, June 2000.

Yet another operation or function used in certain embodiments of the invention involves the storing and processing of registration reply messages. This operation or function applies to the Mobile IPv4 and the Hierarchical Mobile IPv4 protocols where the route optimization option is not used. Specifically, the deregistration reply (DRR) messages belonging to a particular binding are stored and processed in the same way (i.e., identical scheduling mechanism) as the data packets that belong to that same binding.

Yet another operation or function used in certain embodiments of the invention involves the storing and processing of binding acknowledgment messages. This operation or function applies to the Mobile IPv4 protocol where the route optimization feature is used, and to the Mobile IPv6 and the Hierarchical Mobile IPv6 protocols. Specifically, the binding acknowledgment messages that are used to confirm a deregistration binding update message are stored and processed in the same way (i.e., identical scheduling mechanism) as the data packets that belong to that same binding.

Operation of the system and method for synchronized handoff in mobile IP according to some embodiments of the invention will now be described with respect to a number of exemplary handoff scenarios.

FIGS. 11A & 11B to 17A & 17B illustrate synchronized handoff in Mobile IPv4 without using route optimization according to some embodiments of the invention. In embodiments where the mobile node is capable of being simultaneously connected to two wireless sub-networks, two scenarios can be distinguished depending on whether the mobile node timely receives the deregistration reply (DRR) message from the old foreign agent.

In the first scenario, the mobile node timely receives the deregistration reply message via the old foreign agent. This situation occurs when the mobile node is able to receive the deregistration reply for a certain binding before the old wireless sub-network has deteriorated beyond a certain point, i.e., before the mobile node is notified via a Layer 2 protocol message that the connection between the mobile node and the old wireless sub-network will be discarded in a very short time. Considering that the deregistration reply message is stored and processed by all the IP nodes in the same manner as the data packets that belong to that same binding, it may be assumed that once the mobile node receives the deregistration reply message, all data packets that belong to the same binding as the deregistration reply message, and that were sent by the home agent downstream to the mobile node, have been received by the mobile node. Thus, a seamless handoff may be achieved since no or few data packets sent between the correspondent node and mobile node are lost.

Referring now to FIGS. 11A & 11B to 13, a handoff according to the first scenario may be accomplished in five operational phases. In Phase I-1, the mobile node 100 is simply communicating with the correspondent node 110 via the old wireless sub-network 104, old foreign agent 102, and home agent 112 in a known manner.

Phase I-2 involves the mobile node 100 sending a registration request (RQ) message to the home agent 112. At this time, the home agent 112 is still sending downstream data packets to the mobile node 100 via the old wireless sub-network 104, and the correspondent node 110 is still receiving upstream data packets from the old foreign agent 102.

In Phase I-2, the mobile node, using the algorithm described in El Malki K, Soliman H., "Hierarchical Mobile IPv4/v6 and Fast Handoff," Internet draft, draft-elmalke-soliman-hmipv4v6-00.txt, Work in progress, March 2000, discovers the new care-of address of the new foreign agent 106 via either the old foreign agent 102 or a Layer 2 protocol message between the old and new wireless sub-networks. Once the mobile node 100 knows the new care-of address, it sends a registration request (RQ) message to the new foreign agent 106 via either the old foreign agent 102 or via a Layer 2 protocol message between the old and new wireless sub-networks 104 and 108. This registration request is then sent by the new foreign agent 106 to the home agent 112. Note that this registration request message does not require the creation of a simultaneous binding, that is, a binding for the mobile node in both the old and new wireless sub-networks concurrently.

Phase I-3 involves the home agent 112 sending a registration reply (RR) message to the mobile node 100. At this time, the correspondent node 110 is still receiving upstream data packets from the old foreign agent 102. Upon receiving the registration request message from the mobile node 100, the home agent 112 creates a new binding for the new care-of address and sends two registration reply messages to the mobile node 100. One of the registration reply messages is sent to the mobile node's new care-of address via the new foreign agent 106, which forwards this registration reply to the mobile node 100 to notify the mobile node 100 that the new binding has been created. The mobile node 100 now knows that the new binding has been successfully created and that upstream data packets may be sent to, and downstream data packets may be received from, the new foreign agent 106. The second registration reply is actually a deregistration reply (DRR) message that is sent to the mobile node's old care-of address via the old foreign agent 102 to notify the mobile node 100 that the binding with the old care-of address has been removed.

Phase I-4 involves the mobile node 100 receiving the deregistration reply message via the old foreign agent 102. The deregistration reply indicates that all data packets that belong to the same binding as the deregistration reply, and that were sent by the home agent 112 downstream to the mobile node, have now been received by this mobile node 100. Thus, a synchronized handoff, and hence, a seamless handoff may be achieved since few or no data packets sent between the correspondent node 110 and the mobile node 100 are lost. Note that the correspondent node 110 may still receive upstream data packets via the old foreign agent 102 as well as via the new foreign agent 106, whereas the home agent 112 sends downstream data packets only to the new foreign agent 106.

Phase I-5 is simply the normal operation of the mobile node 100 after the handoff is completed, that is, the mobile node 100 is communicating with the correspondent node 110 via the new wireless sub-network 108, new foreign agent 106 and the home agent 112.

In the second scenario, the mobile node 100 does not timely receive the deregistration reply message. When this happens, the mobile node 100 sends a binding update directly to the old foreign agent 102 to create a new binding cache entry therein linking the old care-of address with the new care-of address. In this way, the old foreign agent 102 can tunnel all the data packets that were stored, and/or arriving at the old care-of address to the new care-of address, i.e., to the new foreign agent 106. Thus, the mobile node 100 will receive all the data packets that were stored and/or in transition to the old care-of address, thereby achieving a synchronized, and hence, a seamless handoff.

A handoff according to the second scenario also can be accomplished in six operational phases. Phase II-1, Phase II-2 and Phase II-3 are identical to Phase I-1, Phase I-2 and Phase I-3, respectively, described with respect to FIGS. 11A & 11B to 12A & 12B and are therefore not separately shown. Phase II-4, Phase II-5, and Phase II-6 are different, however, as shown in FIGS. 14 to 15A & 15B.

Phase II-4 involves the mobile node, after being notified via a Layer 2 protocol message that the connection between the mobile node 100 and the old wireless sub-network 104 will be discarded in a very short time, sending a binding update directly to the old foreign agent 102 to create a new binding cache entry linking the old care-of address to the new care-of address. (Recall that registration and deregistration messages are a type of binding update used only between the mobile node and a home agent.) The old foreign agent 102, after accepting the binding update request, creates the new binding cache entry and then notifies the mobile node 100 by sending thereto a binding acknowledgment (BA) message via the new foreign agent 106.

Phase II-5 involves the old foreign agent 102 forwarding to the new foreign agent 106 the data packets that were sent to the mobile node's old care-of address. These data packets are then forwarded by the new foreign agent 106 to the mobile node 100. During this phase, the mobile node 100 is communicating with the correspondent node 110 via the new foreign agent 106 and the home agent 112.

Phase II-6 involves the mobile node 100 communicating with the correspondent node 110 via the new foreign agent 106 and the home agent 112 after all or substantially all the data packets that were sent to the old care-of address have been forwarded to the mobile node 100 via the new foreign agent 106.

Figure 16B:
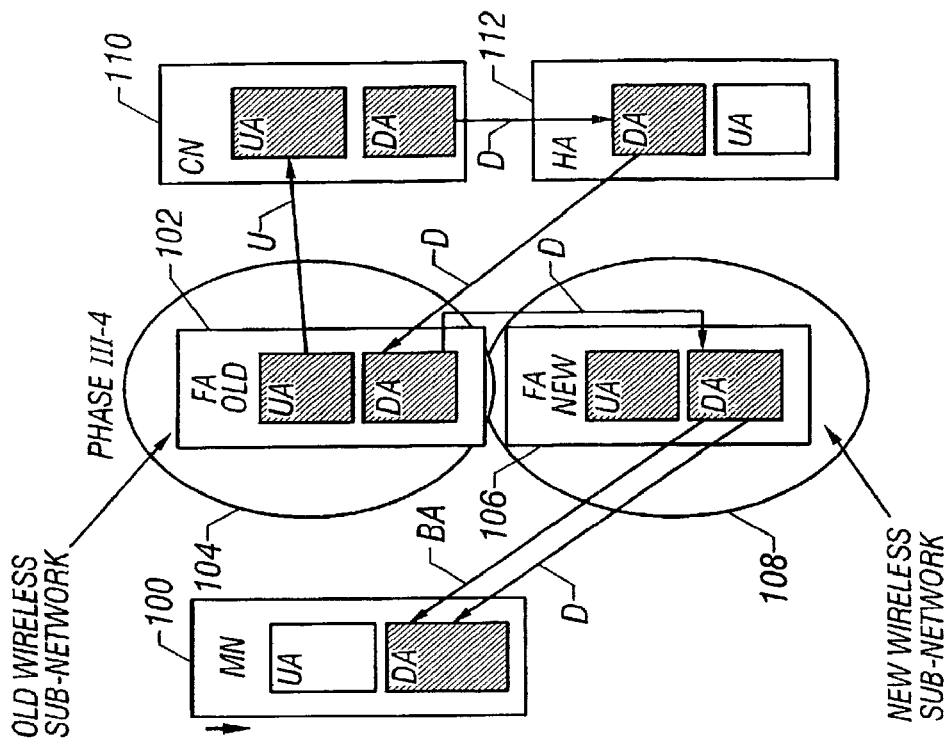
Figure 16A:
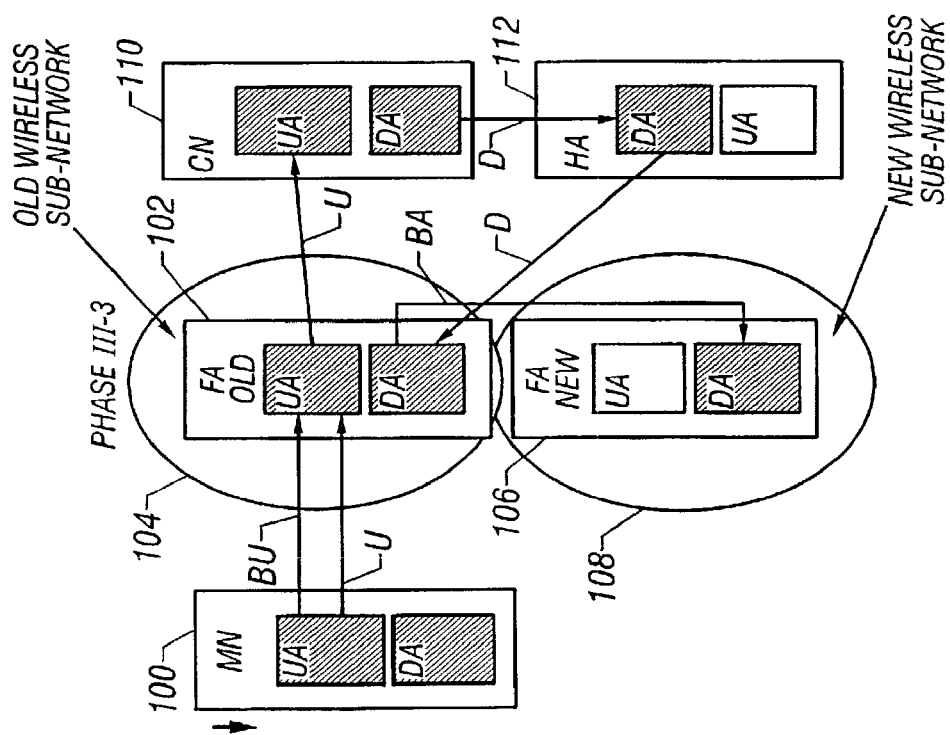
Figure 17B:
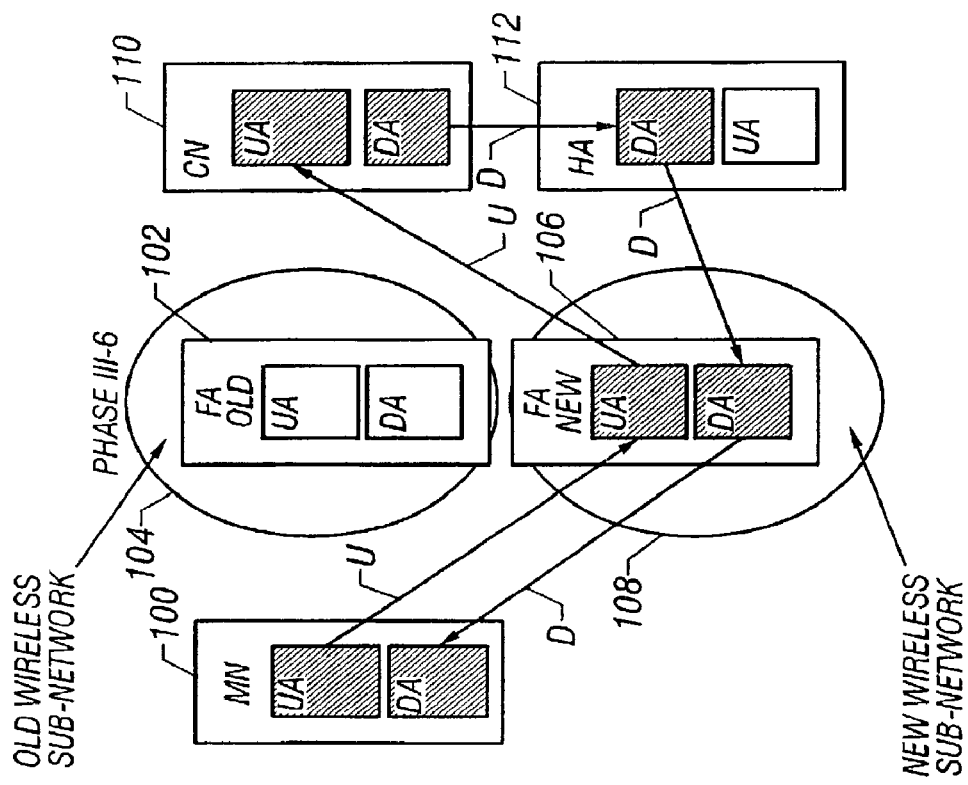
Figure 17A:
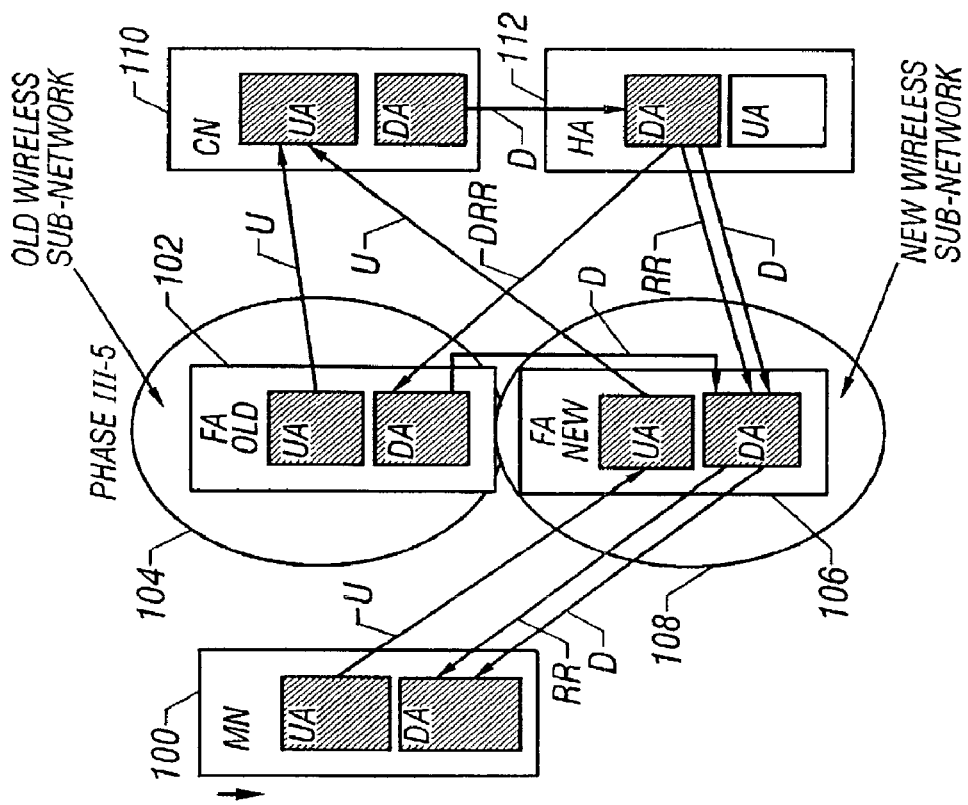
Figure 18B:
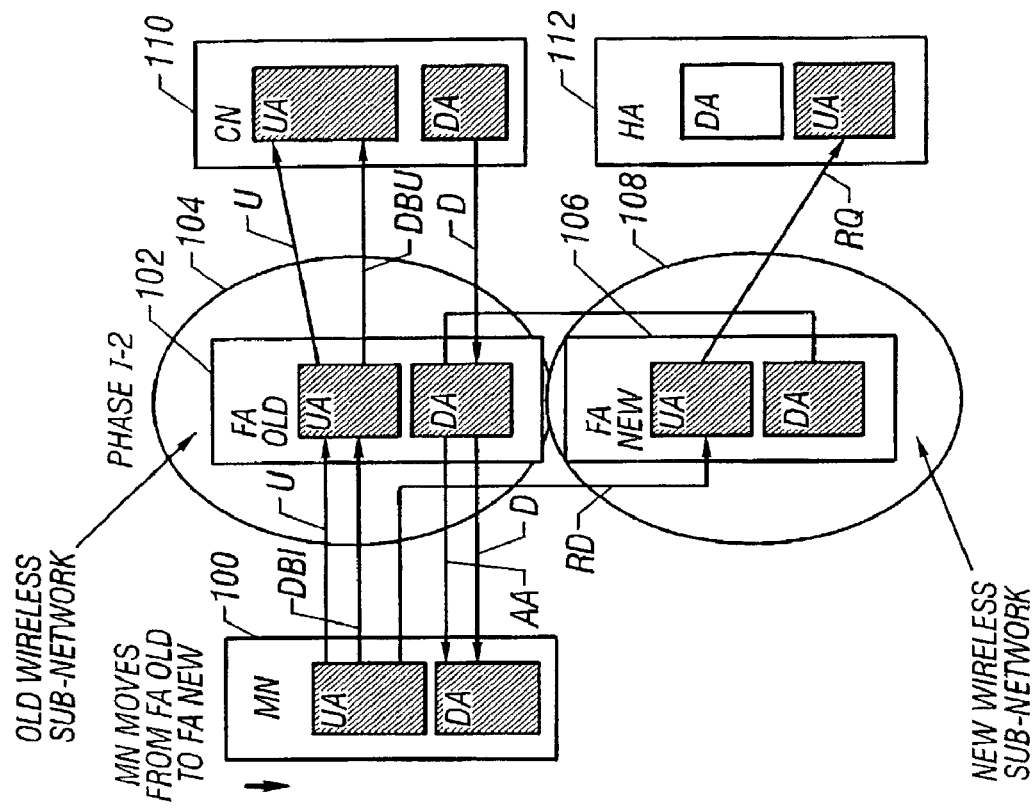
Figure 18A:
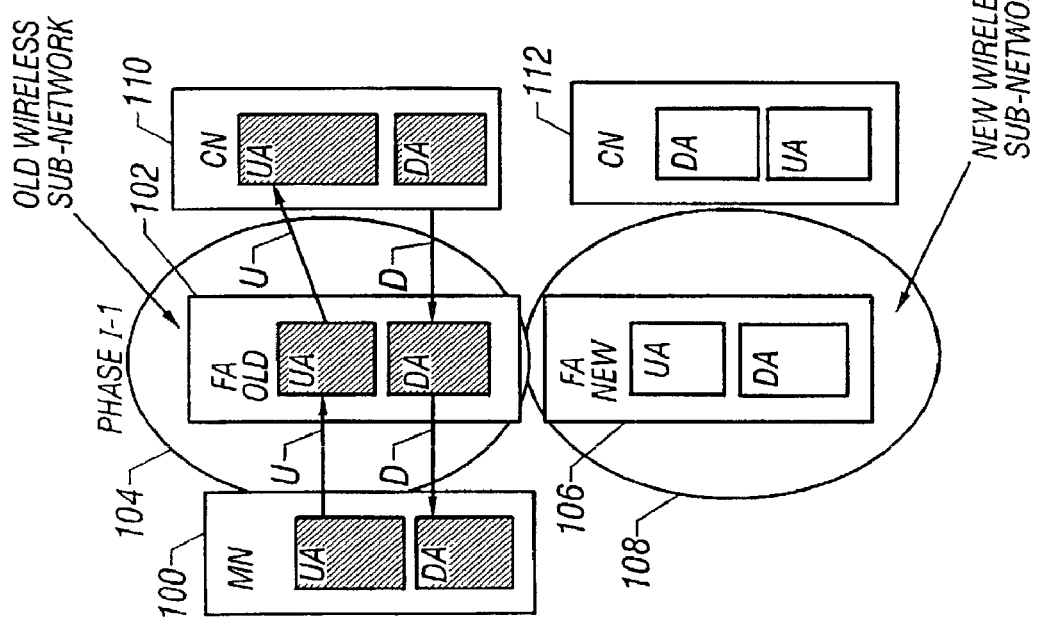
Figure 19B:
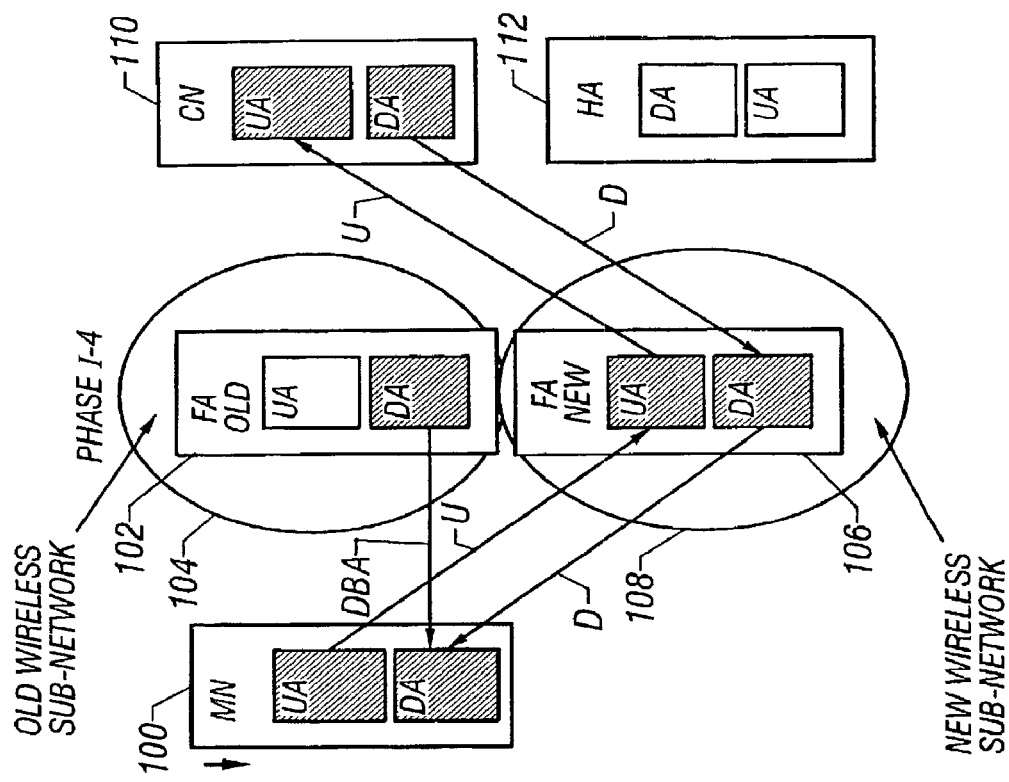
Figure 19A:
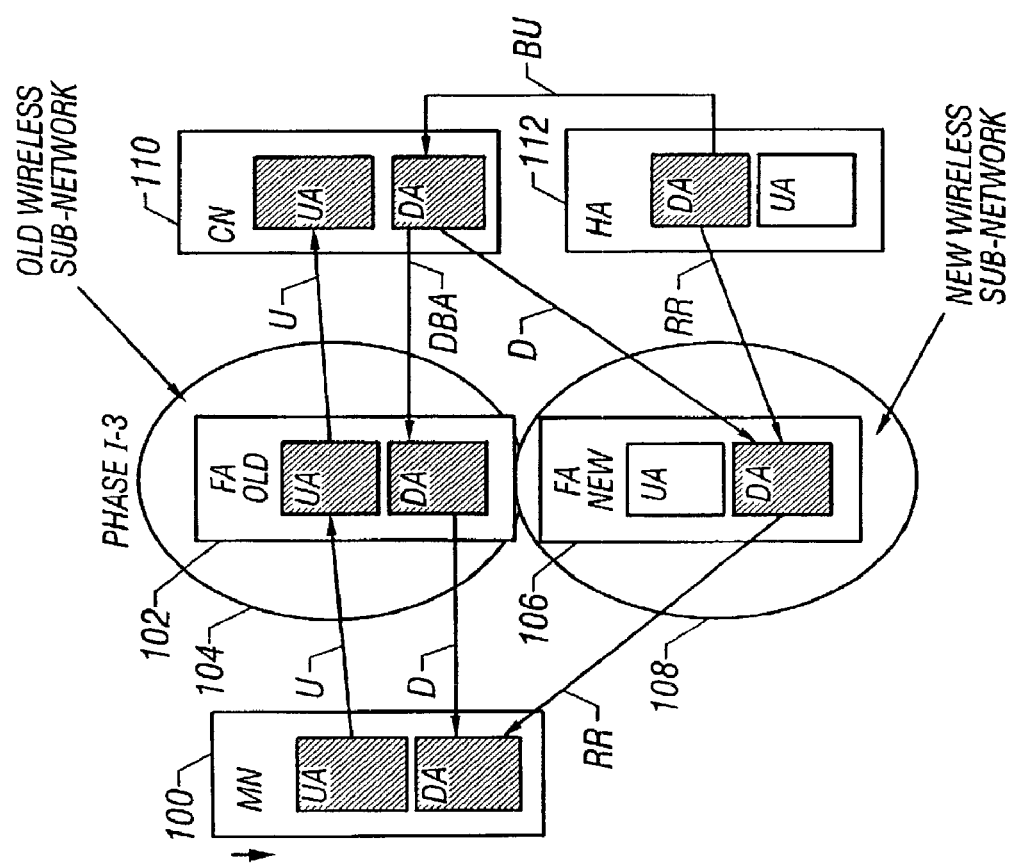
Figure 21:
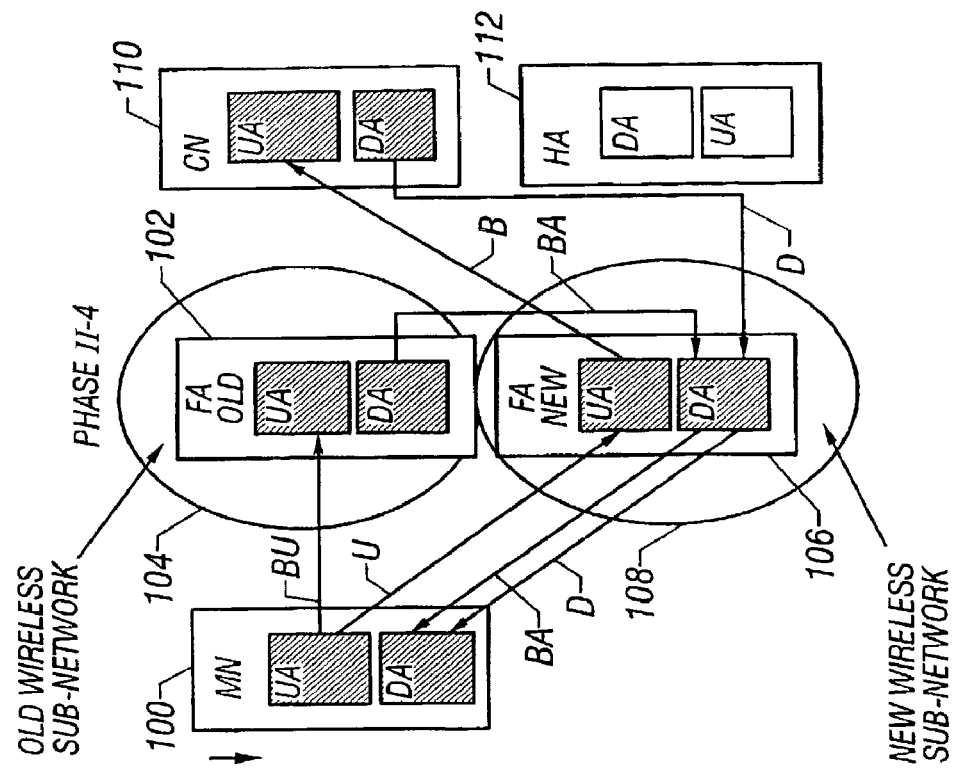
Figure 20:
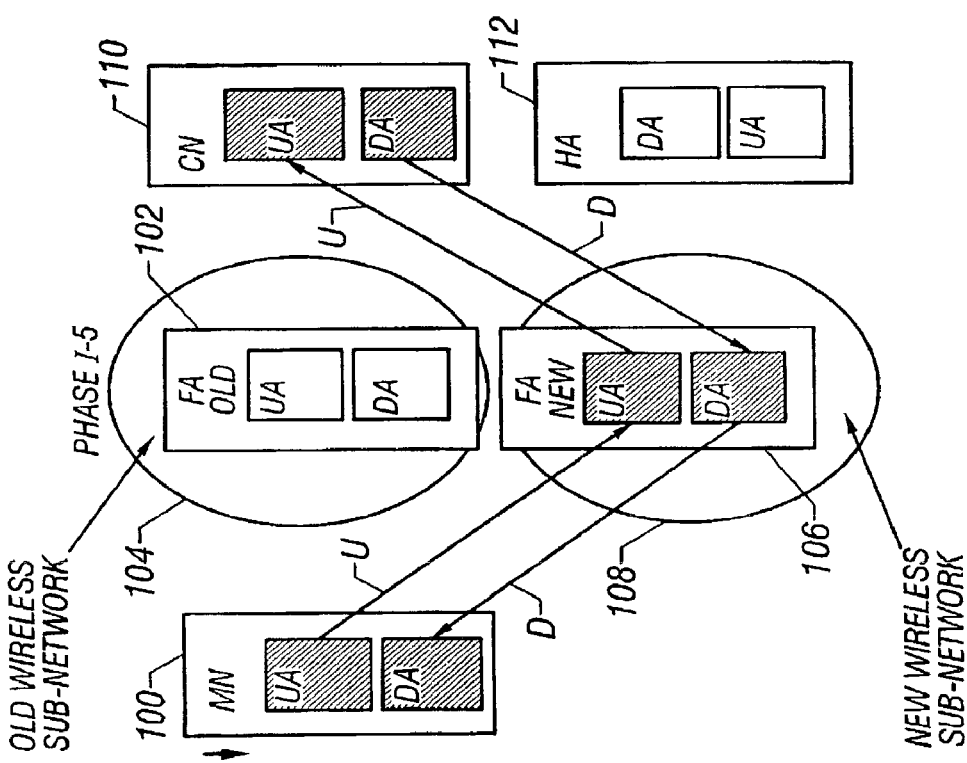
Figure 22B:
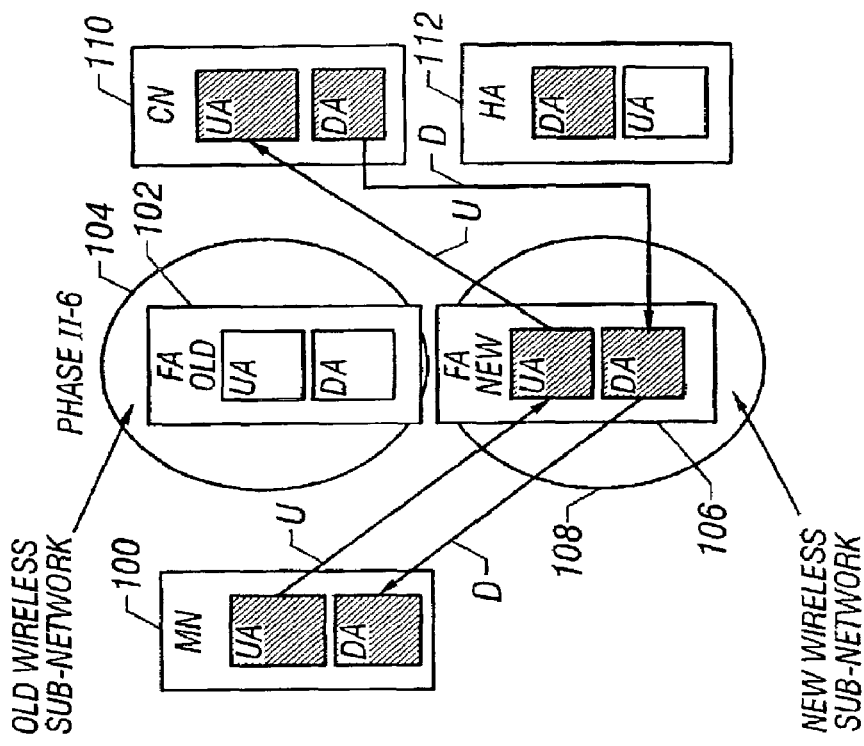
Figure 22A:
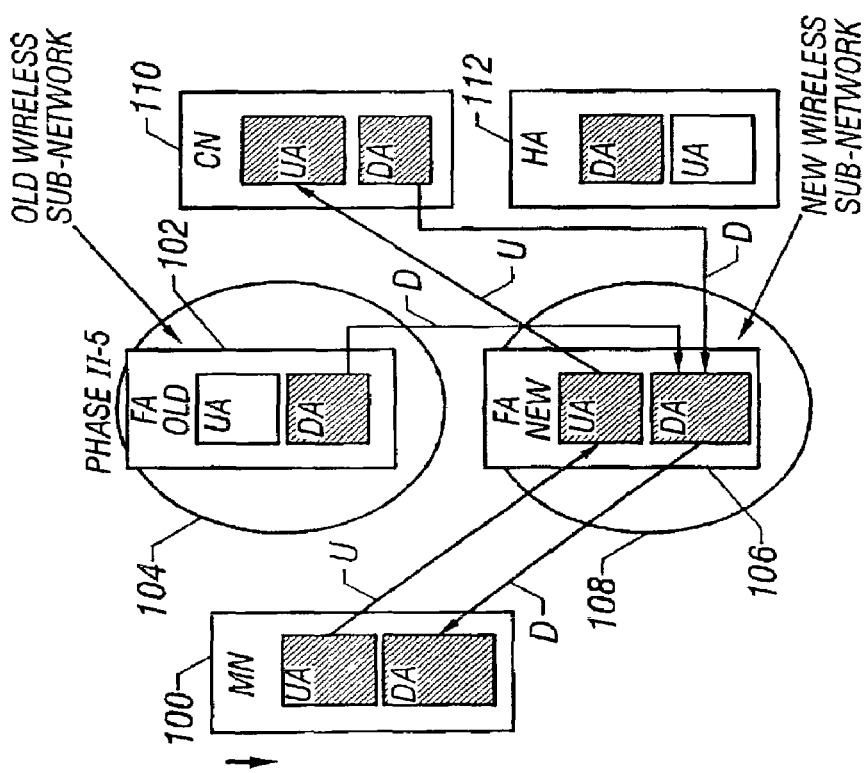

In some embodiments, the mobile node 100 is not capable of being simultaneously connected to two wireless sub-networks, i.e., the mobile node 100 can only be connected to one wireless sub-network at a time. Synchronized handoff in these embodiments can also be accomplished in six operational phases. Phase III-1 and Phase III-2 are identical to Phase I-1 and Phase I-2, respectively, of FIGS. 11A & 11B and are therefore not separately shown. Phase III-3 and Phase III-4 are depicted in FIGS. 16A & 16B, and Phase III-5 and Phase III-6 are depicted in FIGS. 17A & 17B.

Phase III-3 involves the mobile node, after being notified by the Layer 2 protocol that the connection between the mobile node 100 and the old wireless sub-network 104 will be discarded in a very short time, sending a binding update directly to the old foreign agent 102 to create a new binding cache entry linking the old care-of address with the new care-of address. At this time, the correspondent node 110 is still receiving upstream data packets sent via the old foreign agent 102, and the home agent 112 is still sending downstream data packets to the old foreign agent 102. The old foreign agent 102, after accepting the binding update request, creates the new binding cache entry that links the mobile node's old care-of address with the new care-of address. In this way, the old foreign agent 102 can tunnel all the data packets that were stored and/or arriving at the old care-of address to the new care-of address, i.e., to the new foreign agent 106. The old foreign agent 102 then notifies the mobile node 100 of the creation of this new binding cache entry by sending a binding acknowledgment to the new foreign agent 106.

Phase III-4 involves the mobile node 100 switching its network connection to the new wireless sub-network 108. At this time, the correspondent node 110 is still receiving upstream data packets from the old foreign agent 102, and the home agent 112 is still sending downstream data packets to the old foreign agent 102. The new foreign agent 106 forwards the binding acknowledgment to the mobile node 100 via the new wireless sub-network 108. The old foreign agent 102 thereafter begins forwarding the data packets destined for the old care-of address to the new care-of address via the new foreign agent 106. The forwarded data packets received by the new foreign agent 106 are then sent to the mobile node 100. Thus, a synchronized, and hence, seamless handoff may be achieved, since few or no data packets sent between the correspondent node 110 and the mobile node 100 are lost.

Phase III-5 involves the home agent 112 sending a registration reply (RR) message to the mobile node 100. (Recall that a registration request message was previously sent by the mobile node to the home agent in Phase III-2, which is identical to Phase I-2 and Phase II-2.) At this time, the correspondent node 110 is still receiving upstream data packets from the old foreign agent 102. Once the home agent 112 receives the registration request message from the mobile node, it creates a new binding and sends two registration reply messages to the mobile node 100. One of these messages is sent to the new care-of address via the new foreign agent 106 to notify the mobile node 100 that the new binding has been created. The other one is actually a deregistration reply (DRR) message that is sent, at the same time as the registration reply message is sent to the mobile node 100, to the old foreign agent 102 to notify the mobile node 100 that the binding with the old care-of address has been removed. Note, however, that the old foreign agent 102 has already removed its old binding cache entry in these single access embodiments by virtue of the binding update from the mobile node and, therefore, this deregistration reply message is not actually necessary.

The home agent 112 may now send downstream data packets to the new foreign agent 106. In the meantime, the new foreign agent 106 sends the registration reply to the mobile node 100 to notify the mobile node 100 that the new binding has been successfully created in the home agent 112. The mobile node 100 may now send upstream data packets to the new foreign agent 106, and the new foreign agent 106 may send downstream data packets to the mobile node 100.

Phase III-6 involves the mobile node 100 communicating with the correspondent node 110 via the new foreign agent 106 and the home agent 112 after all the data packets that were sent to the mobile node's old care-of address have been forwarded to the mobile node 100 via the new foreign agent 106.

FIGS. 18A & 18B to 24A & 24B illustrate synchronized handoff in Mobile IPv4 using the route optimization features, according to some embodiments of the invention. In embodiments where the mobile node is capable of simultaneously being connected to two wireless sub-networks, the operation of the synchronized handoff is similar to the operation of the synchronized handoff mechanism with respect to FIGS. 11A & 11B to 15A & 15B. The main difference, however, is that the downstream data packets are sent to the mobile node directly by the correspondent node and not via the home agent. Depending on if the mobile node timely receives a deregistration binding acknowledgment (DBA) from the old foreign agent, two scenarios can be distinguished.

In the first scenario, the mobile node timely receives a deregistration binding acknowledgment from the correspondent node, for a certain binding, before the old wireless access has deteriorated beyond a certain point, i.e., before the mobile node is notified by the Layer 2 protocol that the connection between the mobile node and the old wireless sub-network will be discarded in a very short time. A deregistration binding acknowledgment message is a binding acknowledgment message that is a reply for a deregistration binding update message and is used to notify the source of the deregistration binding update message that the specified binding has been deleted. A deregistration binding update is simply a binding update message that has a lifetime header field equal to zero. Considering that the deregistration binding acknowledgment message is stored and processed by all IP nodes in the same manner as the data packets that belong to the same binding, once the mobile node receives the deregistration binding acknowledgment message, it can be assumed that all packets that belong to the same binding as the deregistration binding acknowledgment, and were sent by the correspondent node downstream to the mobile node, have been received by the mobile node. In this way, a synchronized, and hence, seamless handoff may be achieved.

A handoff according to the first scenario may be accomplished in five operational phases, as shown in FIGS. 18A & 18B to 20. In Phase I-1, the mobile node 100 is communicating with the correspondent node 110 via the old wireless sub-network 104 and old foreign agent 102 in a known manner.

Phase I-2 involves the mobile node 100 sending a registration request (RQ) message to the home agent 112. At this time, the home agent 112 is still sending downstream data packets to the mobile node 100 via the old wireless sub-network 104, and the correspondent node 110 is still receiving upstream data packets from the old foreign agent 102. In Phase I-2, the mobile node 100 discovers the new care-of address of the new foreign agent 106 via either the old foreign agent 102 or via a Layer 2 protocol message between the old and the new wireless sub-networks. Once the mobile node 100 knows the new care-of address, it sends a registration request message to the new foreign agent 106 via either the old foreign agent 102 or a Layer 2 protocol message between the old and the new wireless sub-networks. This registration request message is then sent by the new foreign agent 106 to the home agent 112. Note that this registration request message does not require the creation of a simultaneous binding. Furthermore, the mobile node 100 sends a deregistration binding update (DBU) via the old foreign agent 102 to the correspondent node 110. This deregistration binding update has the "A" flag set, such that the correspondent node 110 is prompted to send a deregistration binding acknowledgment back to the mobile node 100.

Phase I-3 involves the correspondent node 110 sending a deregistration binding acknowledgment message to the mobile node 100. At this time, the correspondent node 110 is still receiving upstream data packets from the old foreign agent 102. Once the correspondent node 110 receives the deregistration binding update message from the mobile node, it deletes the old binding that linked the old care-of address with the mobile node's home address. Next, the correspondent node 110 sends a deregistration binding acknowledgment notification to the mobile node 100 via the old foreign agent 102. Then, once the home agent 112 receives the registration request message sent by the mobile node, it creates a new binding that links the new care-of address with the mobile node's home address. Subsequently, the home agent 112 sends a registration reply (RR) message to the mobile node, via the new foreign agent 106, to notify the mobile node 100 that the new binding has been created. The home agent 112 also sends a binding update to the correspondent node 110 that requests the correspondent node 110 create a new binding for the mobile node 100. This new binding will link the new care-of address with the mobile node's home address. The correspondent node 110 then begins sending downstream data packets to the new foreign agent 106. In the meantime, the new foreign agent 106 sends the registration reply to the mobile node 100 to notify the mobile node 100 that the new binding has been successfully created in the home agent 112. The mobile node 100 may now send upstream data packets to the new foreign agent 106, and the new foreign agent 106 may now send downstream data packets to the mobile node 100.

Phase I-4 involves the mobile node 100 receiving the deregistration binding acknowledgment from the correspondent node 110 via the old foreign agent 102. This means that all or substantially all data packets that belong to the same binding as the deregistration binding acknowledgment and that were sent by the correspondent node 110 downstream to the mobile node 100, have been received by this mobile node 100. Thus, a seamless handoff may be achieved. Note that the correspondent node 110 may still receive upstream data packets via the old foreign agent 102 as well as the new foreign agent 106, whereas the correspondent node 110 sends downstream data packets only to the new foreign agent 106.

Phase I-5 is simply the normal operation of the mobile node 100 after the handoff has been completed, that is, the mobile node 100 is communicating with the correspondent node 110 via the new wireless sub-network 108 and the new foreign agent 106.

In the second scenario, the mobile node 100 does not timely receive the deregistration binding acknowledgment from the correspondent node for a certain binding. When this happens, the mobile node 100 sends a binding update directly to the old foreign agent 102 to create a new binding cache entry linking the old care-of address with the new care-of address. In this way, the old foreign agent 102 can tunnel all the data packets that were stored and/or arriving at the old care-of address of the mobile node 100 to the new care-of address, i.e., to the new foreign agent 106. Thus, the mobile node 100 will receive all the data packets that were stored and sent to the old care-of address, thereby achieving a synchronized, and thus, seamless handoff.

A handoff according to the second scenario can be accomplished in six operational phases. Phase II-1, Phase II-2 and Phase II-3 are identical to Phase I-1, Phase I-2 and Phase II-3, respectively, with regard to FIGS. 18A & 18B to 19A & 19B, and are therefore not shown separately. Phase II-4, Phase II-5, and Phase II-6 are depicted in FIGS. 21 to 22A & 22B.

Phase II-4 involves the mobile node, after being notified by a Layer 2 protocol message that the connection between the mobile node 100 and the old wireless sub-network 104 will be discarded in a very short time, sending a binding update directly to the old foreign agent 102 to create a new binding cache entry linking the old care-of address with the new care-of address. In this way, the old foreign agent 102 can tunnel all the data packets that were stored and/or arriving at the old care-of address of the mobile node 100 to the new care-of address, i.e., to the new foreign agent 106. At this time, the correspondent node 110 may still receive upstream data packets via the old foreign agent 102 as well as the new foreign agent 106, whereas downstream data packets are sent only to the new foreign agent 106.

The old foreign agent 102, after accepting the binding update, creates the new binding cache entry that links the mobile node's old care-of address with the new care-of address and notifies the mobile node 100 by sending a binding acknowledgment thereto via the new foreign agent 106.

Phase II-5 involves the old foreign agent 102 forwarding to the new foreign agent 106 the data packets that were sent to the mobile node's old care-of address. These data packets are then forwarded by the new foreign agent 106 to the mobile node 100. During this phase, the mobile node 100 is communicating with the correspondent node 110 via the new foreign agent 106.

Phase II-6 involves the mobile node 100 communicating with the correspondent node 110 via the new foreign agent 106 after all or substantially all the data packets that were sent to the mobile node's old care-of address are sent to the mobile node 100 via the new foreign agent 106.

Figure 23B:
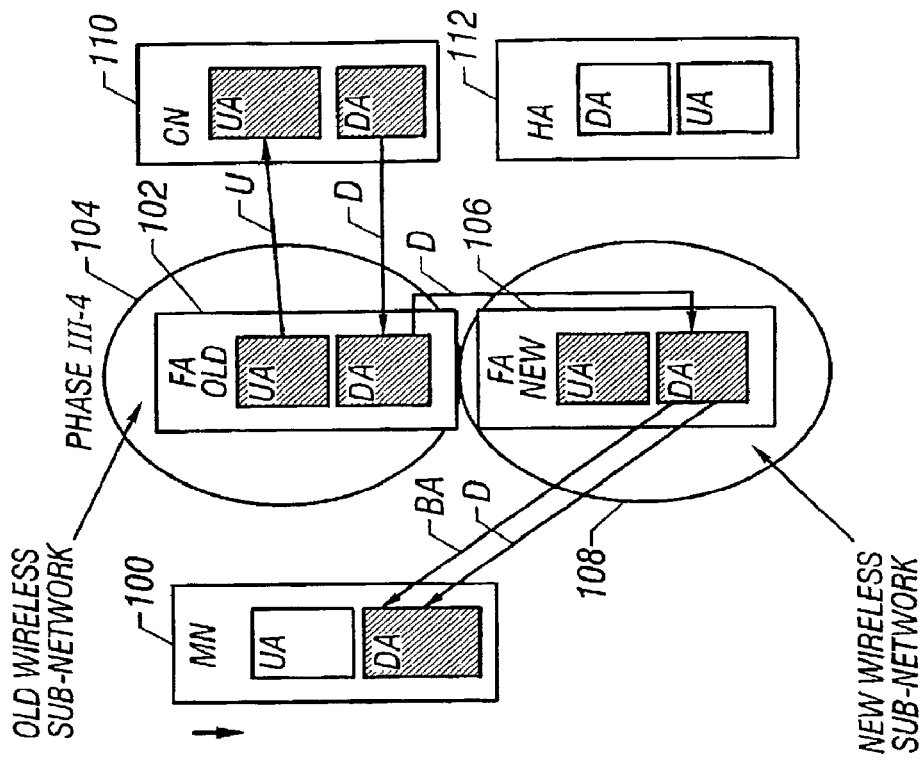
Figure 23A:
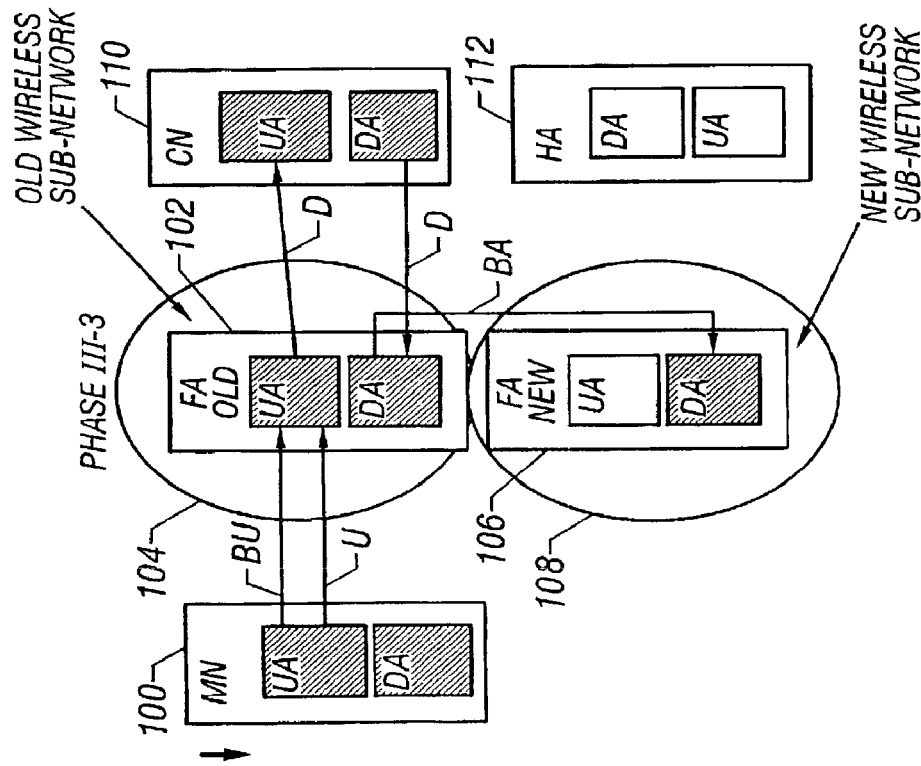
Figure 24B:
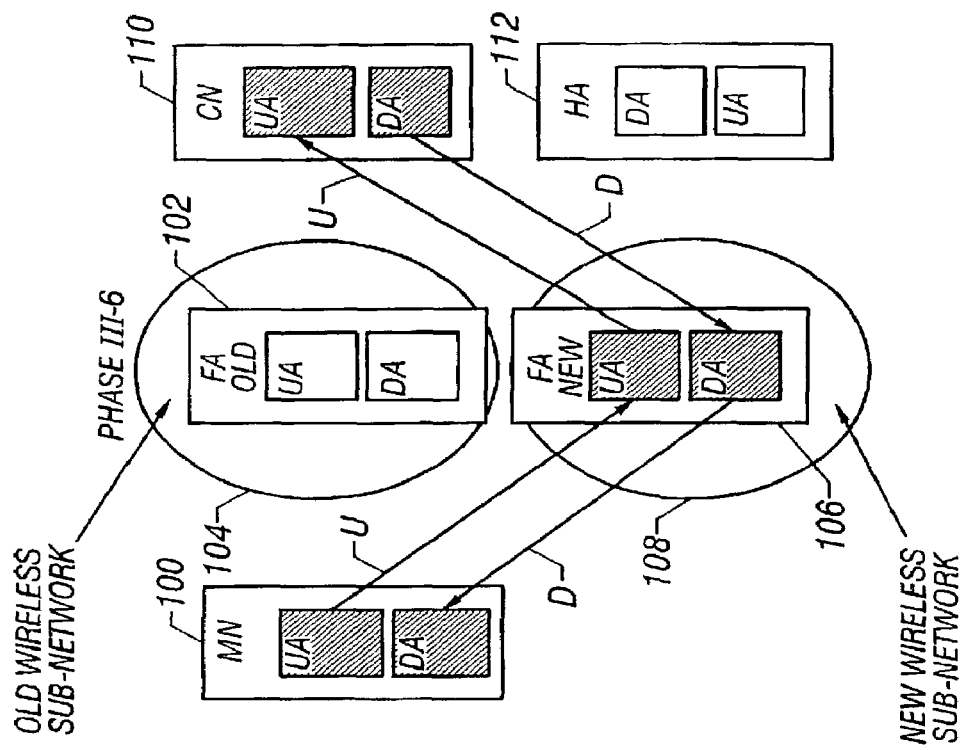
Figure 24A:
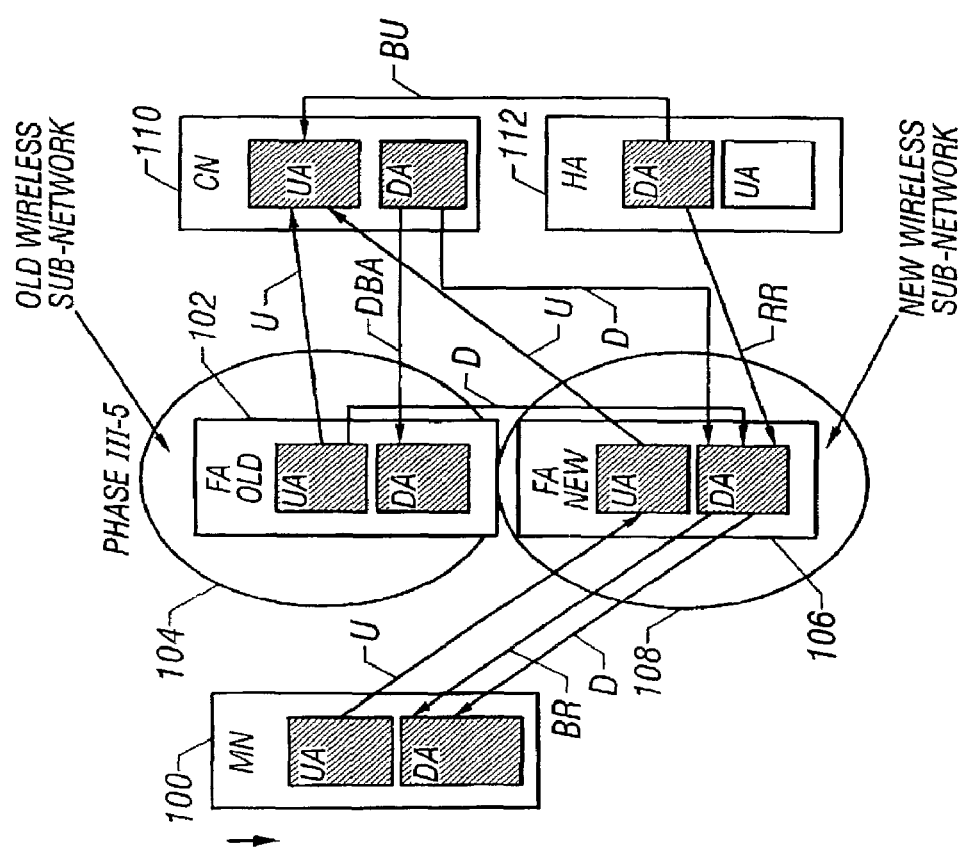
Figure 25B:
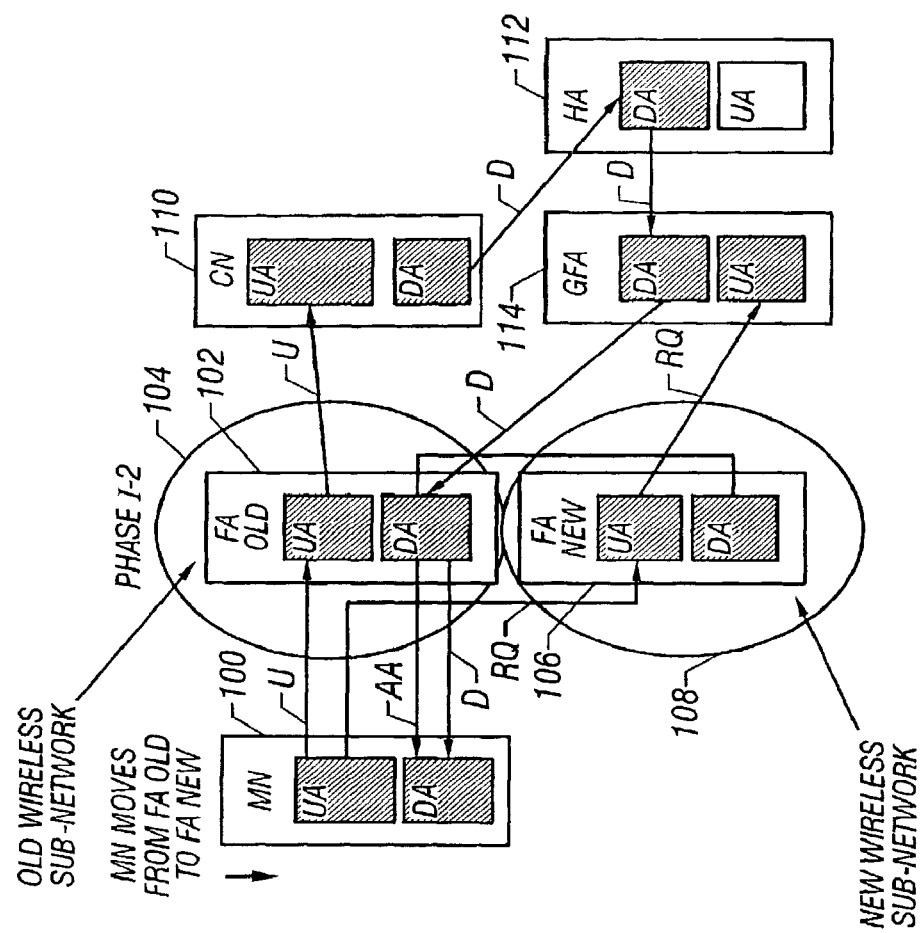
Figure 25A:
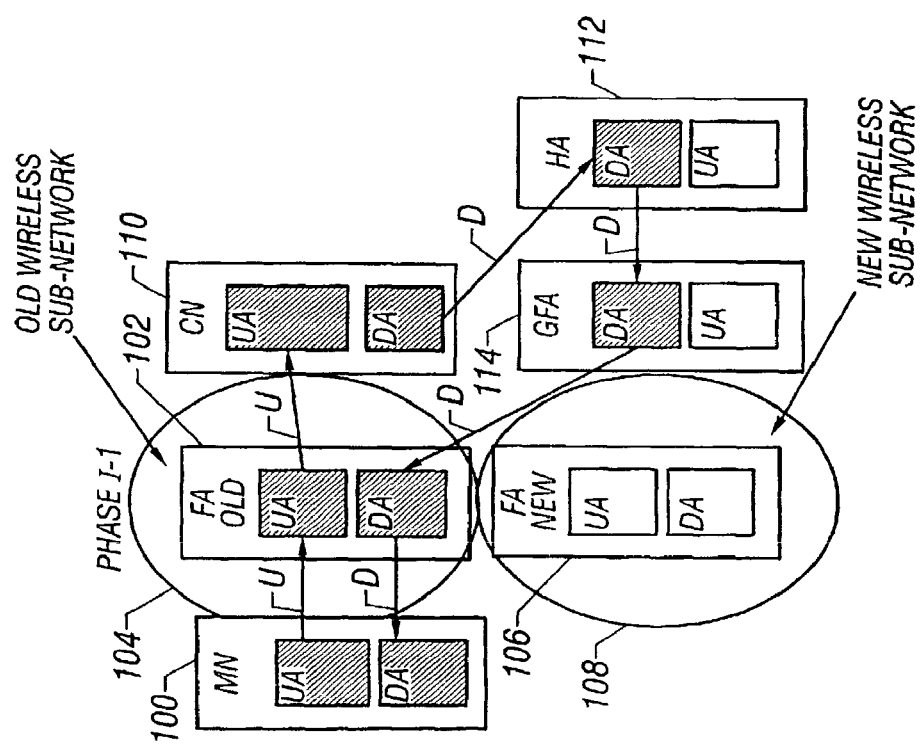
Figures 26A, 26B:
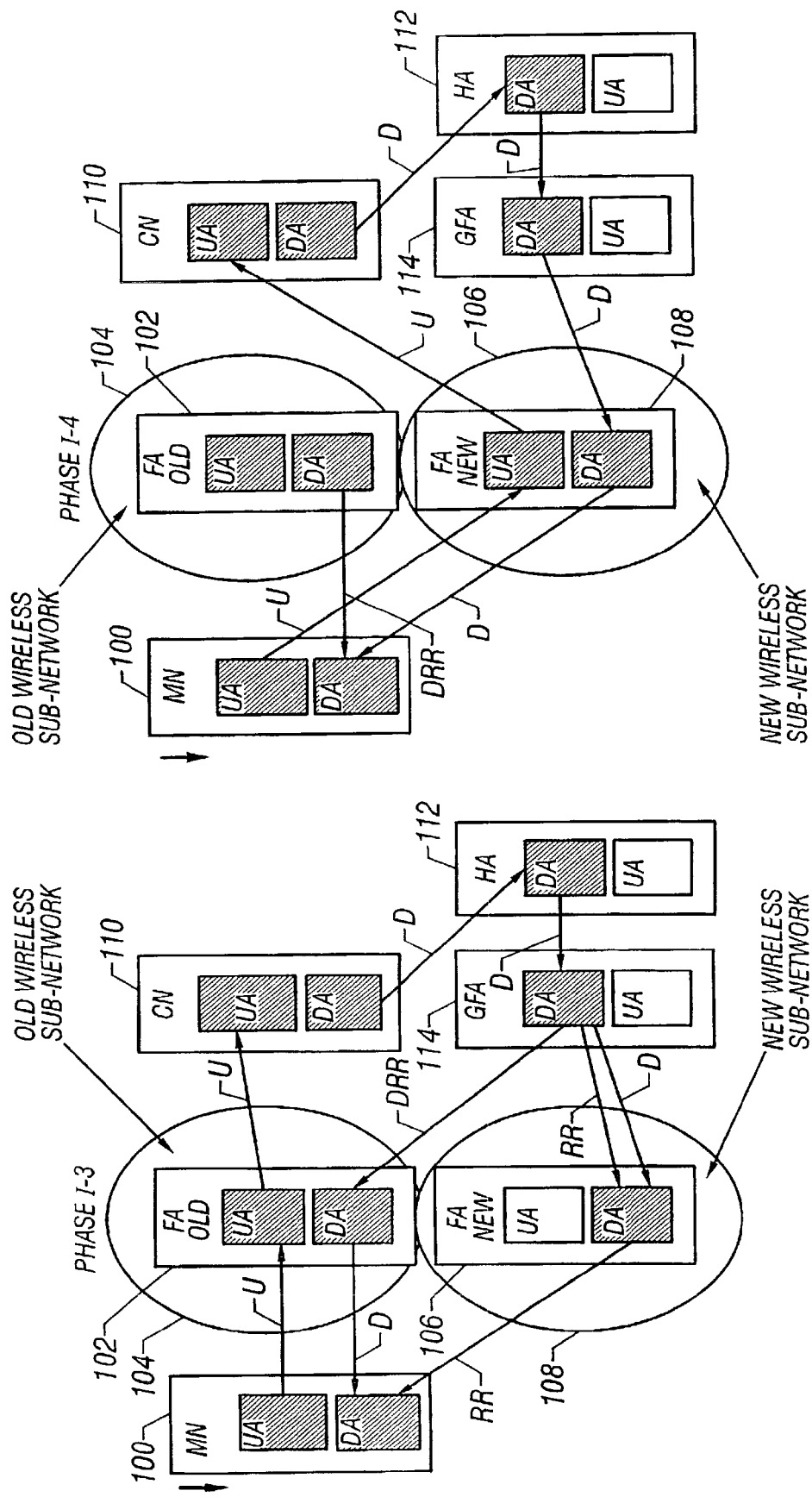
Figures 27, 28:
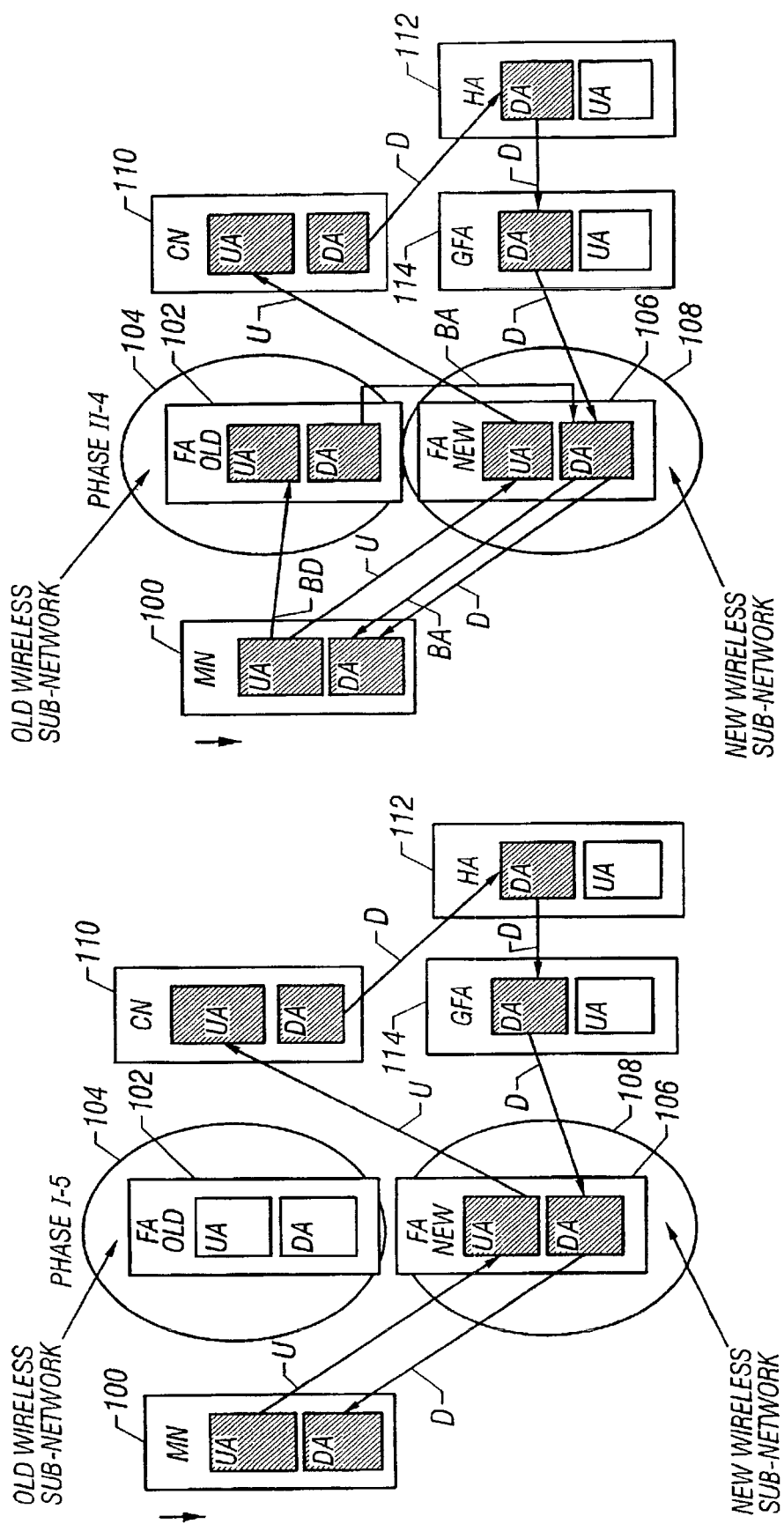
Figure 29B:
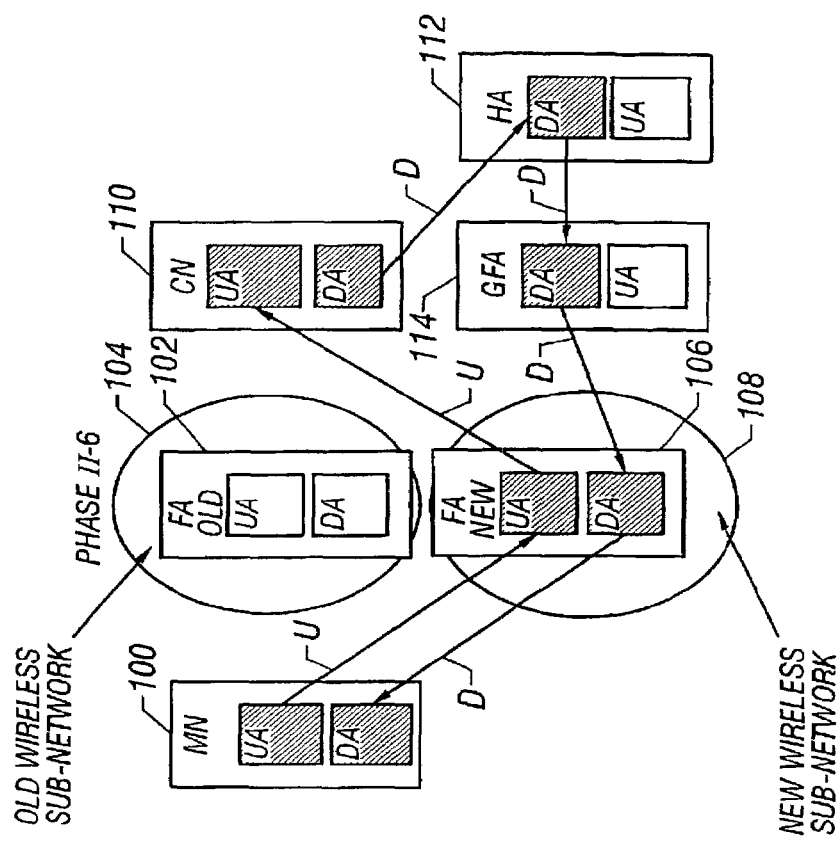
Figure 29A:
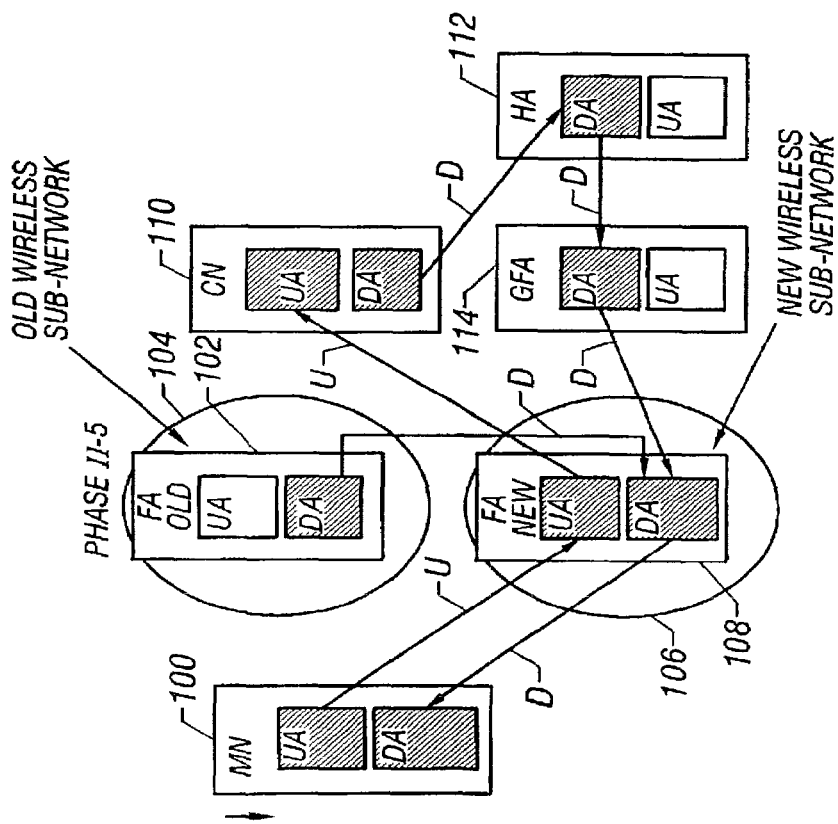

In some embodiments, the mobile node 100 is not capable of being simultaneously connected to two wireless sub-networks and can only be connected to one wireless sub-network at a time. The synchronized handoff procedure in these embodiments is similar to the synchronized handoff procedure described with regard to FIGS. 16A & 16B to 17A & 17B. The main difference is that the downstream data packets are sent by the correspondent node 110 and not by the home agent 112. Synchronized handoff according to these embodiments can also be accomplished in six operational phases. Phase III-1 and Phase III-2 are identical to Phase I-1 and Phase I-2, respectively, described with regard to FIGS. 18A & 18B, and are therefore not shown separately. Phase III-3 and Phase III-4 are depicted in FIGS. 23A & 23B. Phase III-5 and Phase III-6 are depicted in FIGS. 24A & 24B.

Phase III-3 involves the mobile node, after being notified by a Layer 2 protocol message that the connection between the mobile node 100 and the old wireless sub-network 104 will be discarded in a very short time, sending a binding update directly to the old foreign agent 102 to create a new binding cache entry linking the old care-of address with the new care-of address. In this way, the old foreign agent 102 can tunnel all the packets that were stored and/or arriving at the old care-of address of the mobile node 100 to the new care-of address, i.e., to the new foreign agent 106. During this phase, the correspondent node 110 receives upstream data packets sent via the old foreign agent 102 and sends downstream data packets to the old foreign agent 102.

The old foreign agent 102, after accepting the binding update request, creates a new binding cache entry that links the mobile node's old care-of address with the new care-of address. The old foreign agent 102 then notifies the mobile node 100 about the creation of this new binding cache entry by sending a binding acknowledgment to the new foreign agent 106.

Phase III-4 involves the mobile node 100 switching its network connection to the new wireless sub-network 108. At this time, the correspondent node 110 is still receiving upstream data packets from the old foreign agent 102 and sending downstream data packets to the old foreign agent 102. The new foreign agent 106 forwards the binding acknowledgment to the mobile node 100 via the new wireless sub-network 108. The old foreign agent 102 thereafter begins forwarding the data packets destined for the old care-of address to the new care-of address via the new foreign agent 106. The forwarded data packets received by the new foreign agent 106 are then sent to the mobile node 100. In this way, a synchronized, and hence, seamless handoff may be achieved, since few or no packets sent between correspondent node 110 and mobile node 100 are lost.

Phase III-5 involves the home agent 112 sending the registration reply message to the mobile node 100. At this time, the correspondent node 110 can still receive upstream data packets from the old foreign agent 102. Once the home agent 112 receives the registration request message from the mobile node, it creates the new binding and sends one registration reply message to the mobile node 100. This registration reply may be sent to the new care-of address via the new foreign agent 106 to notify the mobile node 100 that the new binding has been created. The mobile node 100 now knows that the new binding has been successfully created. Moreover, the mobile node 100 can now send upstream data packets to the new foreign agent 106 and the new foreign agent 106 can send downstream data packets to the mobile node 100.

The home agent 112 also sends a binding update to the correspondent node 110 to request that it create a new binding for the mobile node 100. This new binding will relate the new care-of address to the mobile node's home address. The correspondent node 110 can now send downstream data packets to the new foreign agent 106.

Phase III-6 involves the mobile node 100 communicating with the correspondent node 110 via the new foreign agent 106 after all or substantially all the data packets that were sent to the mobile node's old care-of address have been forwarded to the mobile node 100 via the new foreign agent 106.

FIGS. 25A & 25B to 31A & 31B illustrate synchronized handoff in Hierarchical Mobile IPv4 according to some embodiments of the invention. In embodiments where the mobile node is capable of simultaneously being connected to two wireless sub-networks the synchronized handoff procedure is similar to the operation of the synchronized handoff procedure described with regard to FIGS. 11A & 11B to 15A & 15B. The main difference is that the registration request message is terminated at the gateway foreign agent (GFA) and not at the home agent. Subsequently, the registration reply and deregistration reply messages are sent by the gateway foreign agent and not by the home agent. Depending on if the mobile node timely receives the deregistration reply message from the old foreign agent, two scenarios can be distinguished.

In the first scenario, the mobile node timely receives the deregistration reply message, for a certain binding, before the old wireless access has deteriorated beyond a certain point, i.e., before the mobile node is notified by a Layer 2 protocol message that the connection between the mobile node and the old wireless sub-network will be discarded in a very short time. Considering that the deregistration reply message is stored and processed by all the IP nodes in the same manner as the data packets that belong to the same binding, once the mobile node receives the deregistration reply message, it can be assumed that all or substantially all data packets that belong to the same binding as the deregistration reply, and were sent by the gateway foreign agent downstream to the mobile node, are received by this mobile node. In this way, few or no data packets sent between the correspondent node and mobile node are lost.

Referring now to FIGS. 25A & 25B to 27, a handoff according to the first scenario is accomplished in five operational phases. In Phase I-1, the mobile node 100 is communicating with the correspondent node 110 via the old wireless sub-network 104, old foreign agent 102, gateway foreign agent 114 and home agent 112 in a known manner.

Phase I-2 involves the mobile node 100 sending a registration request message to the gateway foreign agent 114. At this time, the gateway foreign agent 114 is still sending downstream data packets to the mobile node 100 via the old wireless sub-network 104, and the correspondent node 110 is still receiving upstream data packets from the old foreign agent 102. In Phase I-2, The mobile node 100 discovers the new care-of address of the new foreign agent 106 via either the old foreign agent 102 or via a Layer 2 protocol message between the old and the new wireless sub-networks. Once the mobile node 100 knows the new care-of address, it send a registration request message to the new foreign agent 106 via either the old foreign agent 102 or via a Layer 2 protocol message between the old and the new wireless sub-networks. This registration request message is then forwarded to the gateway foreign agent 114. Note that this registration request message does not require the creation of a simultaneous binding.

Phase I-3 involves the gateway foreign agent 114 sending a registration reply message to the mobile node 100. At this time, the correspondent node 110 is still receiving upstream data packets from the old foreign agent 102. Once the gateway foreign agent 114 has received the registration request message from the mobile node, it creates a new binding and sends two registration reply messages to the mobile node 100. One of these registration reply messages is sent to the new care-of address via the new foreign agent 106, which forwards the registration reply message to the mobile node 100 to notify the mobile node 100 that the new binding has been created. The mobile node 100 now knows that the new binding has been successfully created, and that upstream data packets may now be sent to, and downstream data packets may be received from, the new foreign agent 106. The second registration reply message is actually a deregistration reply message that is sent to the old care-of address via the old foreign agent 102 to notify the mobile node 100 that the binding with the old care-of address has been removed.

Phase I-4 involves the mobile node 100 receiving the deregistration reply message via the old foreign agent 102. This means that all data packets that belong to the same binding as the deregistration reply, and were sent by the gateway foreign agent 114 downstream to the mobile node, have now been received by the mobile node 100. Thus, a synchronized, and hence, seamless handoff may be achieved, since few or no data packets sent between the correspondent node 110 and the mobile node 100 are lost.

Note that the correspondent node 110 may still receive upstream data packets via the old foreign agent 102 as well as the new foreign agent 106, whereas the gateway foreign agent 114 sends downstream data packets only to the new foreign agent 106.

Phase I-5 is simply the normal operation of the mobile node 100 after the handoff is completed, that is, the mobile node 100 is communicating with the correspondent node 110 via the new wireless sub-network 108, new foreign agent 106, gateway foreign agent 114 and home agent 112.

In the second scenario, the mobile node 100 does not timely receive the deregistration reply for a certain binding. When this happens, the mobile node 100 sends a binding update directly to the old foreign agent 102 to create a new binding cache entry that links the old care-of address with the new care-of address. In this way, the old foreign agent 102 can tunnel all the data packets that were stored and/or arriving at the old care-of address of the mobile node 100 to the new care-of address, i.e., to the new foreign agent 106. Thus, the mobile node 100 will receive all the data packets that were stored and/or sent to the old care-of address, thereby achieving a synchronized, and hence, seamless handoff.

A handoff according to the second scenario can be accomplished in six operational phases. Phase II-1, Phase II-2 and Phase II-3 are identical to Phase I-1, Phase I-2 and Phase I-3, respectively, described with respect to FIGS. 25A & 25B to 26A & 26B, and are therefore not shown separately. Phase II-4, Phase II-5, and Phase II-6 are depicted in FIGS. 28 to 29A & 29B.

Phase II-4 involves the mobile node, after being notified by a Layer 2 protocol message that the connection between the mobile node 100 and the old wireless sub-network 104 will be discarded in a very short time, sending a binding update directly to the old foreign agent 102 to create a new binding cache entry linking the old care-of address with the new care-of address. In this way, the old foreign agent 102 can tunnel all the data packets that were stored and/or arriving at the old care-of address of the mobile node 100 to the new care-of address, i.e., to the new foreign agent 106. The old foreign agent 102, after accepting this binding update request, creates the new binding cache entry and notifies the mobile node 100 by sending thereto a binding acknowledgment message via the new foreign agent 106.

Phase II-5 involves the old foreign agent 102 forwarding to the new foreign agent 106 the data packets that were sent to the mobile node's old care-of address. These data packets are then forwarded by the new foreign agent 106 to the mobile node 100. During this phase, the mobile node 100 is communicating with the correspondent node 110 via the new foreign agent 106 and the gateway foreign agent 114.

Phase II-6 involves the mobile node 100 communicating with the correspondent node 110 via the new foreign agent 106 and the gateway foreign agent 114 after all or substantially all the data packets that were sent to the mobile node's old care-of address have been forwarded to the mobile node 100 via the new foreign agent 106.

Figure 30B:
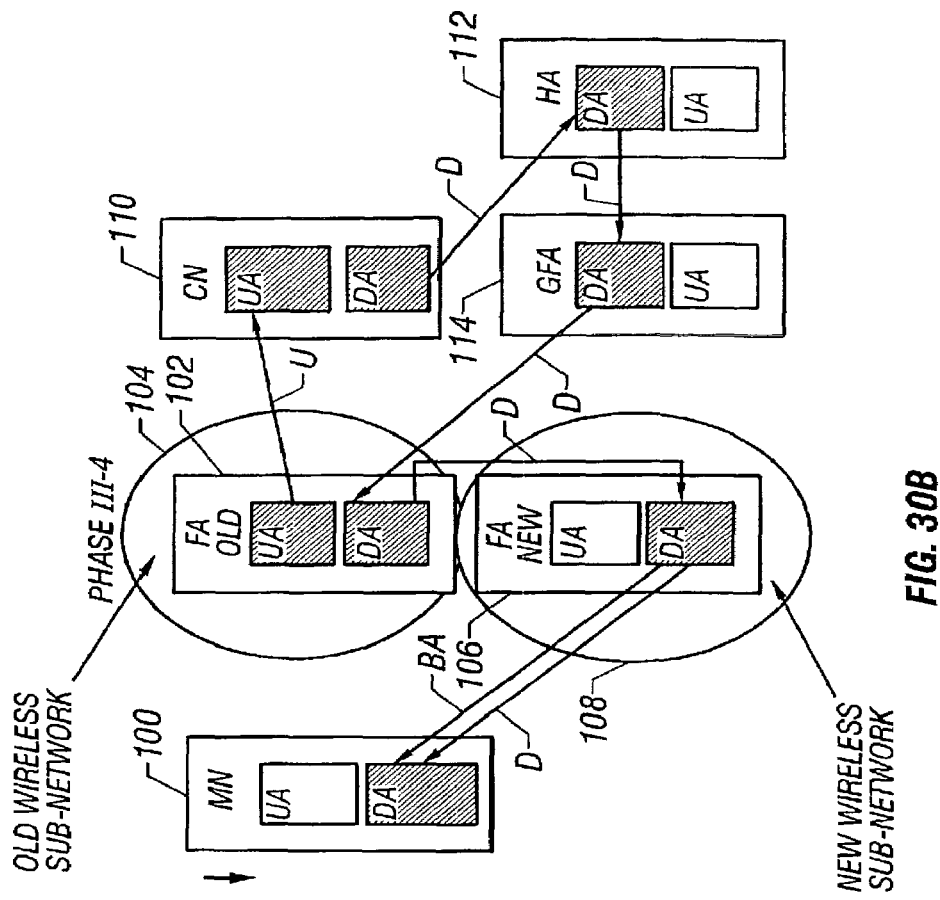
Figure 30A:
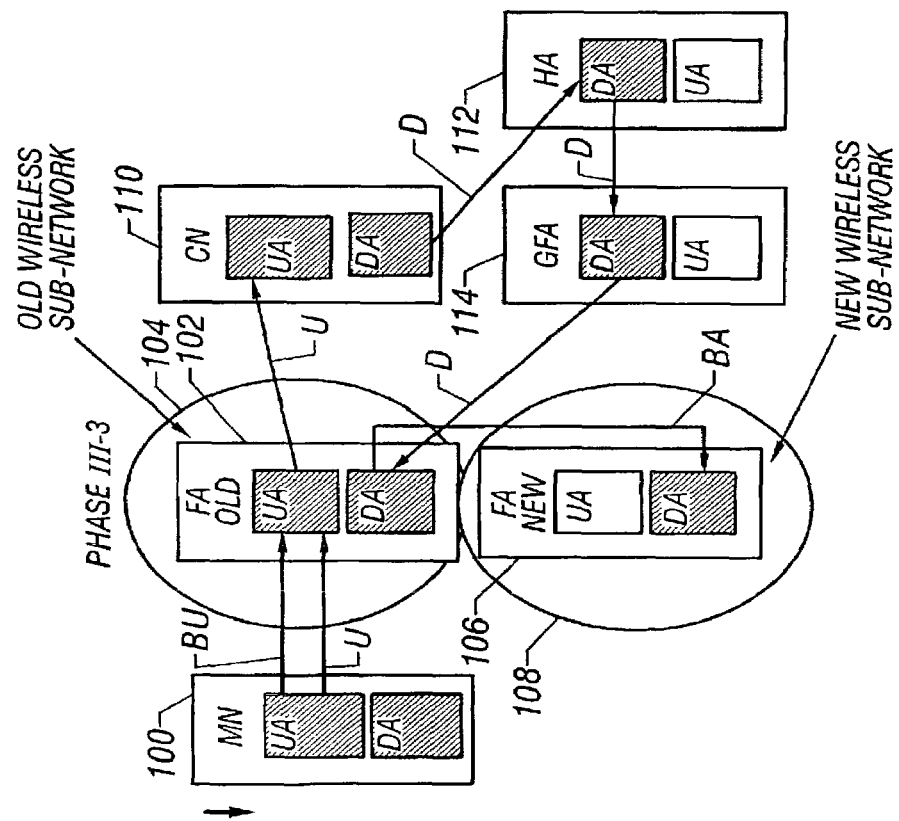
Figures 33A, 33B:
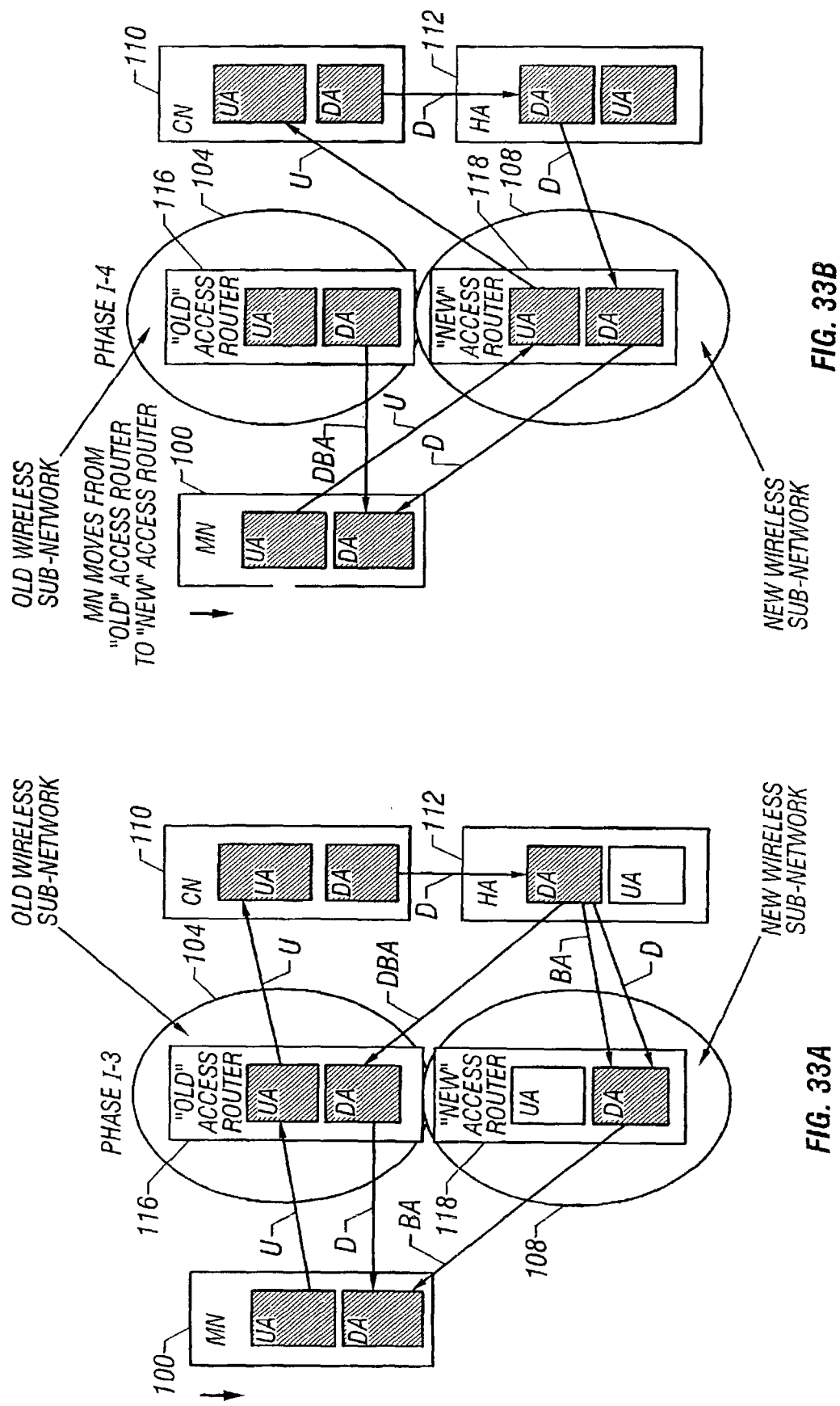
Figures 36A, 36B:
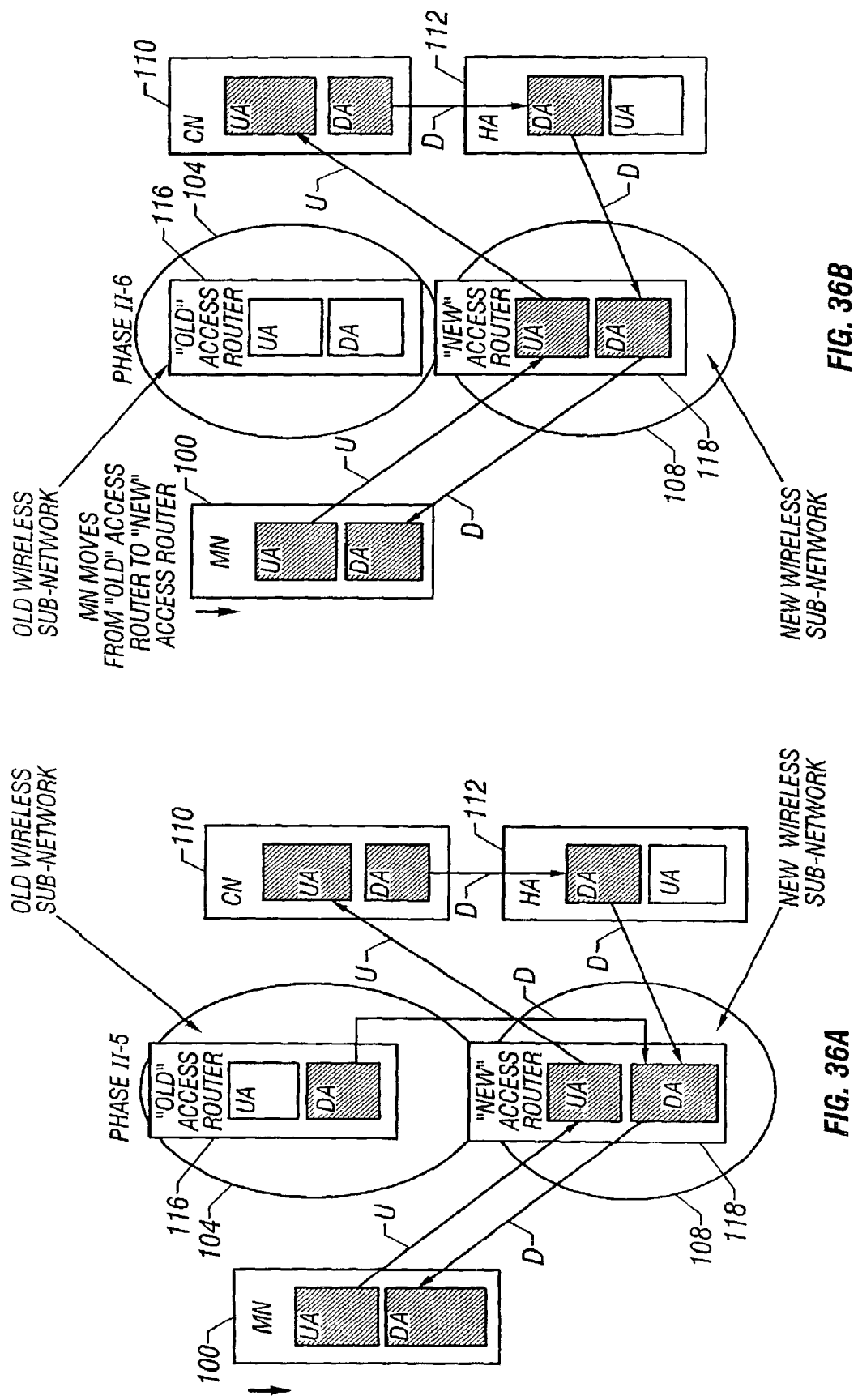

In some embodiments, the mobile node 100 is not capable of being simultaneously connected to two wireless sub-networks and can only be connected to one wireless sub-network at a time. Synchronized handoff according to these embodiments can also be accomplished in six operational phases. Phase III-1 and Phase III-2 are identical to phases Phase I-1 and Phase I-2, respectively, described with regard to FIGS. 25A & 25B, and are therefore not shown separately. Phase III-3 and Phase III-4 are depicted in FIGS. 30A & 30B, and Phase III-5 and Phase III-6 are depicted in FIGS. 31A & 31B.

Phase III-3 involves the mobile node, after being notified by a Layer 2 protocol message that the connection between the mobile node 100 and the old wireless sub-network 104 will be discarded in a very short time, sending a binding update directly to the old foreign agent 102 to create a new binding cache entry linking the old care-of address with the new care-of address. In this way, the old foreign agent 102 can tunnel all the data packets that were stored and/or arriving at the old care-of address of the mobile node 100 to the new care-of address, i.e., to the new foreign agent 106. During this phase, the correspondent node 110 receives upstream data packets sent via the old foreign agent 102, and the gateway foreign agent 114 sends downstream data packets to the old foreign agent 102.

The old foreign agent 102, after accepting this binding update request, creates a new binding cache entry and notifies the mobile node 100 of this new binding cache entry by sending a binding acknowledgment to the new foreign agent 106.

Phase III-4 involves the mobile node 100 switching its network connection to the new wireless sub-network 108. At this time, the correspondent node 110 is still receiving upstream data packets from the old foreign agent 102, and the gateway foreign agent 114 is sending downstream data packets to the old foreign agent 102. The new foreign agent 106 forwards the binding acknowledgment to the mobile node 100 via the new wireless sub-network 108. The old foreign agent 102 thereafter begins forwarding the data packets destined for the old care-of address to the new care-of address via the new foreign agent 106. The forwarded data packets received by the new foreign agent 106 are then sent to the mobile node 100. In this way, a synchronized, and hence, seamless handoff may be achieved, since few or no data packets sent between the correspondent node 110 and the mobile node 100 are lost.

Phase III-5 involves the gateway foreign agent 114 sending the registration reply message to the mobile node 100. At this time, the correspondent node 110 is still receiving upstream data packets from the old foreign agent 102. Once the gateway foreign agent 114 receives the registration request message from the mobile node, it creates the new binding and sends two registration reply messages to the mobile node 100. One of these messages is sent to the new care-of address via the new foreign agent 106 to notify the mobile node 100 that the new binding has been created. The other registration reply is actually a deregistration reply message that is sent to the old foreign agent 102 to notify the mobile node 100 that the binding with the old care-of address has been removed. However, since the old foreign agent 102 has already removed the old binding in these single access embodiments, this deregistration reply message is not actually necessary.

The gateway foreign agent 114 may now send downstream data packets to the new foreign agent 106. In the meantime, the new foreign agent 106 sends the registration reply to the mobile node 100 to notify the mobile node 100 that the new binding has been successfully created in the gateway foreign agent 114. The mobile node 100 may now begin sending upstream data packets to the new foreign agent 106, and the new foreign agent 106 may send downstream data packets to the mobile node 100.

Phase III-6 involves the mobile node 100 communicating with the correspondent node 110 via the new foreign agent 106, the gateway foreign agent 114 and home agent 112 after all or substantially all the data packets that were sent to the mobile node's old care-of address have been forwarded to the mobile node 100 via the new foreign agent 106.

FIGS. 32A & 32B to 38A & 38B illustrate synchronized handoff in Mobile IPv6 without route optimization features according to some embodiments of the invention. In embodiments where the mobile node is capable of simultaneously being connected to two wireless sub-networks, two scenarios can be distinguished, depending on whether the mobile node timely receives the deregistration binding update message from the old access router.

In the first scenario, the mobile node timely receives a deregistration binding acknowledgment for a certain binding before the old wireless access has deteriorated beyond a certain point, i.e., before the mobile node is notified by a Layer 2 protocol message that the connection between the mobile node and the old wireless sub-network will be discarded in a very short time. Because the deregistration binding acknowledgment message is stored and processed by all the IP nodes in the same manner as the data packets that belong to the same binding, it may be assumed that once the mobile node receives the deregistration binding acknowledgment message, all data packets that belong to the same binding as the deregistration binding acknowledgment and were sent by the home agent downstream to the mobile node have been received by the mobile node. In this way, a seamless handoff may be achieved, since few or no data packets sent between the correspondent node and the mobile node are lost.

A handoff according to the first scenario may be accomplished in five operational phases, as shown in FIGS. 32A & 32B to 34. In Phase I-1, the mobile node 100 is simply communicating with the correspondent node 110 via the old wireless sub-network 104, old access router 116 and home agent 112 in a known manner.

Phase I-2 involves the mobile node 100 sending a binding update message to the home agent 112. At this time, the home agent 112 is still sending downstream data packets to the mobile node 100 via the old wireless sub-network 104, and the correspondent node 110 is still receiving upstream data packets from the old access router 116. In Phase I-2, the mobile node 100 discovers the new care-of address of the new access router 118 via either the old access router 116 or via a Layer 2 protocol message between the old and new wireless sub-networks. Once the mobile node 100 knows the new care-of address of the new access router 118, it sends a binding update to the new access router 118 via either the old access router 116 or via a Layer 2 protocol message between the old and new wireless sub-networks. This binding update is then sent by the new access router 118 to the home agent 112. The mobile node 100 then sends a deregistration binding update to the home agent 112 via the old access router 116 in order to delete the old binding from the home agent 112. Note that the "A" flag for both binding update messages (BU and DBU) is set to active in order to cause the home agent 112 to send acknowledgment messages to the mobile node 100.

Phase I-3 involves the home agent 112 sending the binding acknowledgment message to the mobile node 100. At this time, the correspondent node 110 is still receiving upstream data packets from the old access router 116. Once the home agent 112 receives the binding update message from the mobile node 100, it creates a new binding for the new care-of address and sends a binding acknowledgment message to the mobile node 100. This message is sent to the mobile node's new care-of address via the new access router 118 to notify the mobile node 100 that the new binding has been created. The mobile node 100 now knows that the new binding has been successfully created and may begin sending upstream data packets to, and receiving downstream data packets from, the new access router 118. When the home agent 112 receives the deregistration binding update message, it deletes the old binding that it had stored for the mobile node's old care-of address and sends a deregistration binding acknowledgment to the mobile node 100 via the old access router 116. The home agent 112 then sends downstream data packets to the new access router 118, as the new access router 118 sends the binding acknowledgment to the mobile node 100.

Phase I-4 involves the mobile node 100 receiving the deregistration binding acknowledgment message via the old access router 116. This means that all, or substantially all, data packets that belong to the same binding as the deregistration binding acknowledgment, and that were sent by the home agent 112 downstream to the mobile node 100, have been received by the mobile node 100. Thus, a synchronized, and hence, seamless handoff may be achieved. Note that the correspondent node 110 may still receive upstream data packets via the old access router 116 as well as via the new access router 118, whereas the home agent 112 sends downstream data packets only to the new access router 118.

Phase I-5 is simply the normal operation of the mobile node 100 after the handoff is completed, that is, the mobile node 100 is communicating with the correspondent node 110 via the new wireless sub-network 108, new access router 118 and the home agent 112.

In the second scenario, the mobile node 100 does not timely receive the deregistration binding acknowledgment When this happens, the mobile node 100 sends a binding update directly to the old access router 116 to create a new binding cache entry linking the old care-of address with the new care-of address. In this way, the old access router 116 can tunnel all, or substantially all, the data packets that were stored and/or arriving at the old care-of address of the mobile node 100 to the new care-of address, i.e., to the new foreign agent. Thus, a seamless handoff may be achieved, since few or no data packets sent between the correspondent node 110 the and mobile node 100 are lost.

A handoff according to the second scenario may be accomplished in six operational phases. Phase II-1, Phase II-2 and Phase II-3 are identical to phases Phase I-1, Phase I-2 and Phase I-3, respectively, described with reference to FIGS. 32A & 32B to 34, and are therefore not shown separately. Operational Phase II-4, Phase II-5, and Phase II-6 are depicted in FIGS. 35 to 36A & 36B.

Phase II-4 involves the mobile node 100, after being notified by a Layer 2 protocol that the connection between the mobile node 100 and the old wireless sub-network 104 will be discarded in a very short time, sending a binding update (BU2) directly to the old access router 116 to create a new binding cache entry linking or binding the old care-of address with the new care-of address. The old access router 116 has now become a temporary home agent for the mobile node 100. After accepting this binding update request, the old access router 116 creates the new binding cache that links the mobile node's old care-of address with the mobile node's new care-of address and notifies the mobile node 100 by sending a binding acknowledgment (BA2) message thereto via the new access router 118.

Phase II-5 involves the old access router 116 forwarding to the new access router 118 the data packets that were sent to the mobile node's old care-of address. These data packets are then forwarded by the new access router 118 to the mobile node 100. During this phase, the mobile node 100 is communicating with the correspondent node 110 via the new access router 118 and the home agent 112.

Phase II-6 involves the mobile node 100 communicating with the correspondent node 110 via the new access router 118 and the home agent 112 after all, or substantially all, the data packets that were sent to the mobile node's old care-of address have been forwarded to the mobile node 100 via the new access router 118.

Figure 38B:
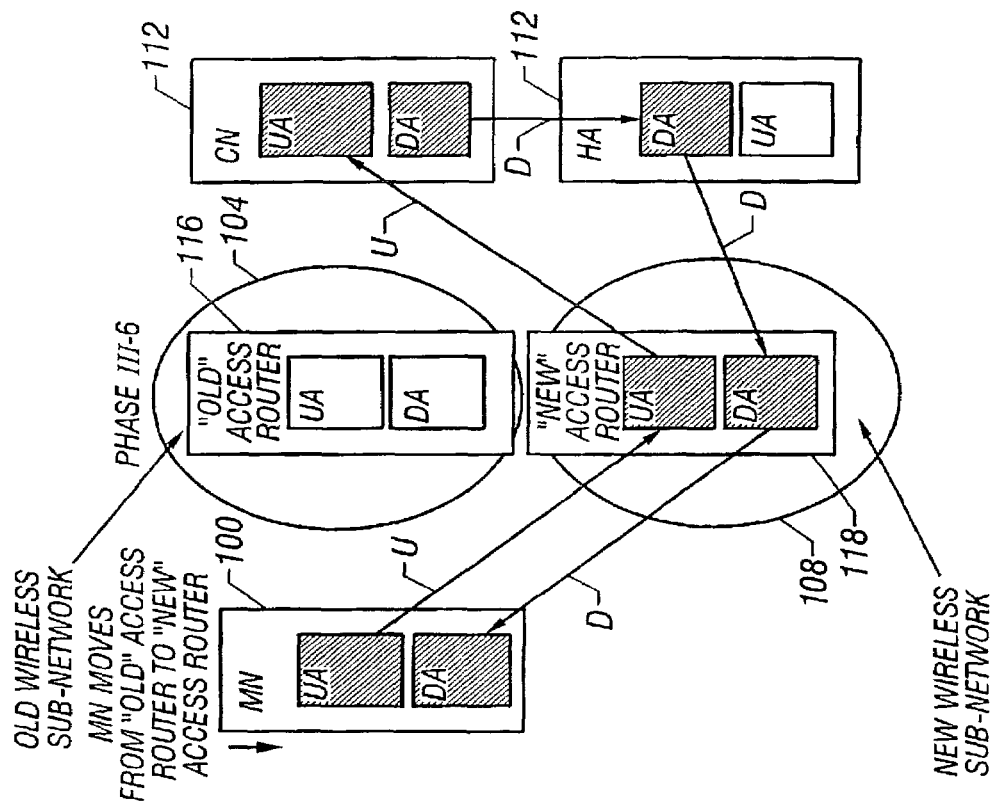
Figure 38A:
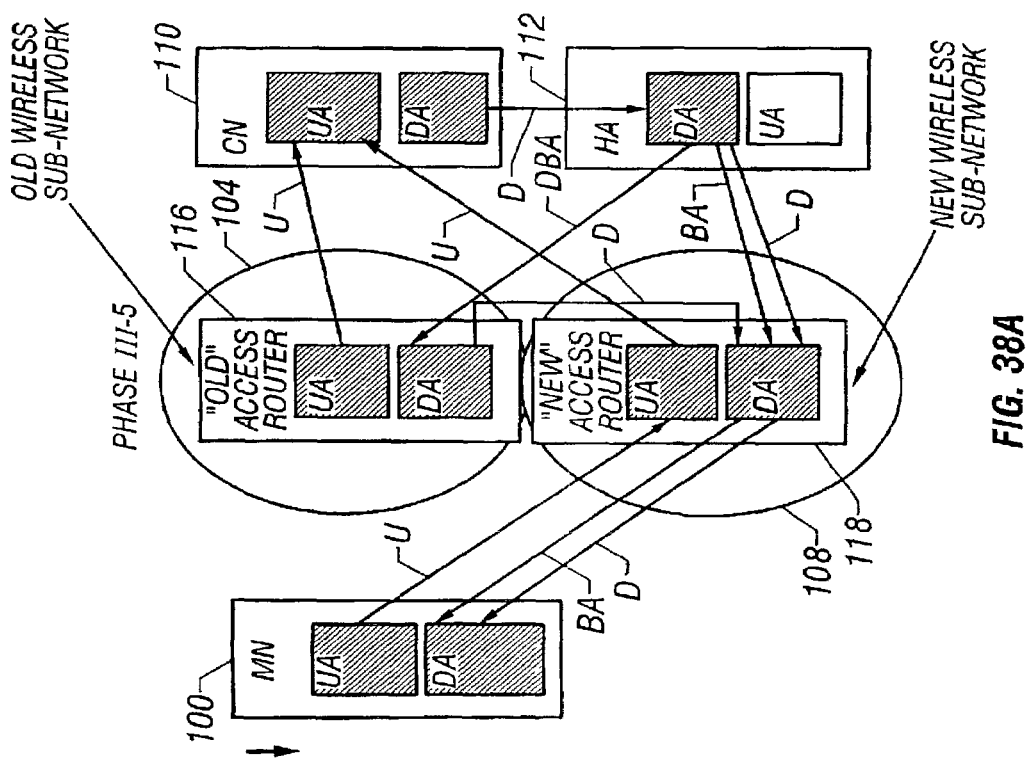
Figure 39B:
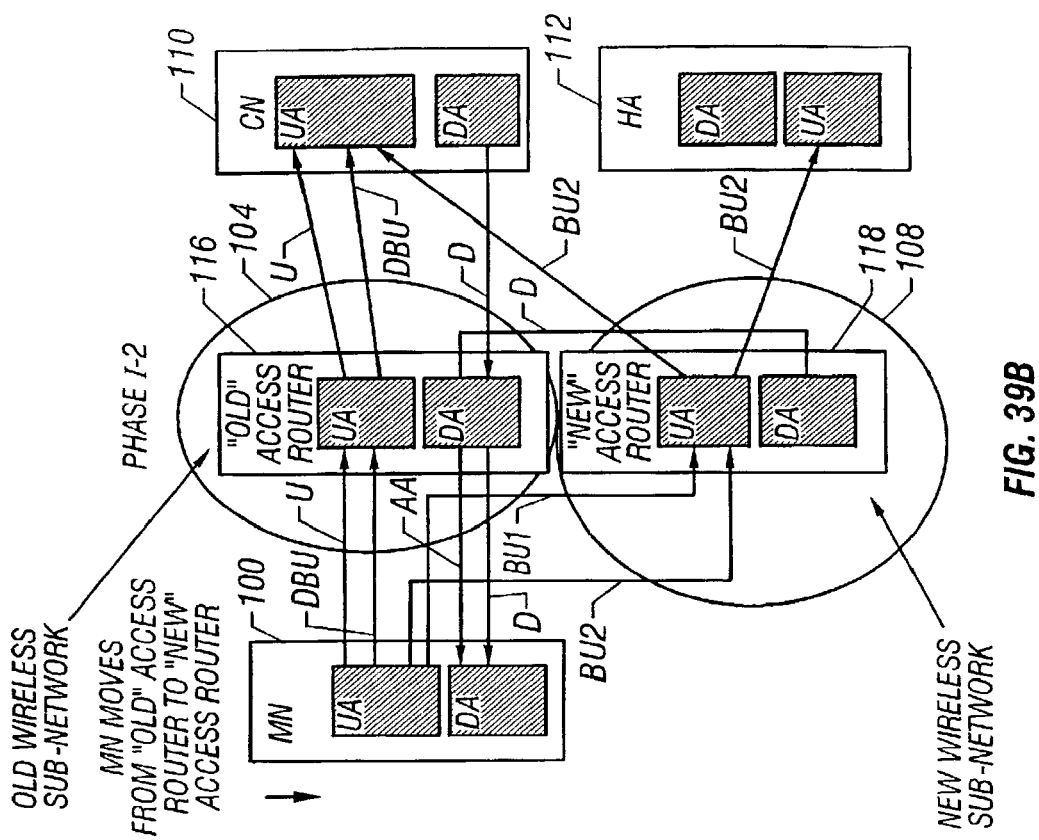
Figure 39A:
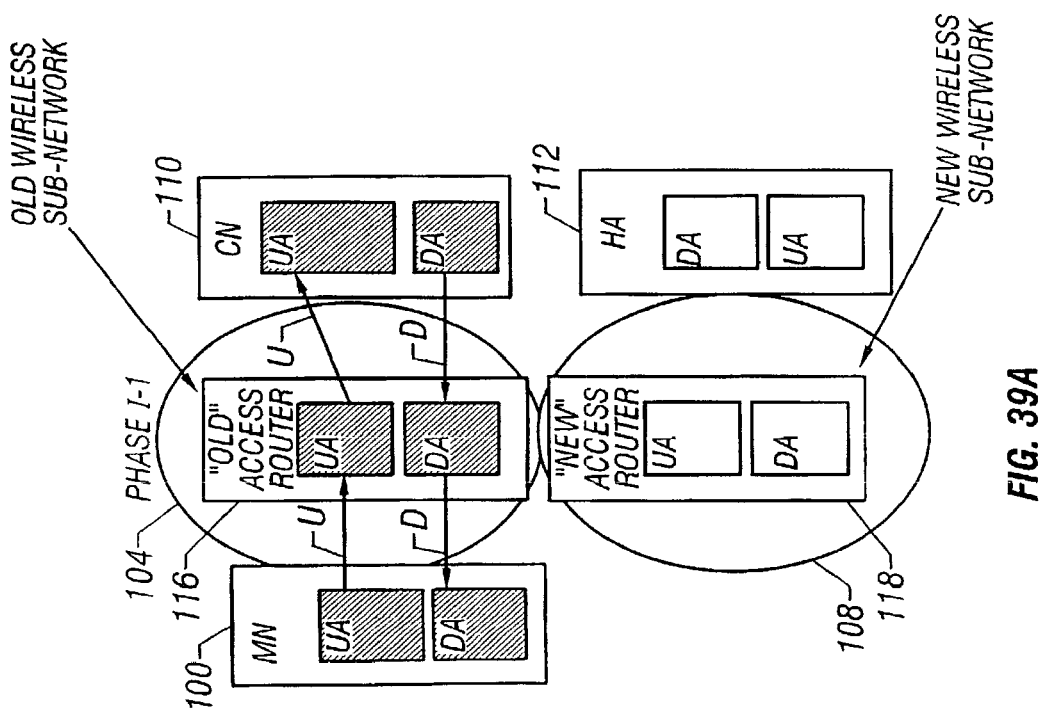
Figures 41, 42:
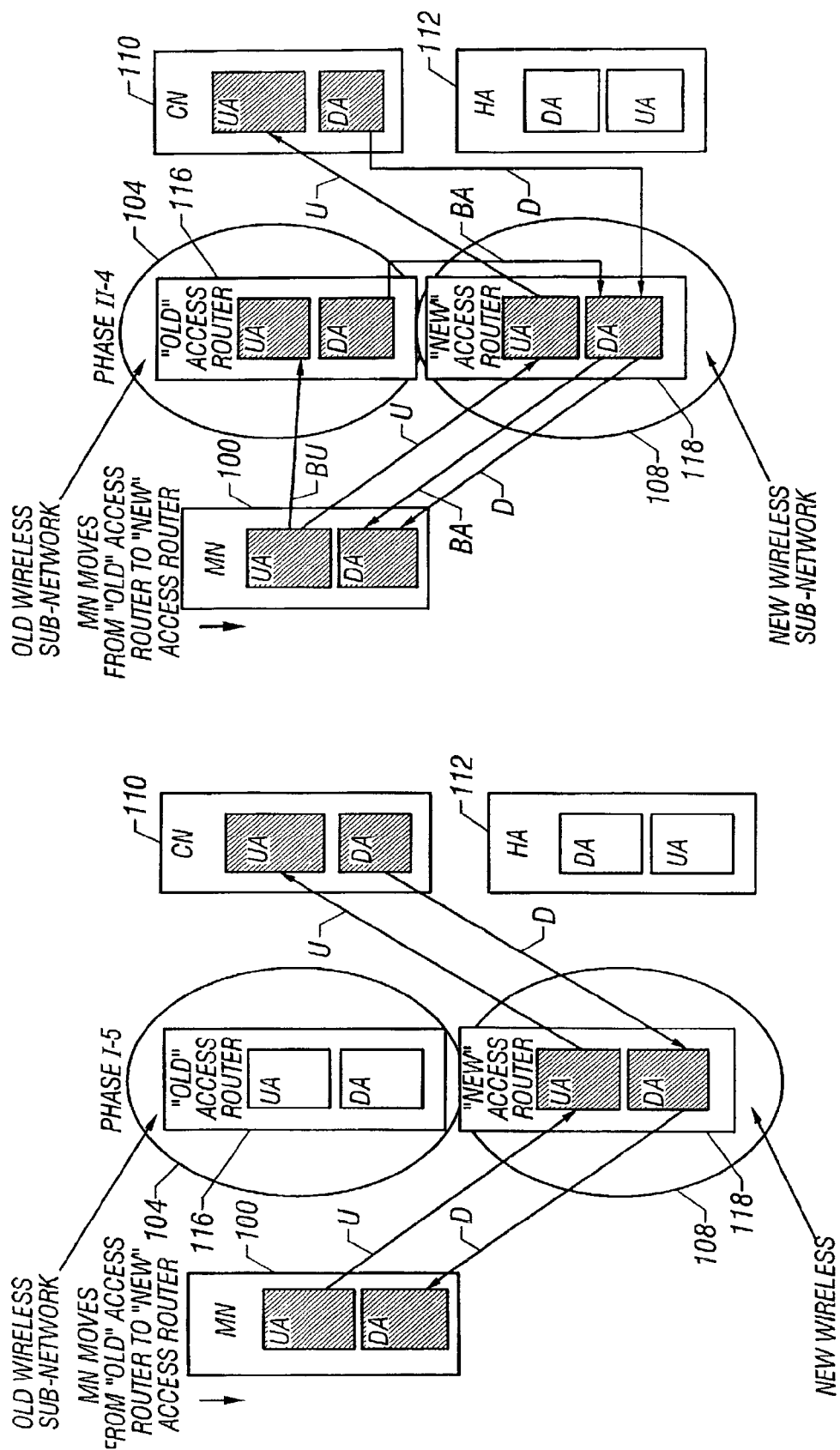
Figures 43A, 43B:
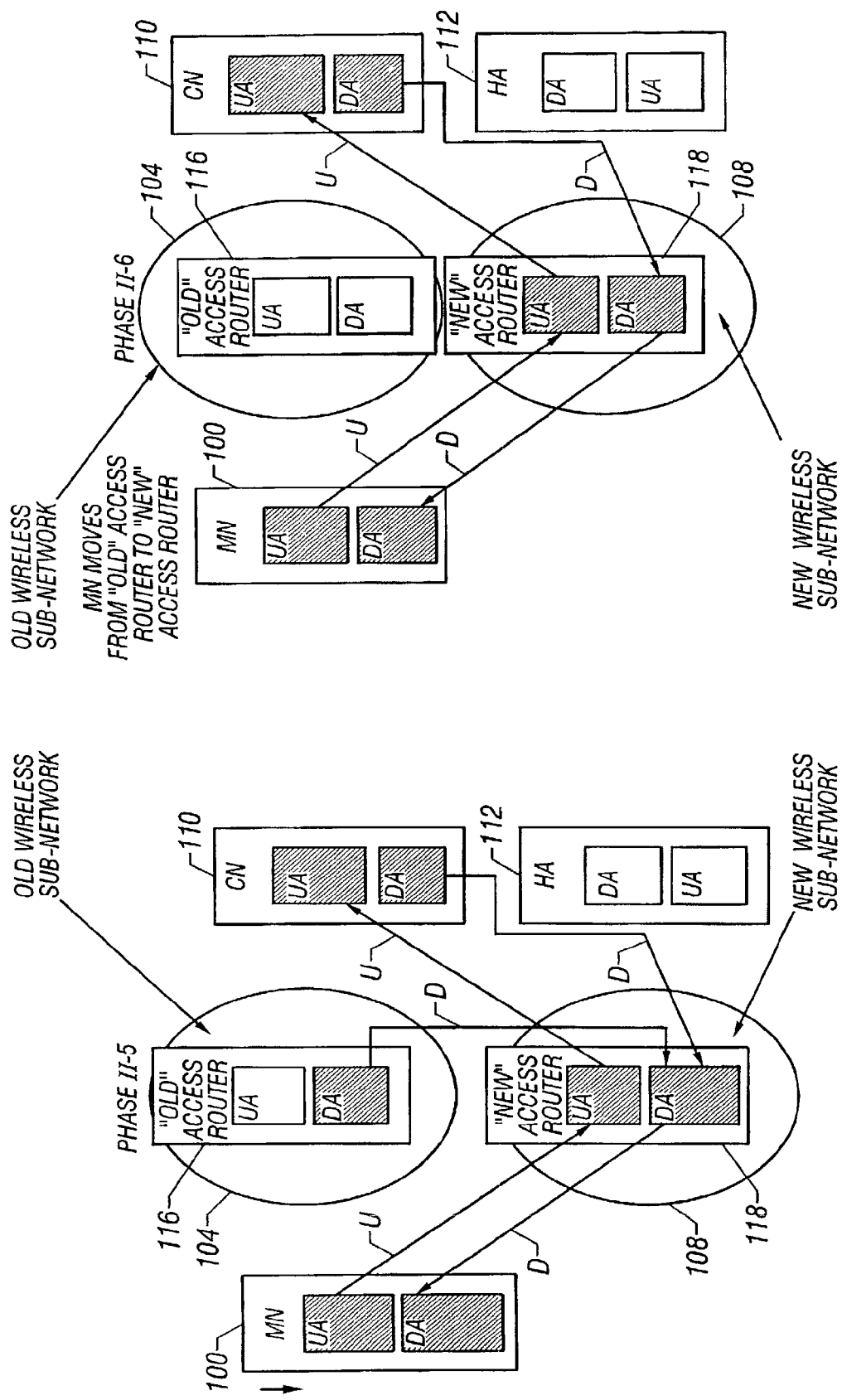

In some embodiments, the mobile node 100 is not capable of being simultaneously connected to two wireless sub-networks and can only be connected to one wireless sub-network at a time. Synchronized handoff in these embodiments can also be accomplished in six operational phases. Phase III-1 and Phase III-2 are identical to phases Phase I-1 and Phase I-2, respectively, described with respect to FIGS. 32A & 32B and are therefore not shown separately. Phase III-3 and Phase III-4 are depicted in FIGS. 37A & 37B, and Phase III-5 and Phase III-6 are depicted in FIGS. 38A & 38B.

Phase III-3 involves the mobile node 100, after being notified by a Layer 2 protocol message that the connection between the mobile node 100 and the old wireless sub-network 104 will be discarded in a very short time, sending a binding update (BU2) directly to the old access router 116 to create a new binding cache entry linking the old care-of address with the new care-of address. At this time, the correspondent node 110 is still receiving upstream data packets via the old access router 116, and the home agent 112 is still sending downstream data packets to the old access router 116. The old access router 116, after accepting this binding update request, creates the new binding cache entry that links the mobile node's old care-of address with the new care-of address. In this way, the old access router 116 can tunnel all the data packets that were stored and/or arriving at the old care-of address of the mobile node 100 to the new care-of address, i.e., to the new access router 118, thereby becoming a temporary home agent for this mobile node 100. The old access router 116 then notifies the mobile node 100 about the creation of this new binding cache entry by sending a binding acknowledgment (BA2) to the new access router 118.

Phase III-4 involves the mobile node 100 switching its network connection to the new wireless sub-network 108. At this time, the correspondent node 110 is still receiving upstream data packets from the old access router 116, and the home agent 112 is sending downstream data packets to the old access router 116. The new access router 118 forwards the binding acknowledgment (BA2) to the mobile node 100 via the new wireless sub-network 108. The old access router 116 thereafter begins forwarding the data packets sent from the old care-of address to the new care-of address via the new access router 118. The forwarded data packets received by the new access router 118 are then sent to the mobile node 100. In this way, a synchronized, and hence, seamless handoff may be achieved, since few or no packets sent between the correspondent node 110 and the mobile node 100 are lost.

Phase III-5 involves the home agent 112 sending a deregistration binding acknowledgment message to the mobile node 100. At this time, the correspondent node 110 is still receiving upstream data packets from the old access router 116. Once the home agent 112 receives the binding update message from the mobile node 100, it creates the new binding and sends a binding acknowledgment message to the mobile node 100 at the new care-of address via the new access router 118 to notify the mobile node 100 that the new binding has been created. The new access router 118 then sends the binding acknowledgment message to the mobile node 100. The mobile node 100 now knows that the new binding has been successfully created and can begin sending upstream data packets to the new access router 118, and the new access router 118 can send downstream data packets to the mobile node 100. Furthermore, once the home agent 112 receives the deregistration binding update message from the mobile node 100, it deletes the old binding and sends a deregistration binding acknowledgment message to the mobile node 100 via the old access router 116 to notify the mobile node 100 that the binding with the old care-of address has been removed.

Phase III-6 involves the mobile node 100 communicating with the correspondent node 110 via the new access router 118 and the home agent 112 after all the data packets that were sent to the mobile node's old care-of address have been sent to the mobile node 100 via the new access router 118.

FIGS. 39A & 39B to 45A & 45B illustrate synchronized handoff in Mobile IPv6 using the route optimization features, according to some embodiments of the invention. In embodiments where the mobile node is capable of being simultaneously connected to two wireless sub-networks, the operation of the synchronized handoff is similar to the operation of the synchronized handoff in Mobile IPv6 without route optimization embodiment described with respect to FIGS. 32A & 32B to 36A & 36B. The main difference is that the downstream data packets are sent by the correspondent node and not by the home agent. Depending on if the mobile node timely receives the deregistration binding acknowledgment from the old access router, two scenarios can be distinguished.

In the first scenario, the mobile node timely receives the deregistration binding acknowledgment (DBA), for a certain binding, before the old wireless sub-network has deteriorated beyond a certain point, i.e., before the mobile node is notified via a Layer 2 protocol message that the connection between the mobile node and the old wireless sub-network will be discarded in a very short time. A deregistration binding acknowledgment message is simply a binding acknowledgment message that is a reply for a deregistration binding update message and notifies the source of this deregistration binding update message that the specified binding has been deleted. Similarly, a deregistration binding update (DBU) is simply a binding update message that has a lifetime header field equal to zero. Considering that the deregistration binding acknowledgment message is stored and processed by all the IP nodes in the same manner as the data packets that belong to the same binding, it may be assumed that once the mobile node receives the deregistration binding acknowledgment message, all data packets that belong to the same binding as the deregistration binding acknowledgment, and that were sent by the correspondent node downstream to the mobile node, have been received by the mobile node. In this way, a synchronized, and hence, seamless handoff may be achieved.

Referring now to FIGS. 39A & 39B to 41, a handoff according to the first scenario may be accomplished in five operational phases. In Phase I-1, the mobile node 100 is communicating with the correspondent node 110 via the old wireless sub-network 104 and old access router 116 in a known manner.

Phase I-2 involves the mobile node 100 sending a binding update message to the home agent 112 for the creation of a new binding. At this time, the home agent 112 is still sending downstream data packets to the mobile node 100 via the old wireless sub-network 104, and the correspondent node 110 is still receiving upstream data packets from the old access router 116. In Phase I-2, the mobile node 100 discovers the new care-of address of the new access router 118 via either the old access router 116 or via a Layer 2 protocol message between the old and new wireless sub-networks. Once the mobile node 100 knows the new care-of address, it sends two binding update messages to the new access router 118 via either the old access router 116 or via a Layer 2 protocol message between the old and new wireless sub-networks. The first binding update message (BU1) is sent to the home agent 112. The second binding update message (BU2) is sent to the correspondent node 110. Both binding update messages cause new bindings to be created that link the mobile node's new care-of address and its home address. The mobile node 100 also sends a deregistration binding update message to the correspondent node 110 via the old access router 116. All binding update messages have the "A" flag set to cause the correspondent node 110 and the home agent 112 to send binding acknowledgments back to the mobile node 100.

Phase I-3 involves the correspondent node 110 sending a deregistration binding acknowledgment message to the mobile node 100. At this time, the correspondent node 110 is still receiving upstream data packets from the old access router 116. Once the correspondent node 110 receives the deregistration binding update message from the mobile node 100, it deletes the old binding that relates the old care-of address with the mobile node's home address. The correspondent node 110 then sends a deregistration binding acknowledgment to the mobile node 100 via the old access router 116. Furthermore, once the correspondent node 110 receives the second binding update (BU2) and the home agent 112 receives the first binding update (BU1) sent by the mobile node 100, the correspondent node 110 and the home agent 112 create the new bindings that links the new care-of address with the mobile node's home address. Subsequently, both the correspondent node 110 and the home agent 112 each send one binding acknowledgment (BA1 and BA2) to the mobile node 100, via the new access router 118, to notify the mobile node 100 that the new binding has been created. The new access router 118 then sends the binding acknowledgment (BA1 and BA2) to the mobile node 100. The mobile node 100 now knows that the new binding has been successfully created. Moreover, the mobile node 100 will send upstream data packets to the new access router 118, and the new access router 118 will send downstream data packets to the mobile node 100. The correspondent node 110 sends downstream data packets to the new access router 118.

Phase I-4 involves the mobile node 100 receiving the deregistration binding acknowledgment message via the old access router 116. This means that all data packets that belong to the same binding as the deregistration binding acknowledgment, and that were sent by the correspondent node 110 downstream to the mobile node 100, have been received by the mobile node 100. Thus, a synchronized, and hence, seamless handoff may be achieved, since few or no data packets sent between the correspondent node 110 and the mobile node 100 are lost. Note that the correspondent node 110 may still receive upstream data packets via the old access router 116 as well as via the new access router 118, whereas the correspondent node 110 sends downstream data packets only to the new access router 118.

Phase I-5 is simply the normal operation of the mobile node 100 after the handoff has been completed; that is, the mobile node 100 is communicating with the correspondent node 110 via the new wireless sub-network 108 and the new access router 118.

In the second scenario, the mobile node 100 does not timely receive the deregistration binding acknowledgment, for a certain binding. When this happens, the mobile node 100 sends a binding update directly to the old access router 116 to create a new binding cache entry linking the old care-of address with the new care-of address. In this way, the old access router 116 can tunnel all the data packets that were stored and/or arriving at the old care-of address of the mobile node 100 to the new care-of address, i.e., to the new access router 118, thereby becoming a temporary home agent for the mobile node 100.

A handoff according to the second scenario can be accomplished in six operational phases. Phase II-1, Phase II-2 and Phase II-3 are identical to Phase I-1, Phase I-2 and Phase I-3, respectively, described with respect to FIGS. 39A & 39B to 40A & 40B and are therefore not shown separately. Phase II-4, Phase II-5, and Phase II-6 are depicted in FIGS. 42 to 43A & 43B.

Phase II-4 involves the mobile node 100, after being notified by a Layer 2 protocol message that the connection between the mobile node 100 and the old wireless sub-network 104 will be discarded in a very short time, sending a binding update directly to the old access router 116 to create a new binding cache entry linking the old care-of address with the new care-of address. In this way, the old access router 116 can tunnel all the packets that were stored and/or arriving at the old care-of address of the mobile node 100 to the new care-of address, i.e., to the new access router 118, thereby becoming a temporary home agent for the mobile node 100. At this time, the correspondent node 110 may still receive upstream data packets sent via the old access router 116, as well as the new access router 118. However, the correspondent node 110 sends downstream data packets only to the new access router 118. The old access router 116, after accepting the binding update request, creates the new binding cache entry that links the mobile node's old care-of address with the new care-of address, and notifies the mobile node 100 by sending a binding acknowledgment message via the new access router 118.

Phase II-5 involves the old access router 116 forwarding to the new access router 118 the data packets that were sent to the mobile node's old care-of address. These data packets are then forwarded by the new access router 118 to the mobile node 100. During the phase, the mobile node 100 is communicating with the correspondent node 110 via the new access router 118.

Phase II-6 involves the mobile node 100 communicating with the correspondent node 110 via the new access router 118 after all, or substantially all, the data packets that were sent to the mobile node's old care-of address have been forwarded to the mobile node 100 via the new access router 118.

Figure 44B:
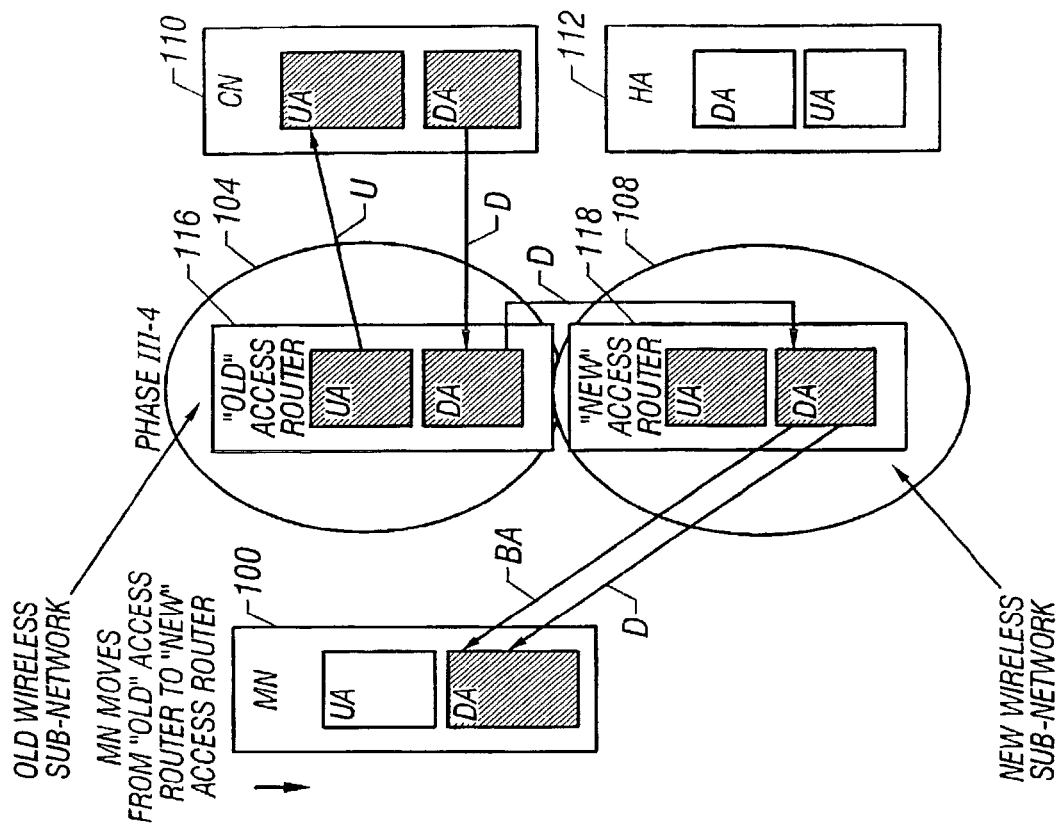
Figure 44A:
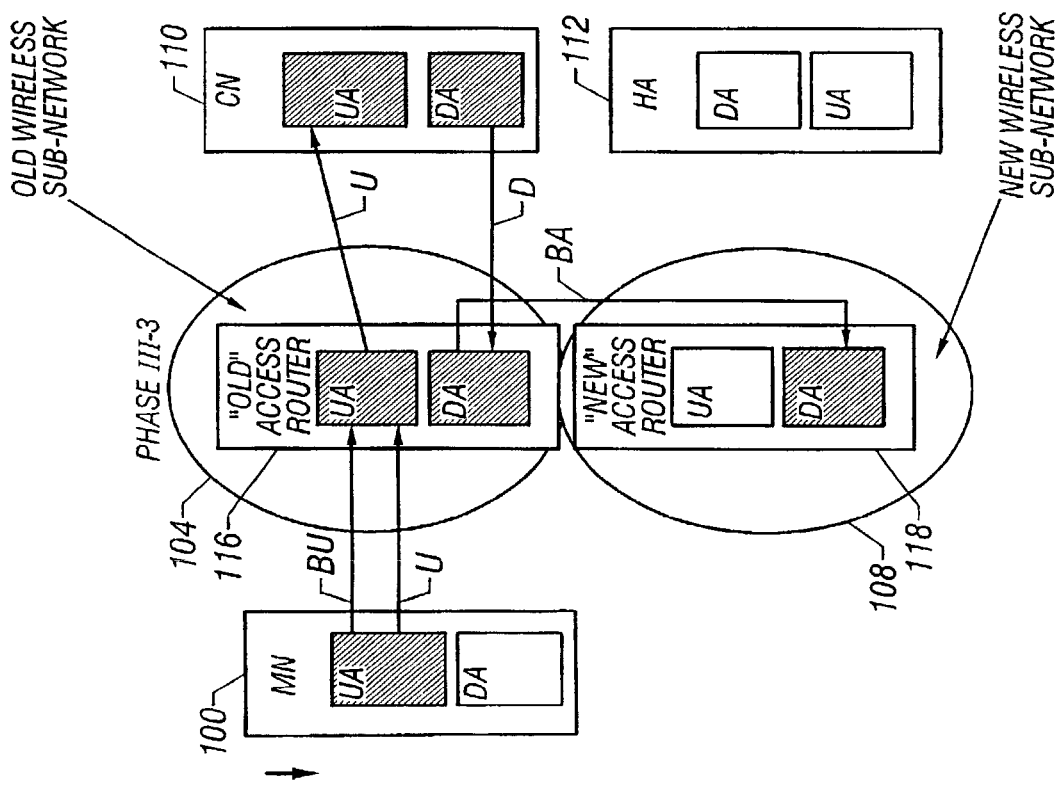
Figures 45A, 45B:
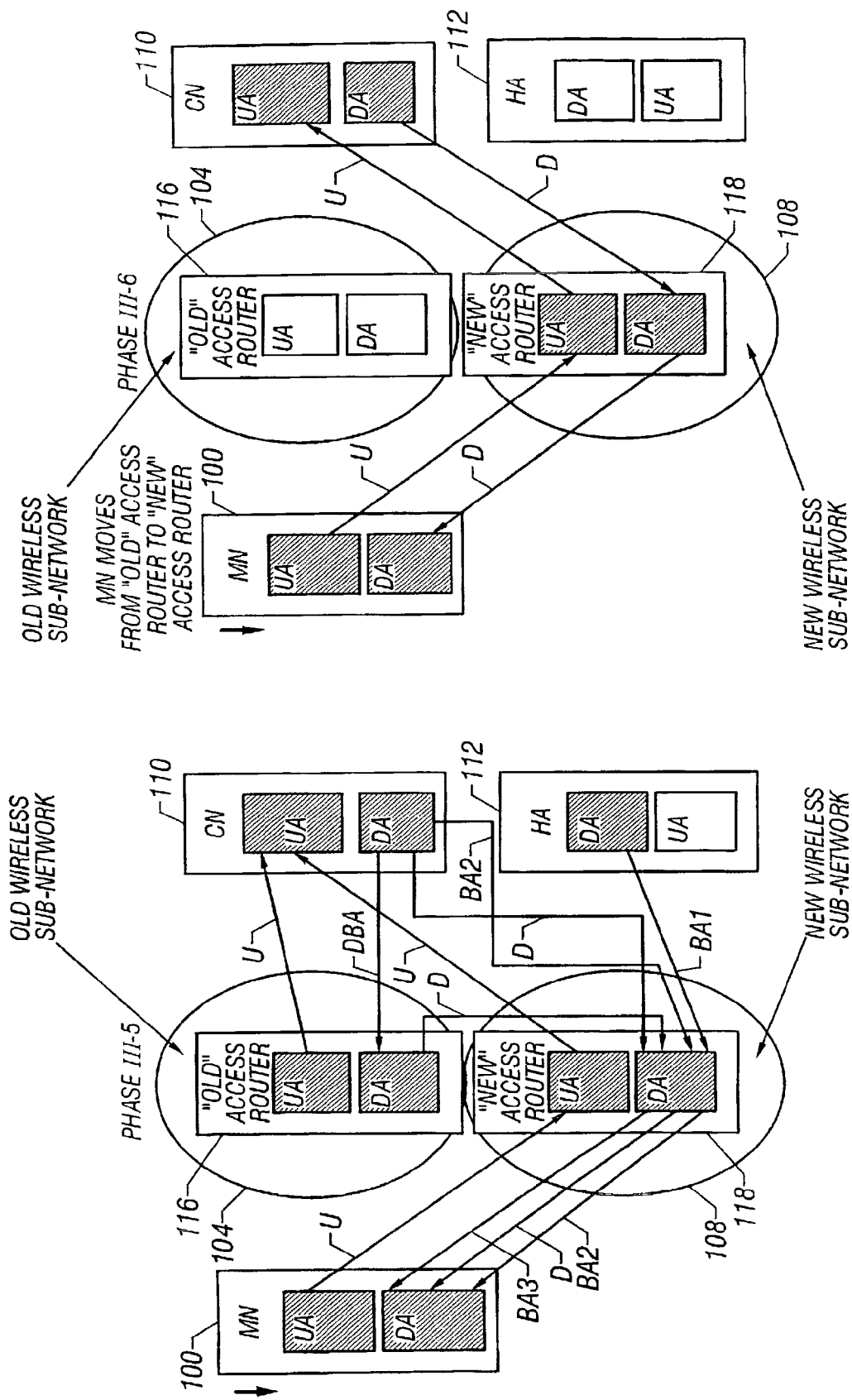
Figure 46B:
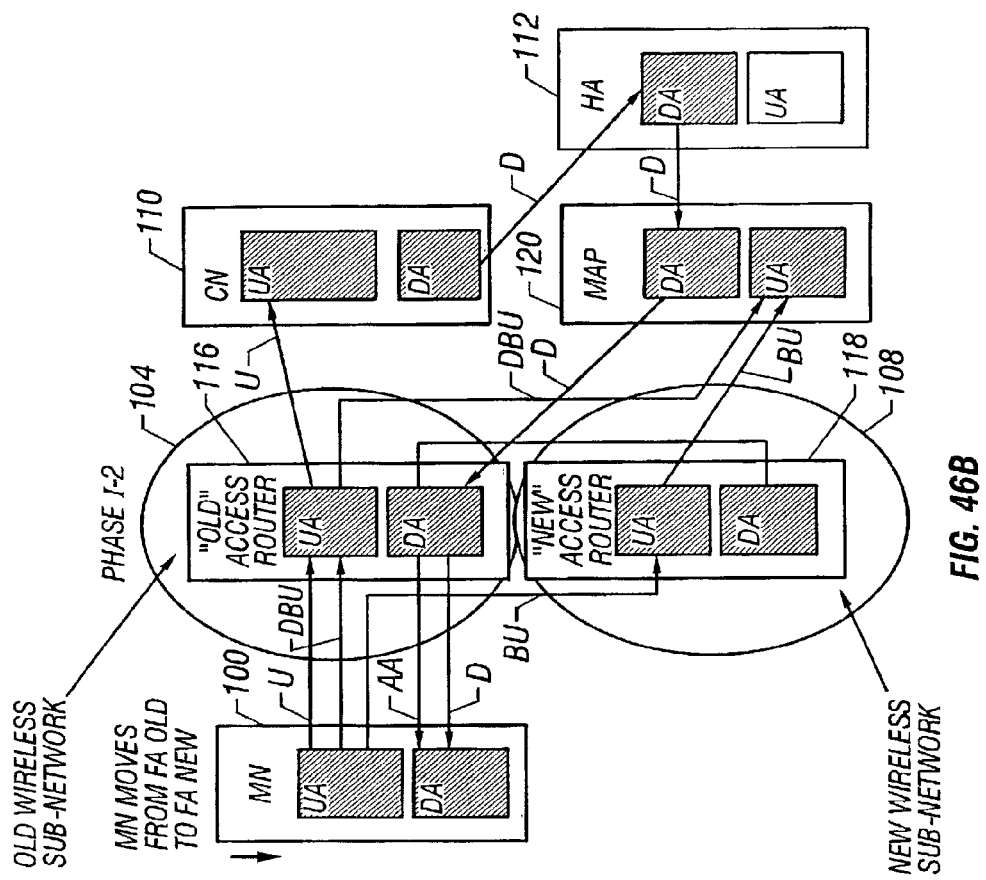
Figure 46A:
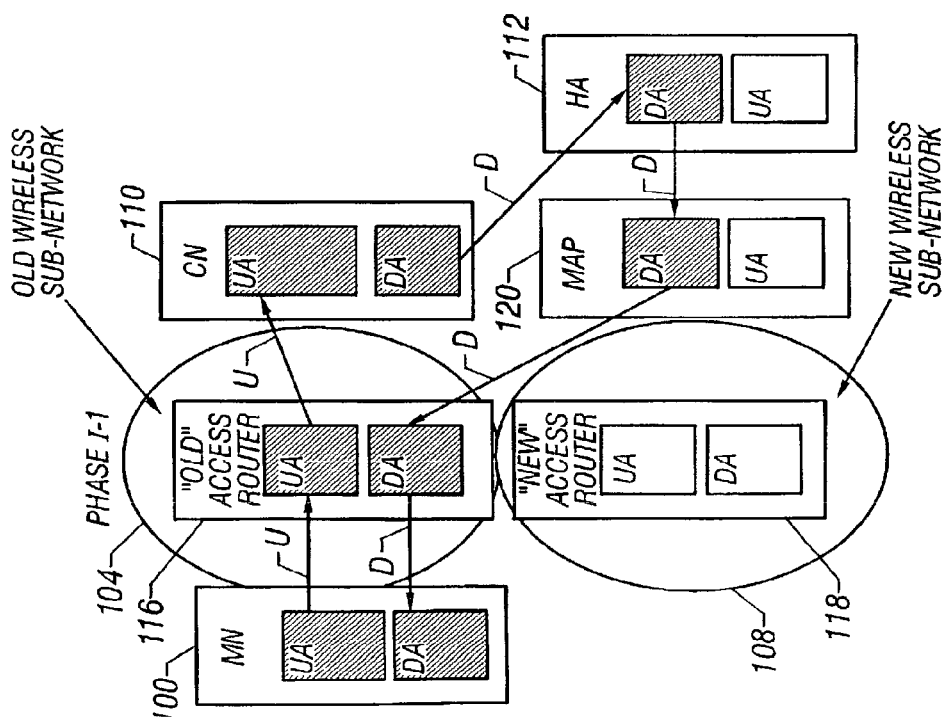
Figures 47A, 47B:
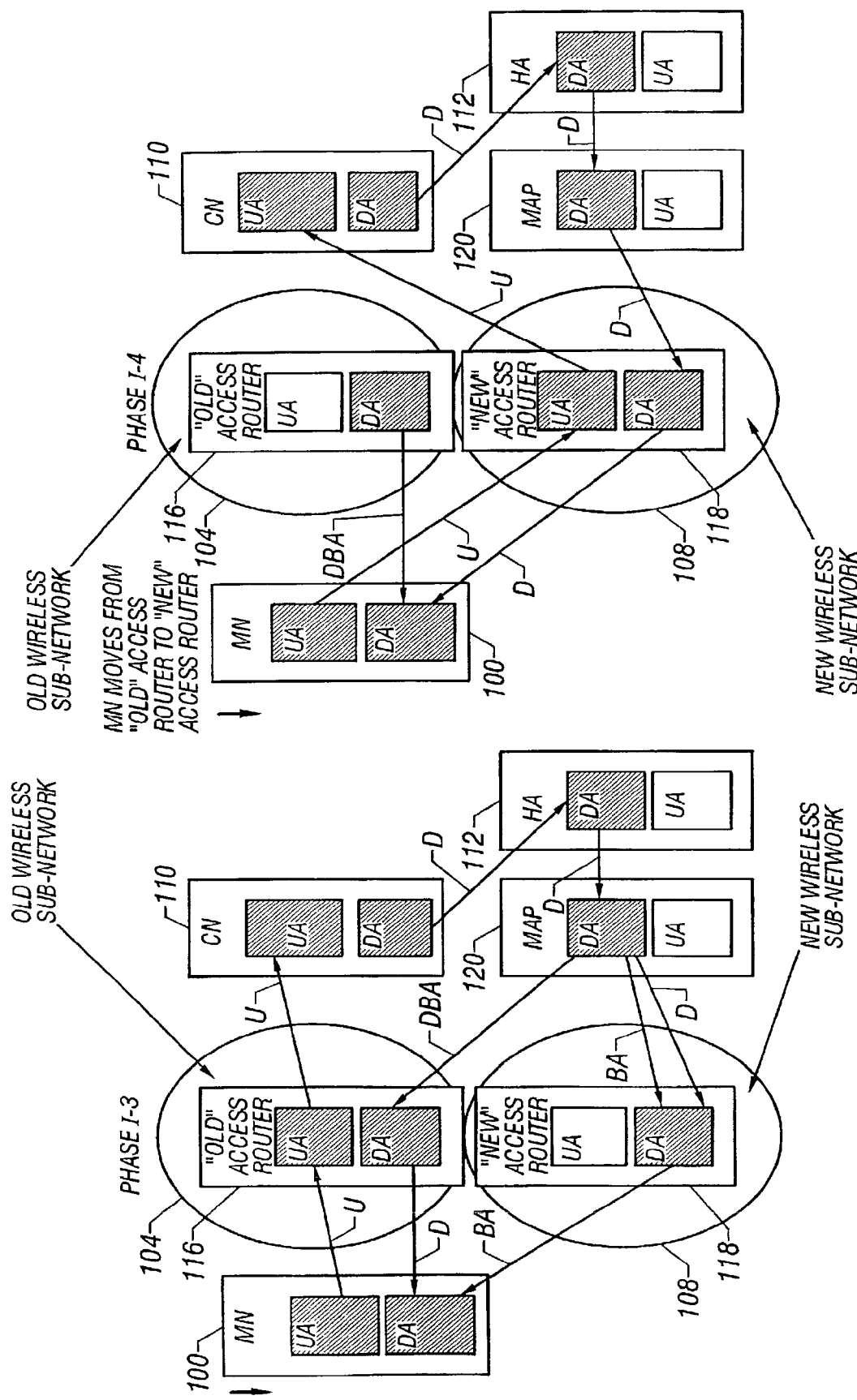
Figure 48:
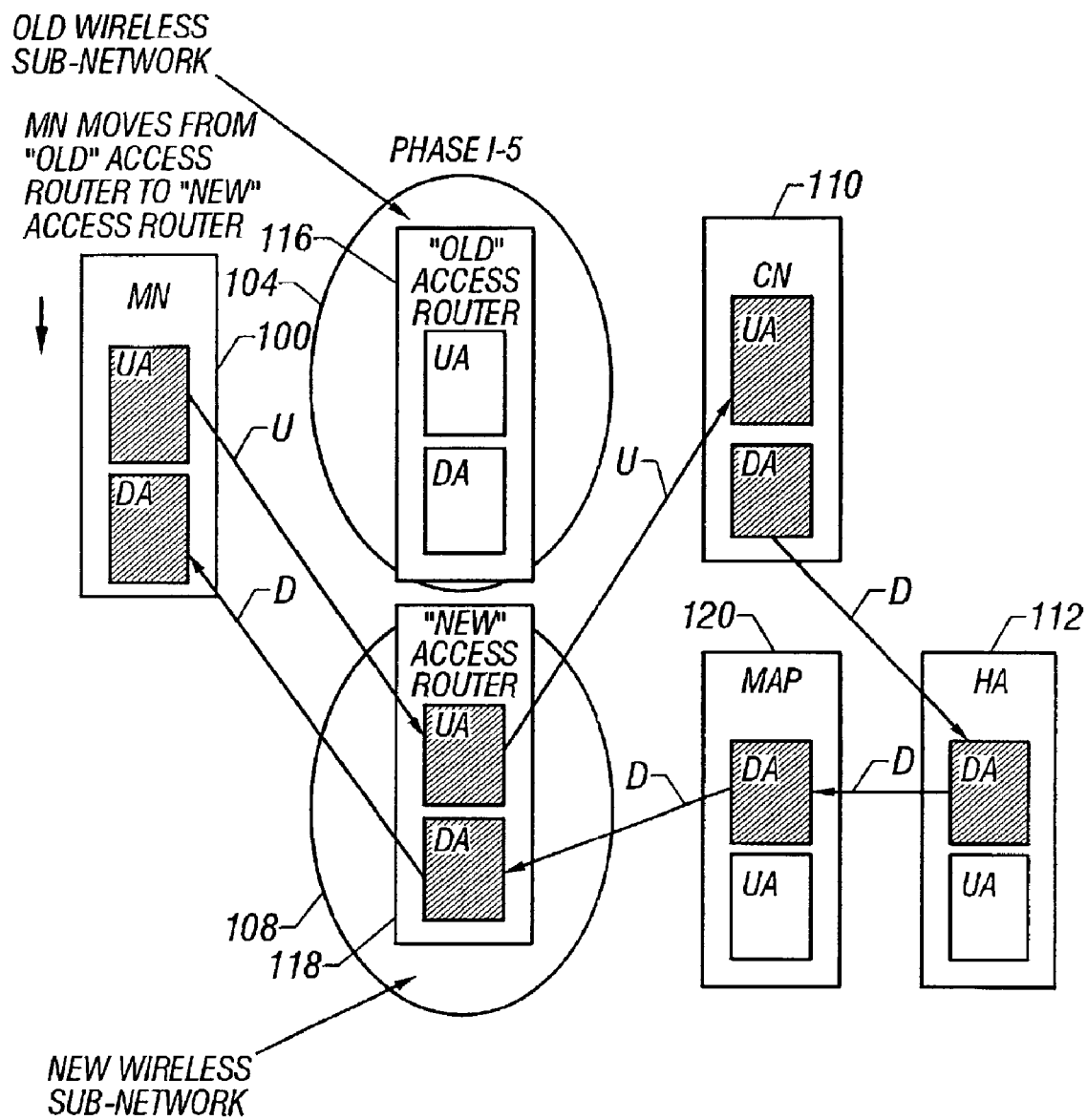
Figure 49:
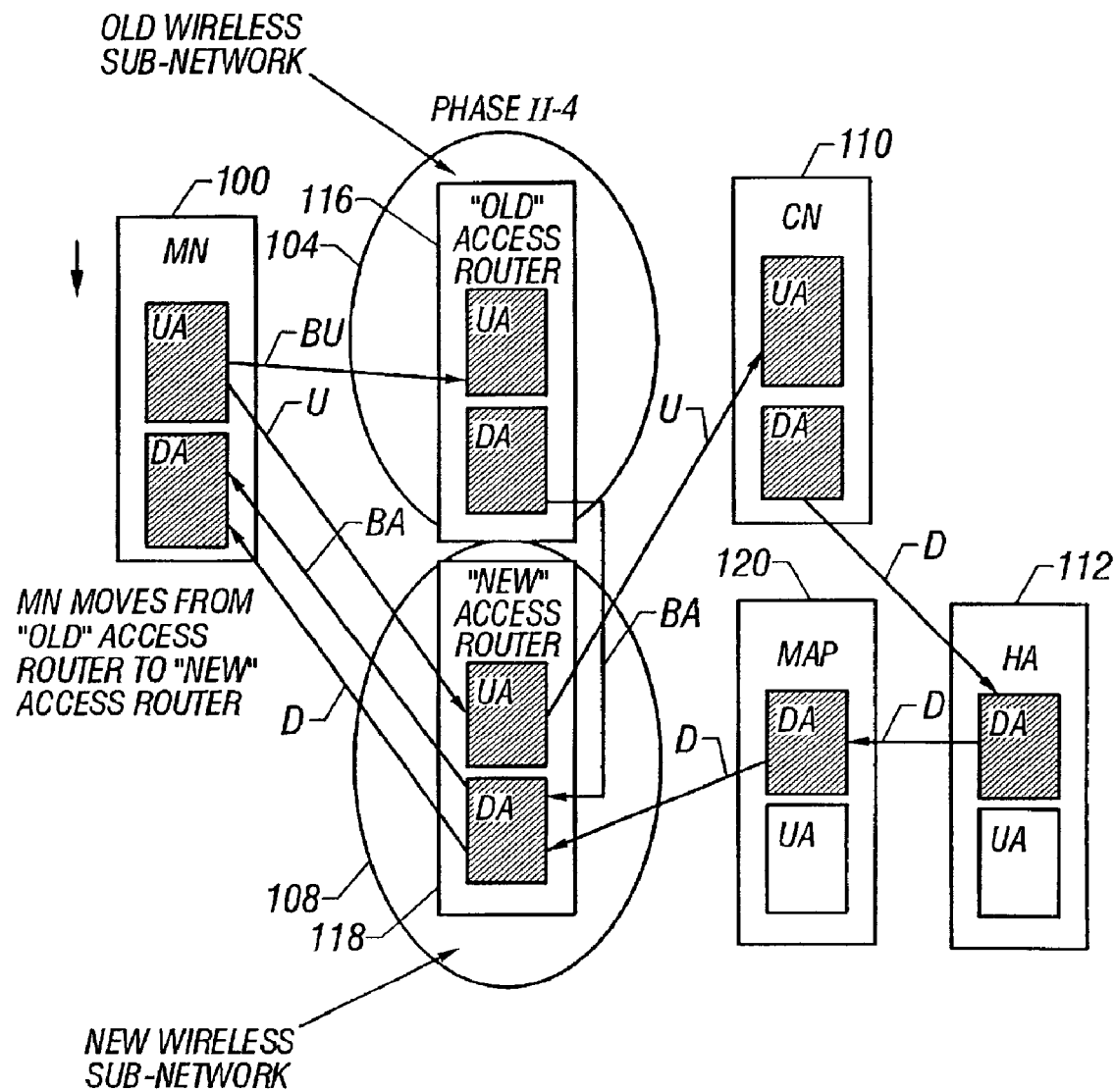
Figure 50B:
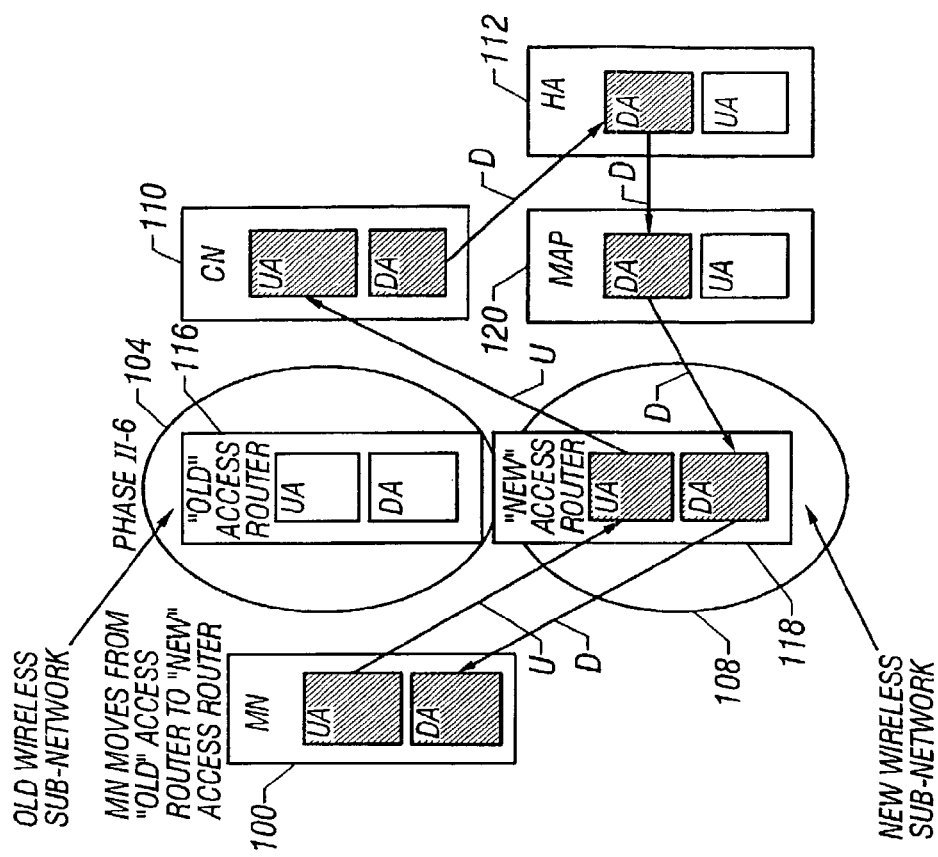
Figure 50A:
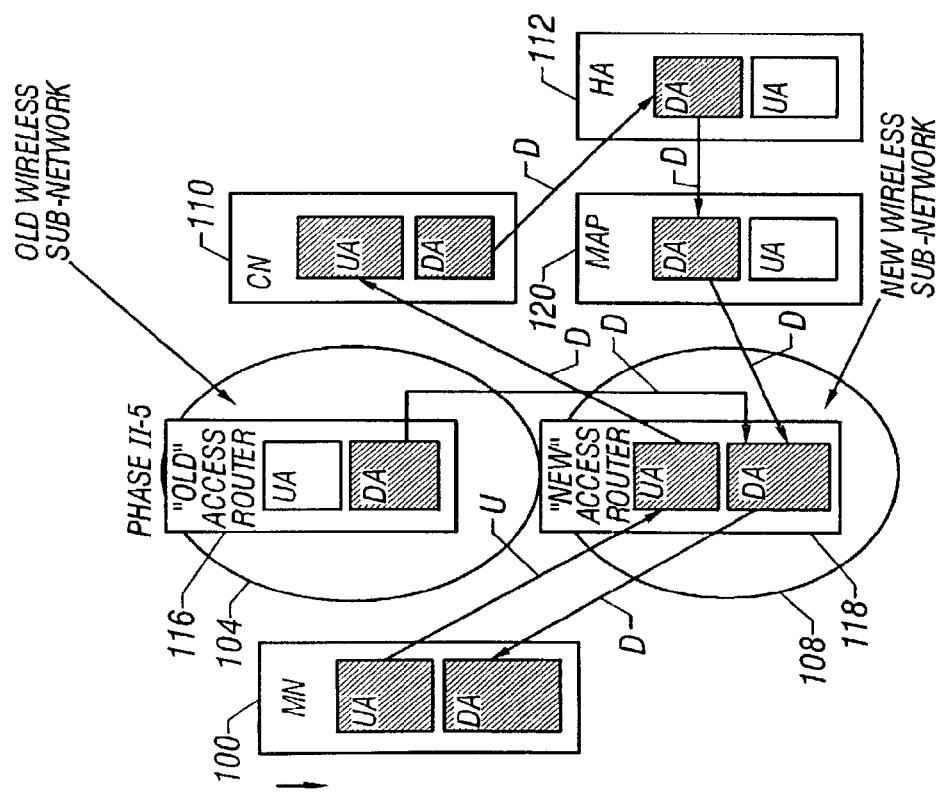

In some embodiments, the mobile node 100 is not capable of being simultaneously connected to two wireless sub-networks and can only be connected to one wireless sub-network at a time. The synchronized handoff procedure in these embodiments is similar to the synchronized handoff procedure described with regard to FIGS. 37A & 37B to 38A & 38B. The main difference is that the downstream data packets are sent by the correspondent node 110 and not by the home agent 112. Synchronized handoff according to these embodiments can also be accomplished in six operational phases. Phase III-1 and Phase III-2 are identical to phases Phase I-1 and Phase I-2, respectively, described with respect to FIGS. 39A & 39B, and are therefore not shown separately. Phase III-3 and Phase III-4 are depicted in FIGS. 44A & 44B. Phase III-5 and Phase III-6 are depicted in FIGS. 45A & 45B.

Phase III-3 involves the mobile node 100, after being notified by a Layer 2 protocol message that the connection between the mobile node 100 and the old wireless sub-network 104 will be discarded in a very short time, sending a binding update directly to the old access router 116 to create a new binding cache that links its old care-of address with its new care-of address. In this way, the old access router 116 can tunnel all the data packets that were stored and/or arriving at the old care-of address of the mobile node 100 to the new care-of address, i.e., to the new access router 118, thereby becoming a temporary home agent for the mobile node 100. During this time, the correspondent node 110 receives upstream data packets sent via the old access router 116 and sends downstream data packets to the old access router 116.

The old access router 116, after accepting this binding update request, creates the new binding cache entry linking the mobile node's old care-of address with the new care-of address. The old access router 116 then notifies the mobile node 100 of this new binding by sending a binding acknowledgment to the new access router 118.

Phase III-4 involves the mobile node 100 switching its network connection to the new wireless sub-network 108. At this time, the correspondent node 110 is still receiving upstream data packets from the old access router 116, and sending downstream data packets to the old access router 116. The new access router 118 forwards the binding acknowledgment to the mobile node 100 via the new wireless sub-network 108. The old access router 116 thereafter begins forwarding the data packets destined for the old care-of address to the new care-of address via the new access router 118. The forwarded data packets received by the new access router 118 are then sent to the mobile node 100. In this way, a synchronized, and hence, seamless handoff may be achieved, since few or no data packets sent between the correspondent node 110 and the mobile node 100 are lost.

Phase III-5 involves the home agent 112 and the correspondent node 110 sending a binding acknowledgment message to the mobile node 100 in response to receiving the binding updates (BU1 and BU2). At this time, the correspondent node 110 is still receiving upstream data packets from the old access router 116. Once the correspondent node 110 receives the deregistration binding update message from the mobile node 100, it deletes the old binding that relates the old care-of address with the mobile node's home address. After that, the correspondent node 110 sends a deregistration binding acknowledgment message to the mobile node 100 via the old access router 116. Furthermore, once the correspondent node 110 receives the second binding update (BU2), and the home agent 112 receives the first binding update (BU1) message sent by the mobile node 100, the correspondent node 110 and the home agent 112 create the new bindings that link the new care-of address with the mobile node's home address. Subsequently, both the correspondent node 110 and home agent 112 each send one binding acknowledgment message (BA1 and BA2) to the mobile node 100 via the new access router 118 to notify the mobile node 100 that the new bindings have been created. The new access router 118 sends the binding acknowledgments (BA1 and BA2) to the mobile node 100. The mobile node 100 now knows that the new binding has been successfully created. Moreover, the mobile node 100 begins sending upstream data packets to the new access router 118, and the new access router 118 sends downstream data packets to the mobile node 100. The correspondent node 110 sends downstream data packets to the new access router 118.

Phase III-6 involves the mobile node 100 communicating with the correspondent node 110 via the new access router 118 after all, or substantially all, the data packets that were sent to the mobile node's old care-of address have been forwarded to the mobile node 100 via the new access router 118.

FIGS. 46A & 46B to 52A & 52B illustrate synchronized handoff in Hierarchical Mobile IPv6 where no route optimization is used according to some embodiments of the invention. In embodiments where the mobile node is capable of being simultaneously connected to two wireless sub-networks, the synchronized handoff procedure is similar to the synchronized handoff procedure described with regard to FIGS. 32A & 32B to 36A & 36B. The main difference is that the binding update message is terminated at the mobility anchor point and not at the home agent, and the binding acknowledgment message is sent by the mobility anchor point and not by the home agent. Depending on if the mobile node timely receives the deregistration binding acknowledgment message from the access router two scenarios can be distinguished.

In the first scenario, the mobile node timely receives the deregistration binding acknowledgment, for a certain binding, before the old wireless access has deteriorated beyond a certain point, i.e., before the mobile node is notified by a Layer 2 protocol message that the connection between the mobile node and the old wireless sub-network will be discarded in a very short time. Considering that the deregistration binding acknowledgment message is stored and processed by all the IP nodes in the same manner as the data packets that are belonging to the same binding, it may be assumed that once the mobile node receives the deregistration binding acknowledgment message, all data packets that belong to the same binding as the deregistration binding acknowledgment, and that were sent by the mobility anchor point downstream to the mobile node, are received by the mobile node. In this way, a synchronized, and thus, seamless handoff may be achieved, since few or no data packets sent between the correspondent node and the mobile node are lost.

A handoff according to the first scenario may be accomplished in five operational phases, as shown in FIGS. 46A & 46B to 48. In Phase I-1, the mobile node 100 is communicating with the correspondent node 110 via the old wireless sub-network 104, old access router 116, mobility anchor point 120 and home agent 112 in a known manner.

Phase I-2 involves the mobile node 100 sending a binding update message to the mobility anchor point 120. At this time, the mobility anchor point 120 is still sending downstream data packets to the mobile node 100 via the old wireless sub-network 104, and the correspondent node 110 is still receiving upstream data packets from the old access router 116 In Phase I-2, the mobile node 100 discovers the new care-of address of the new access router 118 via either the old access router 116 or via a Layer 2 protocol message between the old and new wireless sub-networks Once the mobile node 100 knows the new care-of address of the new access router 118, it sends a binding update message to the new access router 118 via either the old access router 116 or via a Layer 2 protocol message between the old and new wireless sub-networks. This binding update is then forwarded by the new access router 118 to the mobility anchor point 120. Note that this binding update does not require the creation of a simultaneous binding. The mobile node 100 then sends a deregistration binding update to the mobility anchor point 120 via the old access router 116 in order to cause the old binding to be deleted from the mobility anchor point 120. Both binding update messages (BU and DBU) have the flag "A" set active to cause the mobility anchor point 120 to send acknowledgment messages for each of the binding updates.

Phase I-3 involves the mobility anchor point 120 sending a binding acknowledgment message to the mobile node 100. At this time, the correspondent node 110 is still receiving upstream data packets from the old access router 116. Once the mobility anchor point 120 receives the binding update message from the mobile node 100, it creates a new binding for the new care-of address and sends a binding acknowledgment message to the mobile node 100. This binding acknowledgment message is sent to the new care-of address via the new access router 118 to notify the mobile node 100 that the new binding has been created. The new access router 118 sends the binding acknowledgment to the mobile node 100. The mobile node 100 now knows that the new binding has been successfully created and may begin sending upstream data packets to the new access router 118, and the new access router 118 sends downstream data packets to the mobile node 100. When the mobility anchor point 120 receives the deregistration binding update message, it deletes the old binding and sends a deregistration binding acknowledgment message to the old care-of address via the old access router 116 to notify the mobile node 100 that the binding with the old care-of address has been deleted. The mobility anchor point 120 thereafter sends downstream data packets to the new access router 118.

Phase I-4 involves the mobile node 100 receiving the deregistration binding acknowledgment message via the old access router 116. This means that all, or substantially all, data packets that belong to the same binding as the deregistration reply, and that were sent by the mobility anchor point 120 downstream to the mobile node 100, have been received by the mobile node 100. Thus, synchronized, and hence, seamless handoff may be achieved. Note that the correspondent node 10 may still receive upstream data packets via the old access router 116 as well as via the new access router 118, whereas the mobility anchor point 120 sends downstream data packets only to the new access router 118.

Phase I-5 is simply the normal operation of the mobile node 100 after the handoff is completed, that is, the mobile node 100 is communicating with the correspondent node 110 via the new wireless sub-network 108, new access router 118, mobility anchor point 120 and the home agent 112.

In the second scenario, the mobile node 100 does not timely receive a deregistration binding acknowledgment for a certain binding. When this happens, the mobile node 100 sends a binding update directly to the old access router 116 to create a new binding cache entry that links the old care-of address with the new care-of address. In this way, the old access router 116 can tunnel all the data packets that were stored and/or arriving at the old care-of address of the mobile node 100 to the new care-of address, i.e., to the new access router 118, thereby becoming a temporary home agent for the mobile node 100. The mobile node 100 will receive all the data packets that were stored and sent to the old care-of address, thereby achieving a synchronized, and hence, seamless handoff.

A handoff according to the second scenario may be accomplished in six operational phases. Phase II-1, Phase II-2 and Phase II-3 are identical to Phase I-1, Phase I-2 and Phase I-3, respectively, described with regard to FIGS. 46A & 46B to 48 and are therefore not shown separately.

Phase II-4 involves the mobile node 100, after being notified by a Layer 2 protocol message that the connection between the mobile node 100 and the old wireless sub-network 104 will be discarded in a very short time, sending a binding update directly to the old access router 116 to create a new binding cache entry linking or binding the old care-of address with the new care-of address. In this way, the old access router 116 can tunnel all the data packets that were stored and/or arriving at the old care-of address of the mobile node 100 to the new care-of address, i.e., to the new access router 118, thereby becoming a temporary home agent for the mobile node 100. At this time, the correspondent node 110 may still receive upstream data packets sent via the old access router 116 as well as via the new access router 118, whereas the mobility anchor point 120 sends downstream data packets only to the new access router 118. The old access router 116, after accepting this binding update request, creates the new binding cache entry that links the mobile node's old care-of address with the new care-of address, and notifies the mobile node 100 by sending a binding acknowledgment message thereto via the new access router 118.

Phase II-5 involves the old access router 116 forwarding to the new access router 118 the data packets that were sent to the mobile node's old care-of address. These data packets are then forwarded by the new access router 118 to the mobile node 100. During this phase, the mobile node 100 is communicating with the correspondent node 110 via the new access router 118 and the mobility anchor point 120.

Phase II-6 involves the mobile node 100 communicating with the correspondent node 110 via the new access router 118 and the mobility anchor point 120 after all the data packets that were sent to the mobile node's old care-of address have been forwarded to the mobile node 100 via the new access router 118.

Figures 51A, 51B:
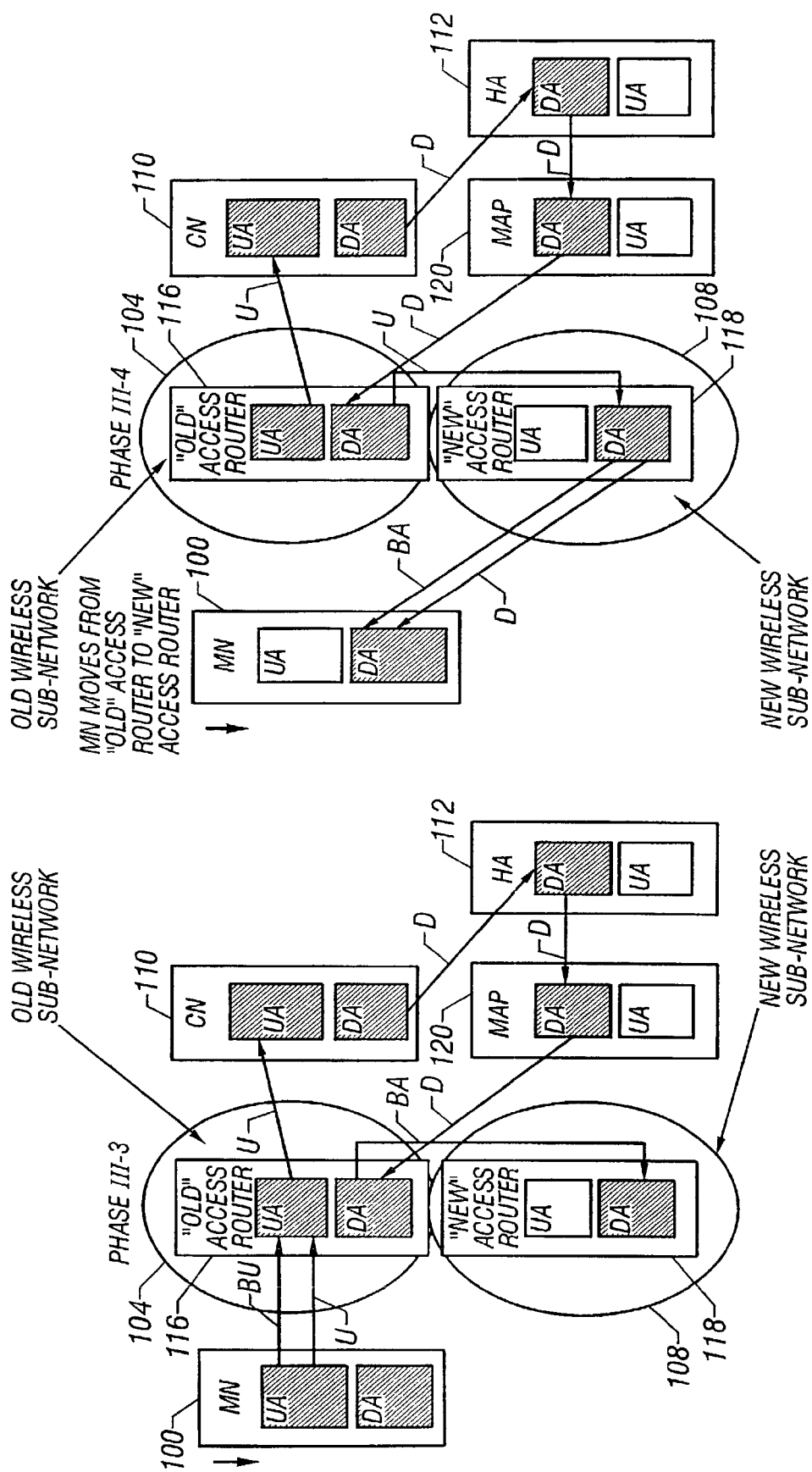

In some embodiments, the mobile node 100 is not capable of being simultaneously connected to two wireless sub-networks and can only be connected to one wireless sub-network at a time. Synchronized handoff according to these embodiments can also be accomplished in six operational phases. Phase III-1 and Phase III-2 are identical to Phase I-1 and Phase I-2, respectively, described with regard to FIGS. 46A & 46B and are therefore not shown separately. Phase III-3 and Phase III-4 are depicted in FIGS. 51A & 51B, and Phase III-5 and Phase III-6 are depicted in FIGS. 52A & 52B.

Phase III-3 involves the mobile node 100, after being notified by a Layer 2 protocol message that the connection between the mobile node 100 and the old wireless sub-network 104 will be discarded in a very short time, sending a binding update directly to the old access router 116 to create a new binding cache entry that links the old care-of address with the new care-of address. In this way, the old access router 116 can tunnel all, or substantially all, the data packets that were stored and/or arriving at the old care-of address of the mobile node 100 to the new care-of address, i.e., to the new access router 118, thereby becoming a temporary home agent for the mobile node 100. At this time, the correspondent node 110 receives upstream data packets sent via the old access router 116, and the mobility anchor point 120 sends downstream data packets to the old access router 116. The old access router 116, after accepting this binding update request, creates the new binding cache entry linking the mobile node's old care-of address with the new care-of address. The old access router 116 then notifies the mobile node 100 of the new binding cache entry by sending a binding acknowledgment to the new access router 118.

Phase III-4 involves the mobile node 100 switching its network connection to the new wireless sub-network 108. At this time, the correspondent node 110 is still receiving upstream data packets from the old access router 116, and the mobility anchor point 120 is still sending downstream data packets to the old access router 116. The new access router 118 forwards the binding acknowledgment to the mobile node 100 via the new wireless sub-network 108. The old access router 116 thereafter begins forwarding the data packets sent from the old care-of address to the new care-of address via the new access router 118. The forwarded data packets received by the new access router 118 are then sent to the mobile node 100. In this way, a synchronized, and hence, seamless handoff may be achieved, since few or no data packets sent between the correspondent node 110 and the mobile node 100 are lost.

Phase III-5 involves the mobility anchor point 120 sending the binding acknowledgment message to the mobile node 100. At this time, the correspondent node 110 is still receiving upstream data packets from the old access router 116. Once the mobility anchor point 120 receives the binding acknowledgment message from the mobile node 100, it creates the new binding and sends a binding acknowledgment message to the mobile node 100 at the new care-of address via the new access router 118 to notify the mobile node 100 that the new binding has been created. The mobility anchor point 120 thereafter sends downstream data packets to the new access router 118. The new access router 118 sends the binding acknowledgment to the mobile node 100. The mobile node 100 now knows that the new binding has been successfully created and can begin sending upstream data packets to the new access router 118, and the new access router 118 can send downstream data packets to the mobile node 100. Furthermore, once the mobility anchor point 120 receives the deregistration binding update message, it deletes the old binding and sends a deregistration binding acknowledgment message to the old access router 116 to notify the mobile node 100 that binding with the old care-of address has been removed. However, since the old access router 116 has already removed the old binding in these single access embodiments, this situation this message is not actually necessary.

Phase III-6 involves the mobile node 100 communicating with the correspondent node 110 via the new access router 118, the mobility anchor point 120 and home agent 112 after all the data packets that were sent to the mobile node's old care-of address have been forwarded to the mobile node 100 via the new access router 118.

From the foregoing description, it can be seen that embodiments of the invention provide a way to perform seamless handoff in a mobile networking environment. Advantages of the invention include a faster handoff wherein the number of data packets that are lost during a disruption in data transfer can be minimized or eliminated Moreover, the invention provides a more efficient handoff since no additional network bandwidth is required during the disruption duration. Yet another advantage is the invention does not require the establishment and maintenance of simultaneous bindings. Other advantages of the invention can be readily recognized by those having ordinary skill in the art.

While a limited number of embodiments of the invention have been described, these embodiments are not intended to limit the scope of the invention as otherwise described and claimed herein. Those of ordinary skill in the art will recognize that variations and modifications from the described embodiments exist. Moreover, unless otherwise specified, the steps of the methods described herein are not limited to any particular order or sequence. Furthermore, some steps may be omitted, combined into a single step, or divided into several sub-steps. Accordingly, the appended claims are intended to cover all such variations and modifications as falling within the scope of the invention.

What is claimed is:

1. A method of seamlessly handing off a mobile node from an old sub-network router to a new sub-network router in an Internet Protocol based wireless access network comprising:
    obtaining a handoff starting time from a lower layer complying with Open Systems Interconnections (OSI) model;
    using information from the lower layer of the OSI model to notify the mobile node that a connection with the old sub-network router will be discarded within a predetermined amount of time;
    obtaining a new care-of address for the mobile node from the new sub-network router;
    sending a request message from the mobile node to a base node via the new sub-network router requesting a new binding;
    creating a new care-of address binding in the base node;
    issuing two registration reply messages, one from the base node to the mobile node wherein a registration reply message is sent to the new care-of address via the new sub-network router indicating that the new care-of address binding has been created and a deregistration reply message (DRR) is sent from the base node to the old care-of address via the old sub-network router notifying the mobile node that binding with the old care-of address has been removed; and
    utilizing the deregistration reply message (DRR) to synchronize a transfer of old care-of address data packets stored on the old sub-network router to the mobile node, the home agent sending the two registration reply messages including the DRR after receiving the registration request message and using the DRR as a synchronization point.

2. The method according to claim 1, wherein the request message is a mobile node registration request message and the reply message is a mobile node registration reply message.

3. The method according to claim 2, wherein the base node is a home agent and the mobile node is capable of accessing two sub-networks simultaneously, the synchronizing step comprising:
    deleting an old care-of address binding from the home agent.

4. The method according to claim 3, wherein the mobile node does not receive the deregistration reply message before a predetermined time, the synchronizing step further comprising:
    sending a binding update message from the mobile node to the old sub-network router;
    creating a binding cache entry in the old sub-network router linking the old care-of address to the new care-of address;
    issuing a binding acknowledgment message from the old sub-network router to the mobile node via the new sub-network router; and
    forwarding old care-of address data packets stored or arriving at the old sub-network router to the new care-of address.

5. The method according to claim 2, wherein the base node is a home agent and the mobile node is capable of accessing only a single sub-network at a time, the synchronizing step comprising:
- sending a binding update message from the mobile node to the old sub-network router;
- creating a binding cache entry in the old sub-network router linking the old care-of address to the new care-of address;
- issuing a binding acknowledgment message from the old sub-network router to the mobile node via the new sub-network router;
- forwarding old care-of address data packets stored or arriving at the old sub-network router to the new care-of address;
- deleting an old care-of address binding from the home agent; and
- issuing a deregistration reply message from the home agent to the mobile node via the old sub-network router indicating that the old care-of address binding has been deleted.

6. The method according to claim 2, wherein a route optimization function is used, the base node is a home agent, and the mobile node is capable of accessing two sub-networks simultaneously, the synchronizing step comprising:
- sending a deregistration binding update message from the mobile node to a correspondent node via the old sub-network router;
- deleting an old care-of address binding from the correspondent node;
- issuing a deregistration binding acknowledgment message from the correspondent node to the mobile node via the old sub-network router;
- sending a binding update message from the home agent to the correspondent node; and
- creating a new care-of address binding in the correspondent node.

7. The method according to claim 6, wherein the mobile node does not receive the deregistration binding acknowledgment message before the old wireless sub-network has deteriorated beyond a certain point, the synchronizing step further comprising:
- sending a binding update message from the mobile node to the old sub-network router;
- creating a binding cache entry in the old sub-network router linking the old care-of address to the new care-of address;
- issuing a binding acknowledgment message from the old sub-network router to the mobile node via the new sub-network router; and
- forwarding old care-of address data packets stored or arriving at the old sub-network router to the new care-of address.

8. The method according to claim 2, wherein a route optimization function is used, the base node is a home agent, and the mobile node is capable of accessing only a single sub-network at a time, the synchronizing step comprising:
- sending a binding update message from the mobile node to the old sub-network router;
- creating a binding cache entry in the old sub-network router linking the old care-of address to the new care-of address;
- issuing a binding acknowledgment message from the old sub-network router to the mobile node via the new sub-network router;
- forwarding old care-of address data packets stored or arriving at the old sub-network router to the new care-of address;
- sending a binding update message from the home agent to a correspondent node; and
- creating a new care-of address binding in the correspondent node.

9. The method according to claim 2, wherein the base node is a gateway foreign agent and the mobile node is capable of accessing two sub-networks simultaneously, the synchronizing step comprising:
- deleting an old care-of address binding from the gateway foreign agent; and
- issuing a deregistration reply message from the gateway foreign agent to the mobile node via the old sub-network router indicating that the old care-of address binding has been deleted.

10. The method according to claim 9, wherein the mobile node does not receive the deregistration binding acknowledgment message before a predetermined time, the synchronizing step further comprising:
- sending a binding update message from the mobile node to the old sub-network router;
- creating a binding cache entry in the old sub-network router linking the old care-of address to the new care-of address;
- issuing a binding acknowledgment message from the old sub-network router to the mobile node via the new sub-network router; and
- forwarding old care-of address data packets stored or arriving at the old sub-network router to the new care-of address.

11. The method according to claim 2, wherein the base node is a gateway foreign agent, and the mobile node is capable of accessing only a single sub-network at a time, the synchronizing step comprising:
- sending a binding update message from the mobile node to the old sub-network router;
- creating a binding cache entry in the old sub-network router linking the old care-of address to the new care-of address;
- issuing a binding acknowledgment message from the old sub-network router to the mobile node via the new sub-network router;
- forwarding old care-of address data packets stored or arriving at the old sub-network router to the new care-of address;
- deleting an old care-of address binding from the gateway foreign agent; and
- issuing a deregistration reply message from the gateway foreign agent to the mobile node via the old sub-network router indicating that the old care-of address binding has been deleted.

12. The method according to claim 1, wherein the request message is a binding update message and the reply message is a binding acknowledgment message.

13. The method according to claim 12, wherein the base node is a home agent and the mobile node is capable of accessing two sub-networks simultaneously, the synchronizing step comprising issuing:
- sending a deregistration binding update message from the mobile node to the home agent via the old sub-network router;
- deleting an old care-of address binding from the home agent; and sending a deregistration reply message from the home agent to the mobile node via the old sub-network router indicating that the old care-of address binding has been deleted.

14. The method according to claim 13, wherein the mobile node does not receive the deregistration reply message before the old wireless sub-network has badly deteriorated beyond a certain point, the synchronizing step further comprising:
- sending a binding update message from the mobile node to the old sub-network router;
- creating a binding cache entry in the old sub-network router linking the old care-of address to the new care-of address;
- issuing a binding acknowledgment message from the old sub-network router to the mobile node via the new sub-network router; and
- forwarding old care-of address data packets stored or arriving at the old sub-network router to the new care-of address.

15. The method according to claim 12, wherein the base node is a home agent and the mobile node is capable of accessing only a single sub-network at a time, the synchronizing step comprising:
- sending a binding update message from the mobile node to the old sub-network router;
- creating a binding cache entry in the old sub-network router linking the old care-of address to the new care-of address;
- issuing a binding acknowledgment message from the old sub-network router to the mobile node via the new sub-network router;
- forwarding old care-of address data packets stored or arriving at the old sub-network router to the new care-of address;
- sending a deregistration binding update message from the mobile node to the home agent via the old sub-network router;
- deleting an old care-of address binding from the gateway foreign agent; and
- issuing a deregistration reply message from the gateway foreign agent to the mobile node via the old sub-network router indicating that the old care-of address binding has been deleted.

16. The method according to claim 12, wherein a route optimization function is used, the base node is a home agent, and the mobile node is capable of accessing two sub-networks simultaneously, the synchronizing step comprising:
- sending a deregistration binding update message from the mobile node to a correspondent node via the old sub-network router;
- deleting an old care-of address binding in the correspondent node;
- issuing a deregistration binding acknowledgment message from correspondent node to the mobile node via the old sub-network router;
- sending a binding update message from the mobile node to the correspondent node via the new sub-network router;
- creating a new care-of address binding in the correspondent node; and
- issuing a binding acknowledgment message from the correspondent node to the mobile node via the new sub-network router.

17. The method according to claim 16, wherein the mobile node does not receive the deregistration binding acknowledgment message before the old wireless sub-network has deteriorated beyond a certain point, the synchronizing step further comprising:
- sending a binding update message from the mobile node to the old sub-network router;
- creating a binding cache entry in the old sub-network router linking the old care-of address to the new care-of address;
- issuing a binding acknowledgment message from the old sub-network router to the mobile node via the new sub-network router; and
- forwarding old care-of address data packets stored or arriving at the old sub-network router to the new care-of address.

18. The method according to claim 12, wherein a route optimization function is used, the base node is a home agent, and the mobile node is capable of accessing only a single sub-network at a time, the synchronizing step comprising:
- sending a binding update message from the mobile node to the old sub-network router;
- creating a binding cache entry in the old sub-network router linking the old care-of address to the new care-of address;
- issuing a binding acknowledgment message from the old sub-network router to the mobile node via the new sub-network router;
- forwarding old care-of address data packets stored or arriving at the old sub-network router to the new care-of address;
- sending a binding update message from the mobile node to the correspondent node via the new sub-network router;
- creating a new care-of address binding in the correspondent node; and
- issuing a binding acknowledgment message from the correspondent node to the mobile node via the new sub-network router.

19. The method according to claim 12, wherein the base node is a mobility anchor point and the mobile node is capable of accessing two sub-networks simultaneously, the synchronizing step comprising:
- sending a deregistration binding update message from the mobile node to the mobility anchor point via the old sub-network router;
- deleting an old care-of address binding from the mobility anchor point; and
- issuing a deregistration binding acknowledgment message from the mobility anchor point to the mobile node via the old sub-network router.

20. The method according to claim 19, wherein the mobile node does not receive the deregistration binding acknowledgment before the old wireless sub-network has deteriorated beyond a certain point, the synchronizing step further comprising:
- sending a binding update message from the mobile node to the old sub-network router;
- creating a binding cache entry in the old sub-network router linking the old care-of address to the new care-of address;
- issuing a binding acknowledgment message from the old sub-network router to the mobile node via the new sub-network router; and
- forwarding old care-of address data packets stored or arriving at the old sub-network router to the new care-of address.

21. The method according to claim 12, wherein the base node is a gateway foreign agent, and the mobile node is capable of accessing only a single sub-network at a time, the synchronizing step comprising:

sending a binding update message from the mobile node to the old sub-network router;

creating a binding cache entry in the old sub-network router linking the old care-of address to the new care-of address;

issuing a binding acknowledgment message from the old sub-network router to the mobile node via the new sub-network router;

forwarding old care-of address data packets stored or arriving at the old sub-network router to the new care-of address;

sending a deregistration binding update message from the mobile node to the mobility anchor point via the old sub-network router;

deleting an old care-of address binding from the mobility anchor point; and issuing a deregistration binding acknowledgment message from the mobility anchor point to the mobile node via the old sub-network router.

22. An Internet Protocol based wireless access network, comprising:

a lower layer complying with Open Systems Interconnections (OSI) model wherein a handoff starting time is obtained;

a mobile node adapted to obtain a new care-of address from a new sub-network router, and to issue a request message via the new sub-network router requesting a new binding, upon being notified from the lower layer of the OSI model that a connection with an old sub-network router will be discarded within a predetermined amount of time; and a base node adapted to create the new care-of address binding upon receiving the request message from the mobile node and to issue, at the same time, two registration reply messages being sent to both the old sub-network router and the new sub-network router, including:

a registration reply message to the mobile node via the new sub-network router indicating that the new care-of address binding has been created, wherein the base node is adapted to delete an old care-of address binding therefrom upon receiving a deregistration request message and a deregistration binding acknowledgment message to the mobile node via the old sub-network router indicating that the old care-of address binding has been deleted; wherein the mobile node and the base node are further adapted to utilize the deregistration binding acknowledgment message to synchronize the transfer of old care-of address data packets stored on the old sub-network router from the base node to the mobile node in a synchronized manner, the base node sending the two registration reply messages including the deregistration binding acknowledgment message after receiving the registration request message and using the deregistration binding acknowledgment message as a synchronization point.

23. The network according to claim 22, wherein the request message is a mobile node registration request message and the reply message is a mobile node registration reply message.

24. The network according to claim 22, wherein the request message is a binding update message and the reply message is a binding acknowledgment message.

25. The network according to claim 22, wherein a route optimization function is used.

26. The network according to claim 22, wherein the mobile node is capable of accessing two sub-networks simultaneously.

27. The network according to claim 22, wherein the mobile node is capable of accessing only a single sub-network at a time.

28. The network according to claim 22, wherein the base node is a home agent.

29. The network according to claim 22, wherein the base node is a gateway foreign agent.

30. The network according to claim 22, wherein the base node is a mobility anchor point.

31. The network according to claim 22, wherein the base node is further adapted to delete an old care-of address binding and issue a deregistration reply message to the mobile node via the old sub-network router indicating that the old care-of address binding has been deleted.

32. The network according to claim 22, wherein the mobile node is further adapted to send a binding update message to the old sub-network router, and the old sub-network router is adapted to create a binding cache entry linking the old care-of address to the new care-of address, issue a binding acknowledgment message to the mobile node via the new sub-network router, and forward old care-of address data packets stored or arriving thereat to the new care-of address.

33. The network according to claim 22, wherein the mobile node is further adapted to send a deregistration binding update message to a correspondent node via the old sub-network router, and the correspondent node is adapted to delete an old care-of address binding therefrom, and issue a deregistration binding acknowledgment message to the mobile node via the old sub-network router.

34. The network according to claim 22, wherein the base node is further adapted to send a binding update message to a correspondent node, and the correspondent node is adapted to create a new care-of address binding therein.

35. A method of handing off a mobile node from an old sub-network router to a new sub-network router in an Internet Protocol based wireless access network, comprising:

obtaining a handoff starting time from a lower layer complying with Open Systems Interconnection (OSI) model;

using information from the lower layer of the OSI model to notify the mobile node that a connection with the old sub-network router will be discarded within a predetermined amount of time;

obtaining a new care-of address for the mobile node from the new sub-network router;

sending a request message from the mobile node to a base node via the new sub-network router requesting a new binding, the base node being predetermined one of a home agent, a gateway foreign agent, and a mobility anchor point;

creating a new care-of address binding in the base node;

issuing two registration reply messages from the base node to the mobile node to both the old sub-network router and the new sub-network router;

a registration reply message via the new sub-network router indicating that the new care-of address binding has been created and a deregistration reply message (DRR) via the old sub-network router indicating that the old care-of address binding has been deleted; and utilizing the deregistration reply message (DRR) to synchronize a transfer of old care-of address data packets stored on the old sub-network router from the base node to the mobile node, the home agent sending the two registration reply messages including the DRR after receiving the registration request message and using the DRR as a synchronization point.

36. The method according to claim 35, wherein the request message is a mobile node registration request message and the reply message is a mobile node registration reply message.

37. The method according to claim 35, wherein the request message is a binding update message and the reply message is a binding acknowledgment message.

38. The method according to claim 35, wherein a route optimization function is used.

39. The method according to claim 35, wherein the mobile node is capable of accessing two sub-networks simultaneously.

40. The method according to claim 35, wherein the mobile node is capable of accessing only a single sub-network at a time.

41. The method according to claim 35, wherein the synchronization step further comprises:

deleting an old care-of address binding from the base node.

42. The method according to claim 35, wherein the synchronization step comprises:

sending a deregistration binding update message from the mobile node to the base node via the old sub-network router;

deleting an old care-of address binding from the base node; and issuing a deregistration binding acknowledgment message from the base node to the mobile node via the old sub-network router indicating that the old care-of address binding has been deleted.

43. The method according to claim 35, wherein the synchronization step comprises:

sending a binding update message from the mobile node to the old sub-network router;

creating a binding cache entry in the old sub-network router linking the old care-of address to the new care-of address;

issuing a binding acknowledgment message from the old sub-network router to the mobile node via the new sub-network router; and forwarding old care-of address data packets stored or arriving at the old sub-network router to the new care-of address.

44. The method according to claim 35, wherein the synchronization step comprises:

sending a deregistration binding update message from the mobile node to a correspondent node via the old sub-network router;

deleting an old care-of address binding from the correspondent node; and issuing a deregistration binding acknowledgment message from the correspondent node to the mobile node via the old sub-network router.

45. The method according to claim 35, wherein the synchronization step comprises:

sending a binding update message from the base node to a correspondent node; and creating a new care-of address binding in the correspondent node.

* * * * *